United States Patent [19]

McLay et al.

[11] 4,072,825

[45] Feb. 7, 1978

[54] HOTEL/MOTEL AUTOMATIC CONTROL SYSTEM

[75] Inventors: Gerald M. McLay, St. Paul; Calvin D. Houdek, Lake Elmo, both of Minn.; Charles B. Yancey, Los Angeles, Calif.

[73] Assignee: Mi-Tronics, Inc., St. Paul, Minn.

[21] Appl. No.: 701,430

[22] Filed: June 30, 1976

[51] Int. Cl.$^2$ .......................... H04M 3/42; H04Q 3/54
[52] U.S. Cl. .................................. 179/18 B; 179/2 R; 179/7.1 TP; 179/11; 179/18 AD; 179/18 ES; 179/84 C; 340/310 R
[58] Field of Search .................. 179/1 H, 1 MN, 7 R, 179/7 MM, 7.1 R, 7.1 TP, 8 R, 8 A, 9, 11, 18 B, 18 BF, 2 R, 2 A, 84 C, 84 L, 18 E, 18 ES, 18 AD, 37, 38, 39, 40; 340/286

[56] References Cited

U.S. PATENT DOCUMENTS

| | | | |
|---|---|---|---|
| 3,418,650 | 12/1968 | Rich et al. | 340/311 |
| 3,564,148 | 2/1971 | Lee | 179/18 AD |
| 3,675,204 | 7/1972 | Miehle et al. | 340/286 |
| 3,854,009 | 12/1974 | Pirnie | 179/2 A |
| 3,920,912 | 11/1975 | Anderson et al. | 179/7.1 TP |

Primary Examiner—Thomas W. Brown
Attorney, Agent, or Firm—Charles E. Golla

[57] ABSTRACT

A microprocessor control system for monitoring and controlling a plurality of different parameters or features of a large number of like-kind entities, each characterized by such parameters or features. The control system is particularly suitable for automatically controlling on an indiviudal room basis, parameters within hotels/motels such as: counting the number of outgoing calls, paging guests having messages and controlling room message waiting indicators, placing wake-up calls to guest rooms at predesired wake-up times, and tracking in realtime the housekeeping and occupancy status of each hotel/motel room. Incidentally to the room status feature, telephone sets within unoccupied rooms or within rooms being cleaned are automatically disabled from registering outgoing calls, but may be used for registering emergency calls. All control functions are performed by a microprocessor under hardwire program or firmware command. Each room has identified therewith in the control system a plurality of identifiable Feature circuits addressable by and responsive to commands by the microprocessor for interfacing with the respective telephone set circuits servicing that room. The microprocessor and Feature circuits interface with pre-existing telephone equipment within the hotel/motel at the site of the central telephone control circuit bay within the hotel/motel, requiring no additional wiring to or any new circuit installations within the hotel/motel rooms. Hotel/motel personnel and the control system communicate with one another by means of a plurality of personalized desk consoles, by means of a plurality of room status and message waiting display scanners strategically located throughout the hotel/motel, and by means of a printer. The room status and message waiting scanners sequentially display those room numbers currently requiring maid or housekeeping service, or for which a message in waiting, respectively. The printer provides, under microprocessor control, a hard-copy record of all console and many feature processing functions of the control system.

19 Claims, 25 Drawing Figures

MICROPROCESSOR

FIG.14 DISPLAY SCANNER

FIG. 17           MAIN CONTROL CYCLE
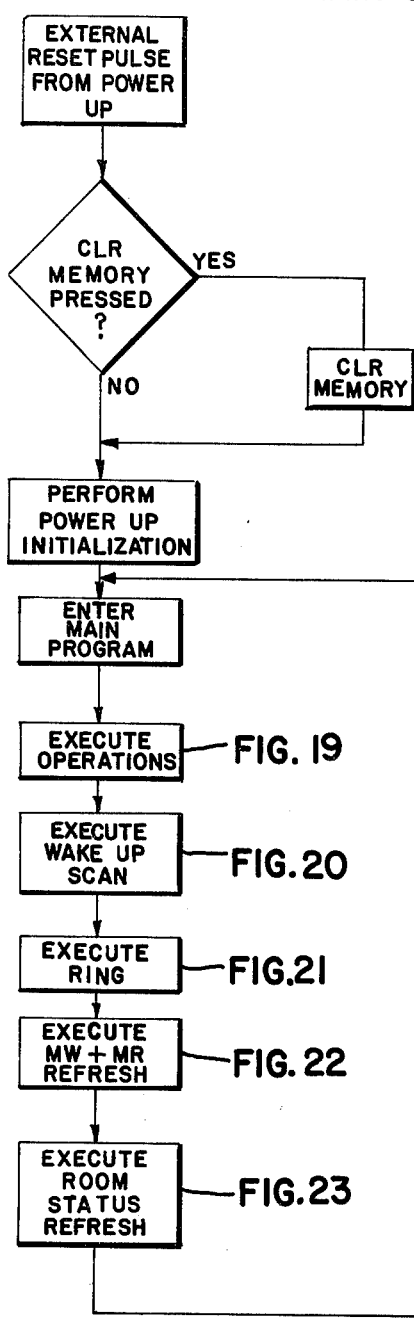
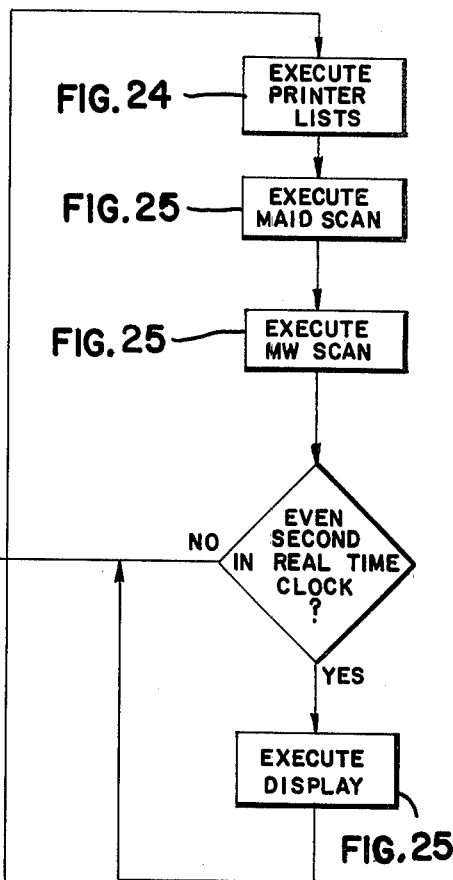

FIG.18 INTERRUPT ROUTINE
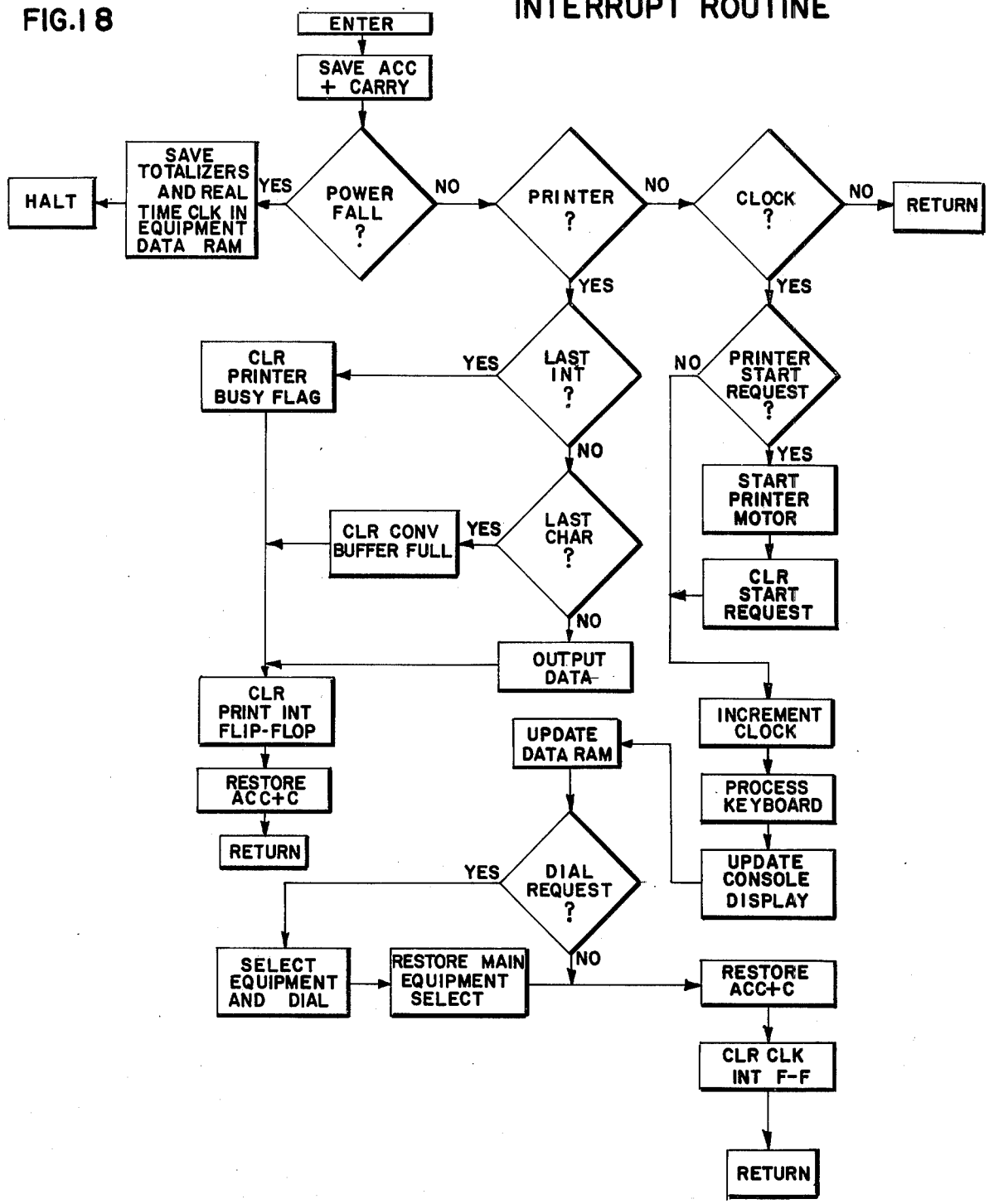

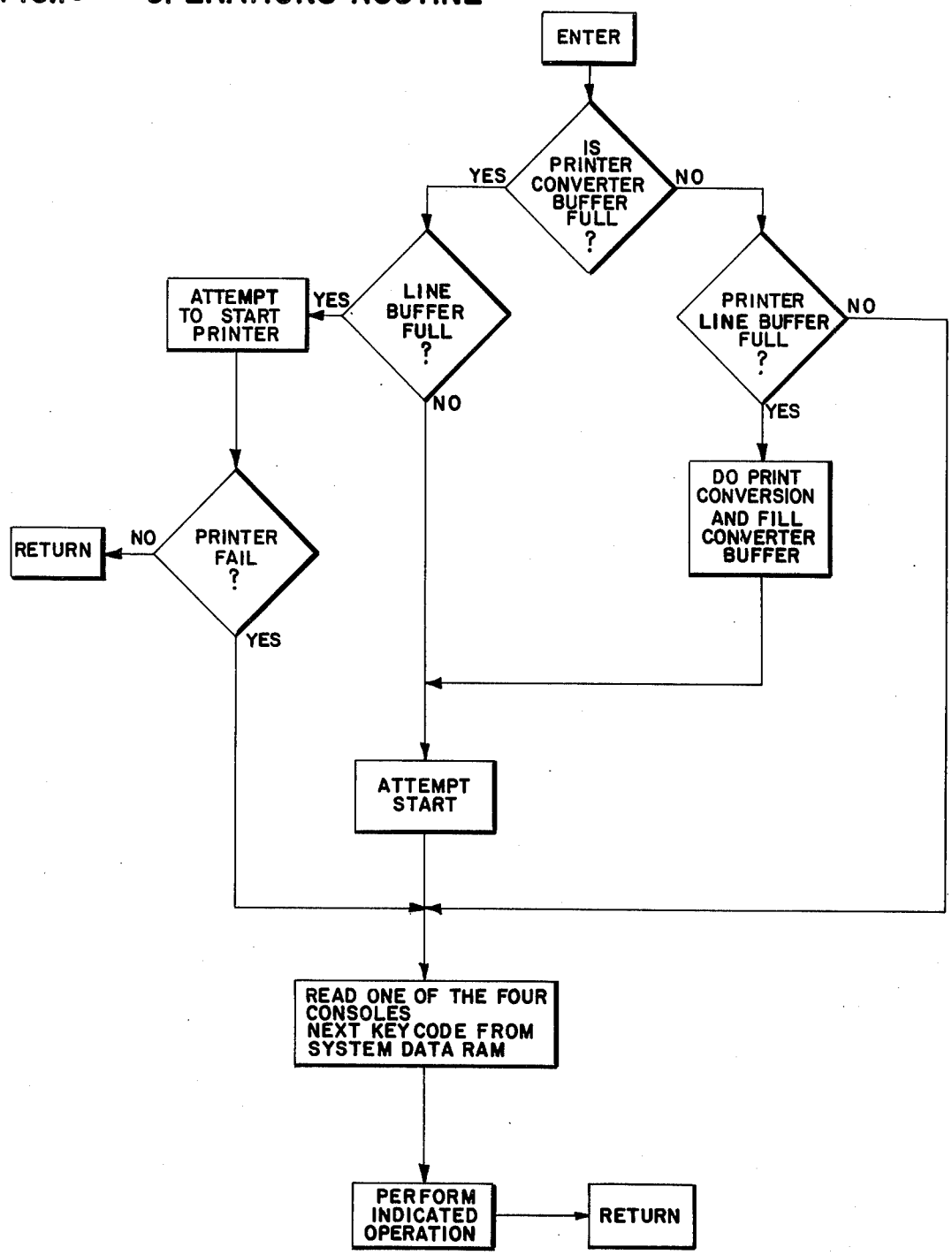
FIG.19 OPERATIONS ROUTINE

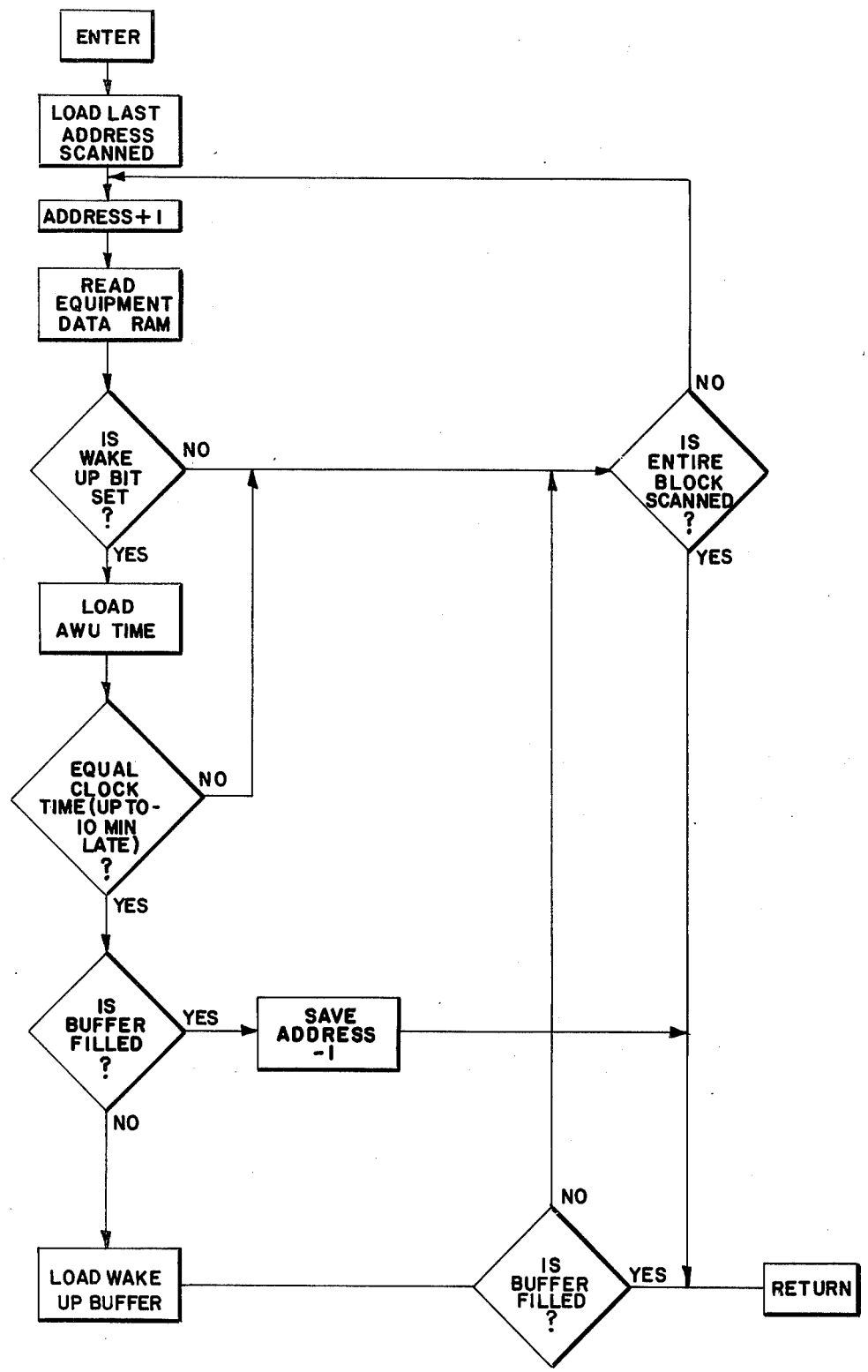
FIG. 20  WAKE-UP SCAN ROUTINE

FIG. 21    AWU RING PHONE ROUTINE
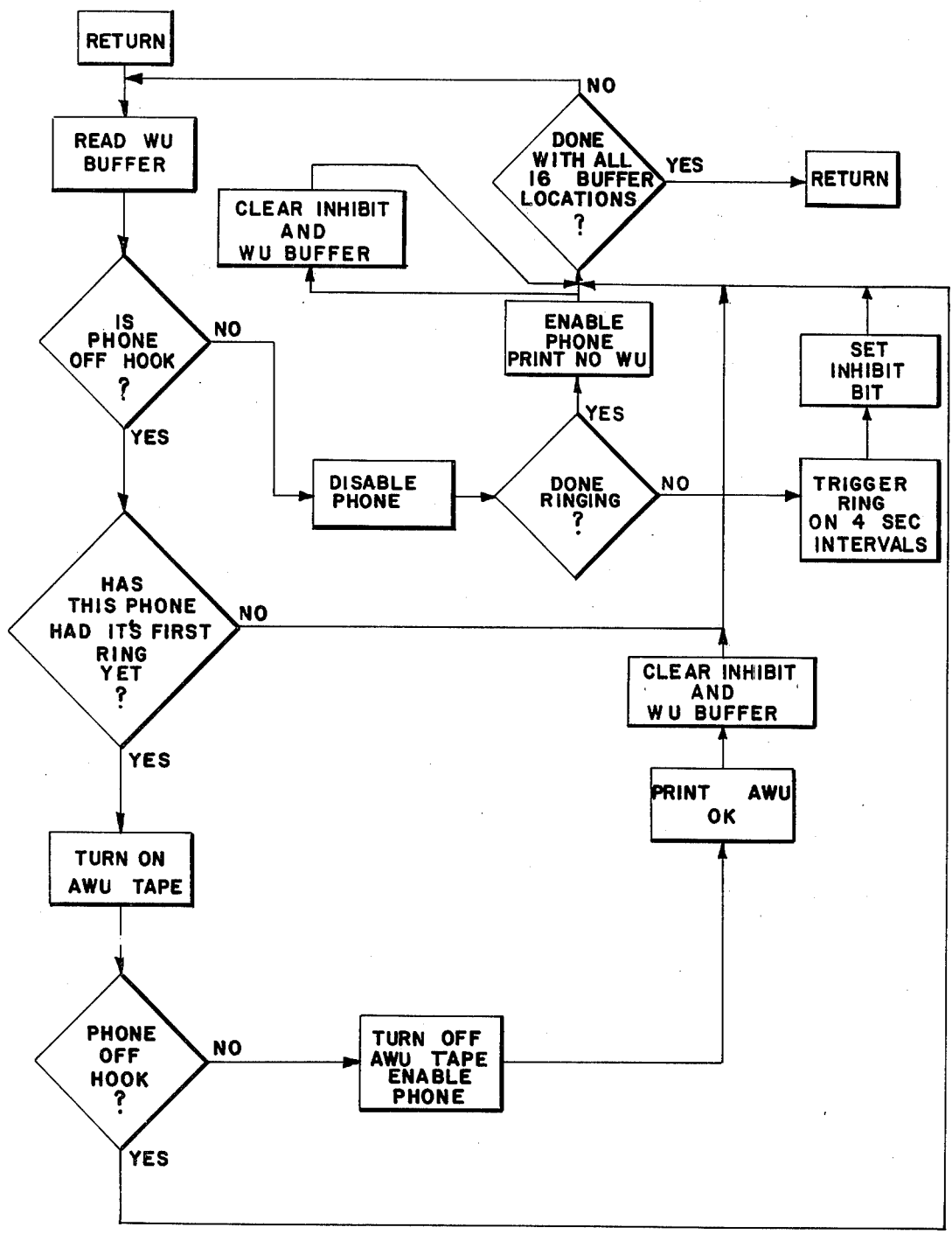

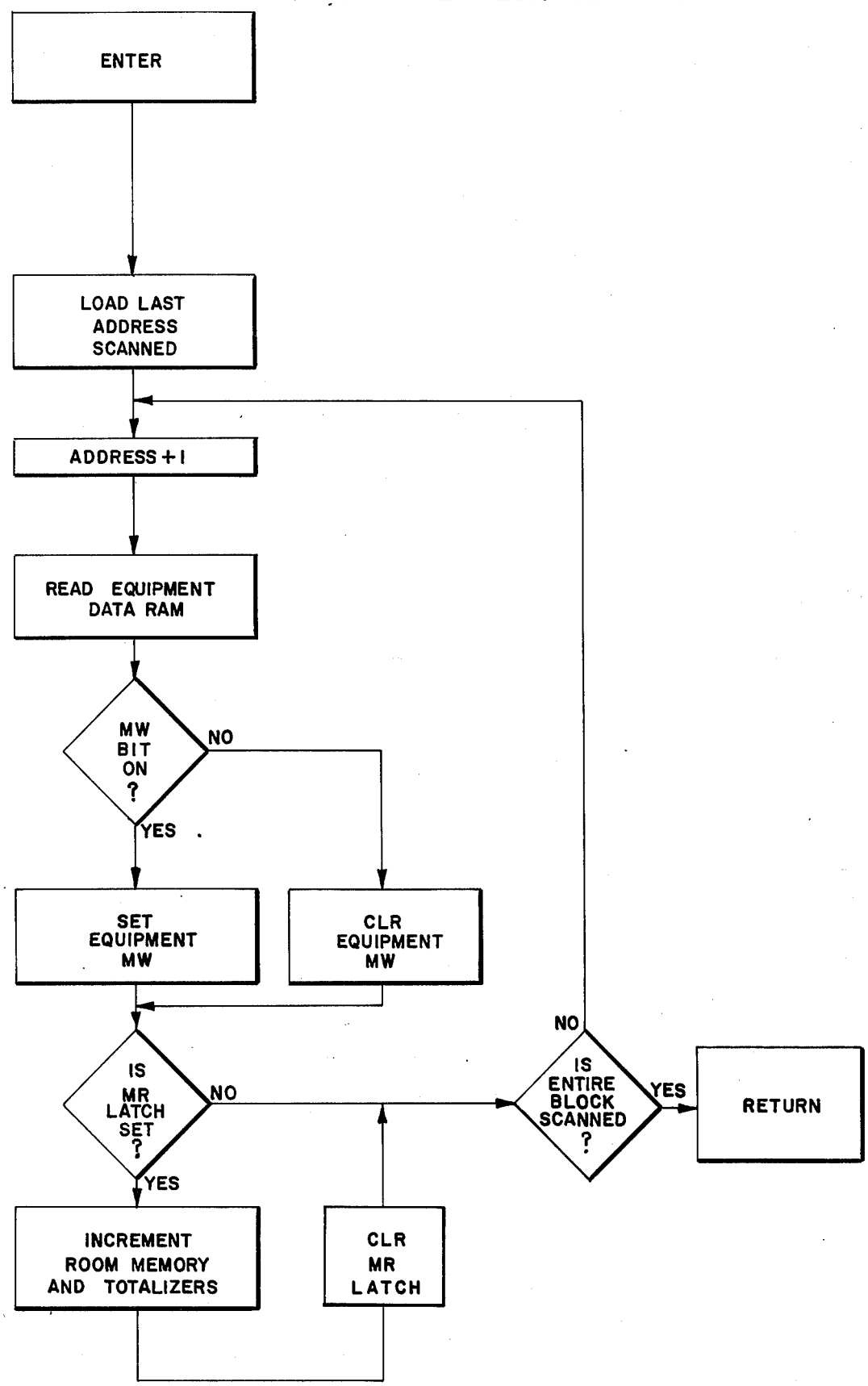
FIG. 22  MW & MR REFRESH ROUTINE

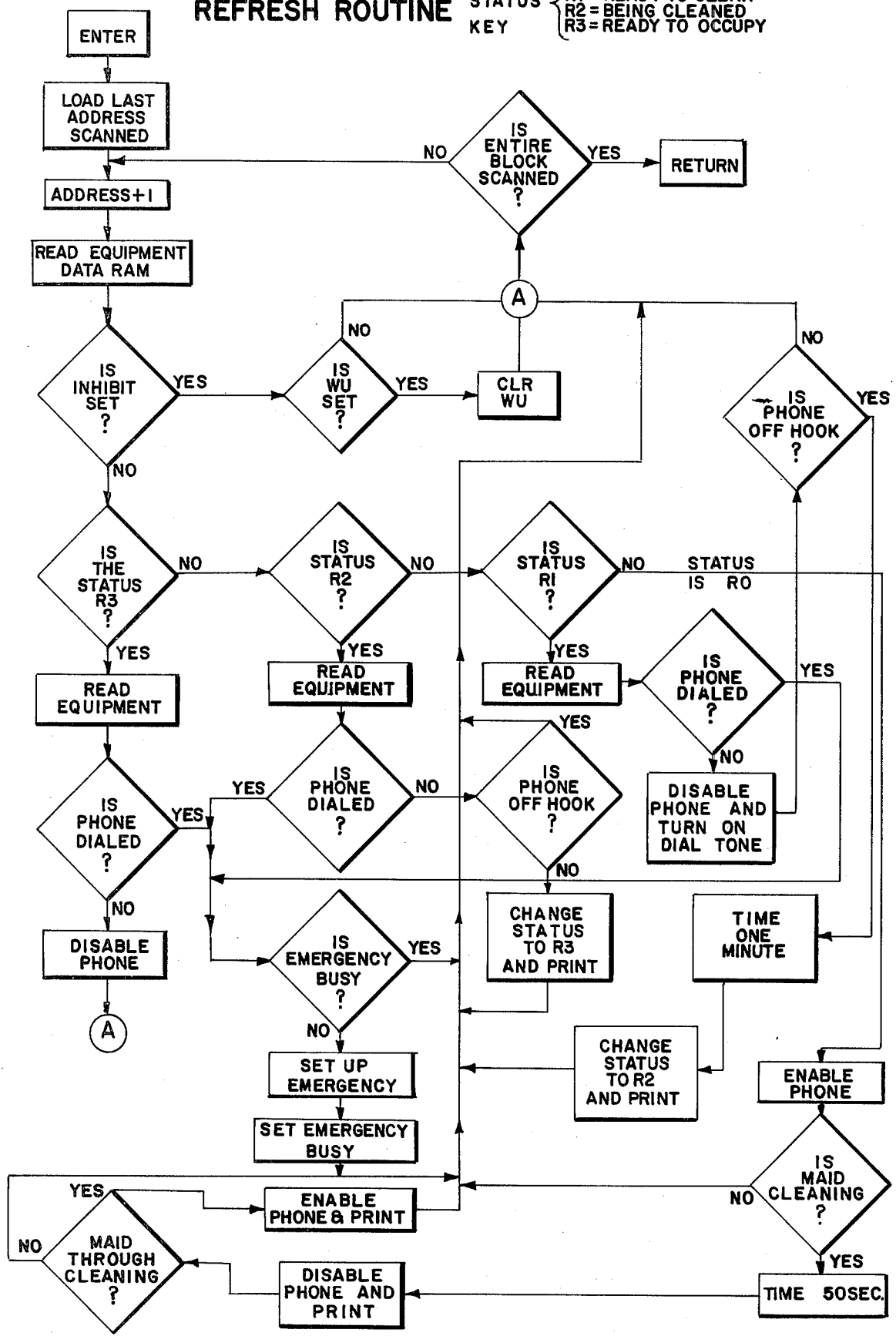
FIG. 23 ROOM STATUS REFRESH ROUTINE
ROOM STATUS KEY:
R0 = ROOM OCCUPIED
R1 = READY TO CLEAN
R2 = BEING CLEANED
R3 = READY TO OCCUPY FIG.24 PRINTER LIST ROUTINE
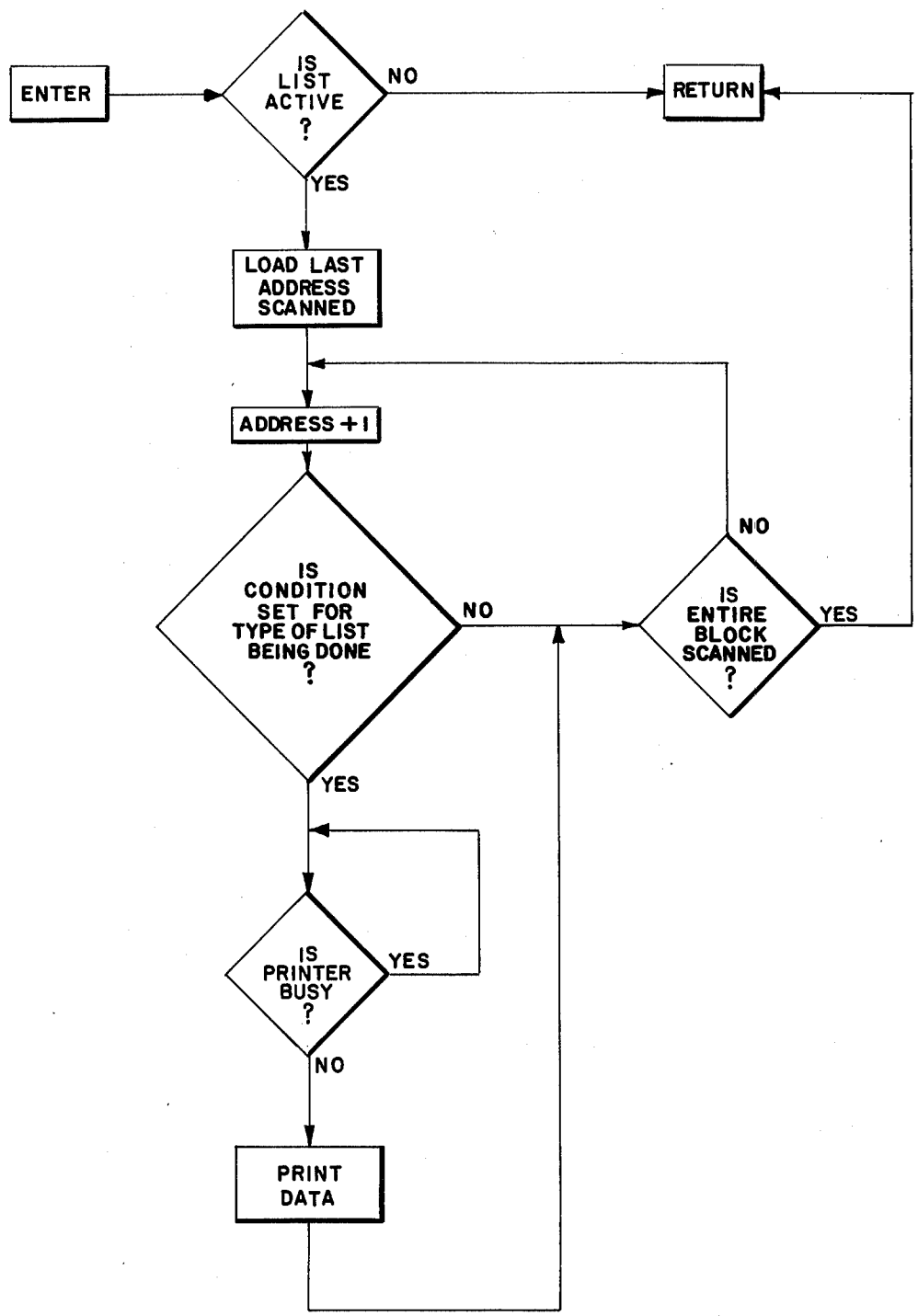

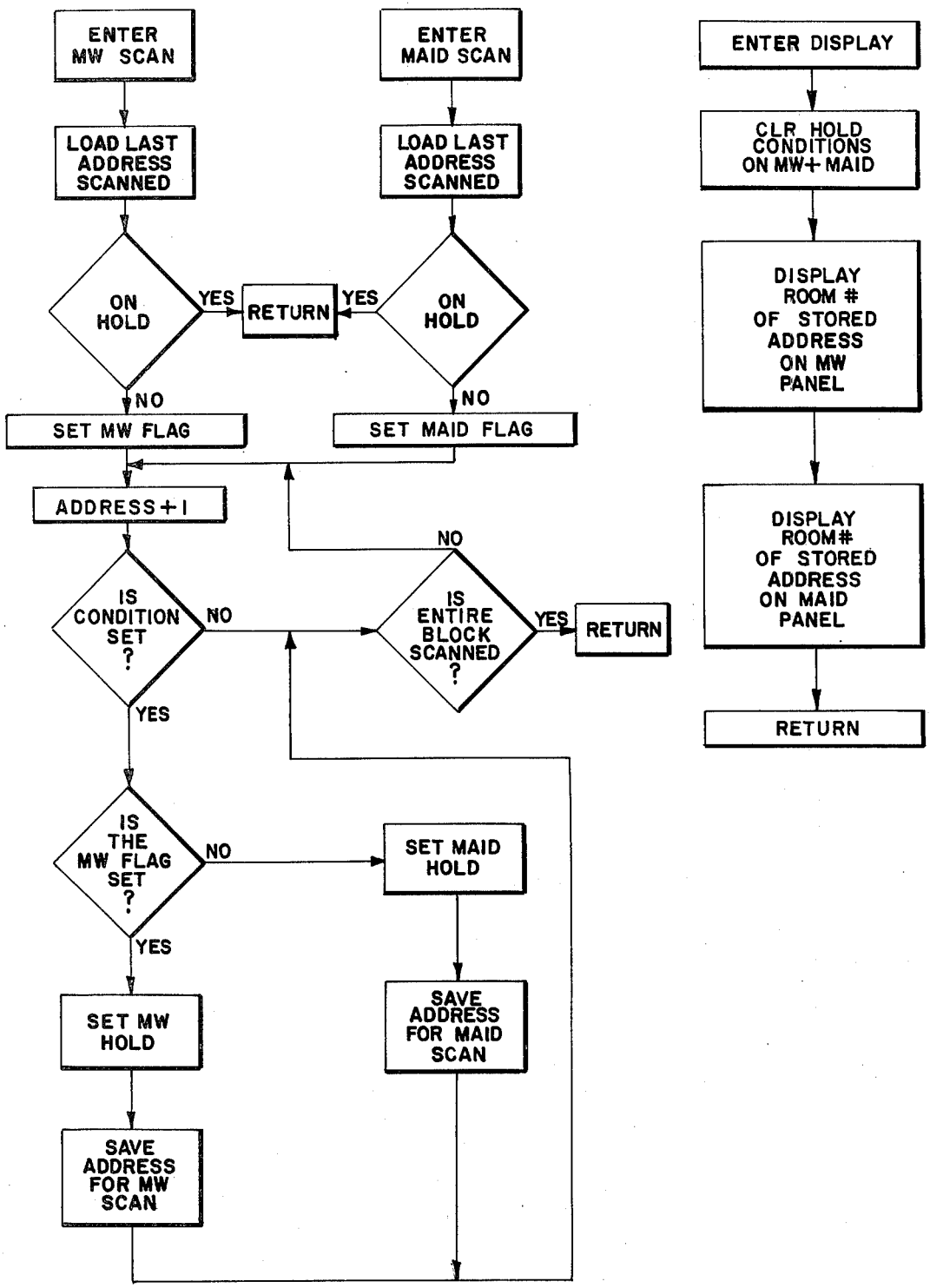
FIG.25 DISPLAY SCANNER ROUTINE

HOTEL/MOTEL AUTOMATIC CONTROL SYSTEM

| CONTENTS | |
|---|---|
| Abstract of The Disclosure | 1–2 |
| Cross Reference | 3 |
| Background of The Invention | 3–9 |
| Field of the Invention | |
| Description of The Prior Art | |
| Summary of The Invention | 9–13 |
| Brief Description of the Drawing | 14–16 |
| Description of The Preferred Embodiment | 17– |
| General | 17–27 |
| Microprocessor | 27–30 |
| Central Processing Unit | 30–32 |
| Timing | 32–36 |
| Random Access Memory | 36–39 |
| Programmable Read Only Memories | 39–41 |
| Input/Output Expander | 41–44 |
| Memory Interface and Interrupt Control | 44–53 |
| Level Convertors | 53–59 |
| Interconnectors | 59–63 |
| Message Register/Message Waiting Features | 63–75 |
| Automatic Wake-up/Room Status Feature | 75–96 |
| Display Scanners | 96–100 |
| Console | 100–106 |
| Printer | 106–111 |
| Tables | 112–115 |
| Operation of The Preferred Embodiment | 111– |
| General System Operation | 111–130 |
| Message Register Feature | 130–137 |
| Message Waiting Feature | 137–141 |
| Automatic Wake-up Feature | 141–151 |
| Room Status Feature | 151–162 |
| Console | 162–170 |
| Display Scanners | 170–172 |
| Claims | 173–184 |

CROSS-REFERENCES

The following publications are relevant to the specification and are incorporated herein by reference, in their entirety:

intellec ® 4/Mod 40 Microcomputer Development System Reference Manual, publication number MCS-808-1175/500, by Intel Corporation, Santa Clara, California 95051, 1975;

Model 56 Parallel Printer, publication number ADDM 041, by Addmaster Corporation, San Gabriel, California 91776, 1974.

BACKGROUND OF THE INVENTION

1. Field of the Invention

This invention relates generally to automated control systems and more particularly to a microprocessor control system for monitoring and controlling a plurality of different parameters or features in commercial settings of the type having a large number of entities each characterized by such parameters or features.

2. Description of the Prior Art

There are many applications today requiring simple, low-cost control systems for automatically, efficiently and reliably monitoring and controlling in real-time, a plurality of parameters or features of a large number of like-kind entities each characterized by or having such parameters or features, wherein the like-kind entities are typically remotely located from one another but are commonly connected by means of pre-existing communication paths to a central location. The like-kind entities could include such diverse things as hotel/motel rooms, various warehousing and factory units, environmental or condition responsive sensor, and the like, each operatively connected for sending and or receiving electronic signals to or from respectively a common location. Such control systems are particularly suitable for use in large hotels and motels for performing routine monitoring and service functions, heretofore handled in large part by hotel/motel staff, such as recording room telephone calls, handling messages, performing wake-up services, coordinating housekeeping and room cleaning operations and maintaining a real-time log of the housekeeping status of individual rooms throughout the hotel/motel. In hospitals, such control systems are well suited for monitoring and controlling such parameters as individual room and patient status, for automatically handling and alerting staff of messages or other emergency information, for use by pharmacy and housekeeping in performing their respective daily routine services, and the like. In both the hotel/motel and hospital applications, the existing telephone networks throughout the respective institutions provide the requisite communication links between the remotely located entities or rooms and the centrally located telephone equipment bay servicing that hotel/motel or hospital.

In hotel/motel applications for such control systems, the parameters to be monitored and/or controlled on an individual room basis typically include: recording of the number of outgoing telephone calls from each room during a guest's occupancy of that room; activation of a message waiting indicator within a room when an undelivered message is received for the guest of a room, and deactivation of the indicator when delivery of the message is completed; paging of guests throughout common areas of the hotel/motel in response to received messages; providing wake-up calls to guests at desired times of the day in response to personalized guest needs or demands; maintaining a real-time log of a number of different room occupancy and housekeeping status conditions (e.g. that room is occupied or is ready for occupancy, and that room requires cleaning or is presently being cleaned); providing a current listing to housekeeping of those rooms requiring maid service; and incidentally related control functions such as the disabling of room telephone sets when a room is unoccupied or being cleaned, and the enabling of otherwise disabled phones for emergency calls. A number of special purpose electronic systems particularly designed for use in monitoring or controlling one or several of the above-listed parameters or features are known in the art. Such systems have typically comprised special-purpose hardware having individual circuits specifically designed for handling specific ones of the monitored and/or controlled parameters with no operative coordination or interfacing between the circuits handing individual parameters or features. Accordingly, such prior art systems have typically been unduly expensive, complex and cumbersome to install in hotel/motel facilities, and have generally not gained acceptance throughout the industry.

A desirable feature of such control systems suitable for hotel/motel monitoring and control applications, and in particular for the monitoring of and control of such parameters as call-counting and room status, is the ability of the system to directly communicate with and receive input signals from each of the individual rooms throughout the hotel/motel. Those prior art systems attempting to employ the individualized room communication concept have required the alteration of existing communication equipment (such as the telephone sets) within the individual hotel/motel rooms, or the installation of supplemental signal generating or control hardware within the hotel/motel room. Such requirements of the prior art systems made installation of these systems cumbersome and costly, and generally unattractive for installation within existing hotel/motel facilities. Further, many of the prior art control systems required additional wiring to be strung between centralized control circuits and the individual hotel/motel rooms, making installation costs of the system prohibitive for existing hotel/motel structures.

Prior art hotel/motel control systems have typically employed one or a plurality of large, inconvenient display panels having separate display indicators for indicating accumulated counts of outgoing calls for each room, and one or a plurality of display indicators for indicating the particular occupancy or housekeeping status of each individual room throughout the hotel/motel. For example, if a hotel/motel had 2000 room, the display panel would include 2000 separate call-counting accumulated displays and 2000 or more different room status indicators. Such large display panels necessarily require significant valuable space, are typically accessible for use at only a single location and by only those hotel/motel personnel currently working at that location, and are susceptible to less than optimum reliability due to the large number of individual components involved in such displays. Further, such display panels typically require their energizing control circuitry to be mounted directly adjacent the display panel or require a large number of energization conductors (typically one for each room) to be extended between the display panel and the controlling circuitry, making such display systems more difficult to install, more susceptible to reliability failures and more inflexible in their use.

Several prior art control systems for hotel/motel applications, particularly those employing room status monitoring circuits have suggested the use of general purpose computers for performing administrative and record-keeping functions such as billing, handling of advance registrations and the like. Systems employing such computers have typically used such computers in a slave capacity (i.e. in a bookepping, recordkeeping, etc. capacity wherein the computer accepts and responds to instructions initiated by peripheral control circuitry), as opposed to using the computer as the primary control member of the system which performs all decision-making, coordinating and direct circuit control functions of the system. Prior art systems using general-purpose computers have typically employed large computer systems requiring significant space within the hotel/motel and trained personnel to operate and maintain the computer in addition to the required desk personnel, making such systems generally unattractive and prohibitively expensive for installation within other than extremely large hotel/motel facilities.

The present invention overcomes the above disadvantages and inconveniences of prior art control systems. The present invention provides a relatively inexpensive microprocessor controlled control system particularly suitable for performing all of the above-listed parameter monitoring and control functions within a hotel/motel, which system can be operated by existing hotel/motel personnel with a minimum of training, which offers a high degree of versatility, reliability and flexibility, which is capable of automatically coordinating, controlling and monitoring a large number of separate parameters or features on a room by room basis for a large number of such rooms, and which can be readily installed within existing hotel/motel structures without any required rewiring to individual hotel/motel rooms and without any addition to or alteration of existing telephone equipment within the individual hotel/motel rooms.

SUMMARY OF THE INVENTION

The present invention comprises an automated control system particularly suitable for monitoring and controlling a plurality of parameters or features for each of a large number of like-kind entities. The like-kind entities can comprise, for example, rooms within a hotel/motel or hospital. A microprocessor, under hardwired program or firmwire, control comprises the decision making entity of the system, coordinating and synchronizing the functions performed by the remaining monitoring and control circuits of the system. The microprocessor continuously and repetitively executes a master program during which a plurality of sub-routines are executed. The microprocessor receives input signals from and provides output control signals to a plurality of Feature Slave Circuits during execution of the sub-routines. The Feature Slave Circuits are conveniently mounted on a plurality of Mother Boards grouped according to the particular parameter or feature respectively associated therewith. A uniquely addressable group of such Feature Slave Circuits are identified with each room and control or monitor, under Microprocessor direction, the plurality of individual features for that room.

In a preferred embodiment application of the invention to use in a hotel/motel setting, the primary features automatically controlled and monitored by the control system include: counting of telephone calls, providing message waiting services, providing automatic wake-up services, and providing real-time room status tracking services. All of the microprocessor and Feature Slave Circuits are designed for complete operative installation within the equipment bay or that room within the hotel/motel which houses the primary control circuits for the plurality of telephone sets located throughout the hotel/motel. The microprocessor interfaces with the telephone equipment control circuits by means of its Feature Slave Circuits only at the site of the primary telephone equipment control circuits within the hotel/motel, thus requiring neither additional wiring to nor the installation of any additional circuits within the guest rooms within the hotel/motel, for operation of the control system.

The Feature Slave Circuits receive input signals from and transmit control signals to the telephone sets within individual rooms within the hotel/motel by means of pre-existing telephone lines leading from the primary telephone equipment bay to the individual telephone sets. The microprocessor further communicates with the external environment by means of a plurality of peripheral devices including: desk consoles, printer means, and various indicator display panels located throughout the hotel/motel. Other than for power supply connections, the connection lines between the microprocessor and these peripheral devices comprise the only wiring beyond the confines of the telephone equipment bay or room, required for installation of the system within a hotel/motel. The desk consoles comprise personalized units which can be virtually simultaneously used in time-sharing fashion by a plurality of different hotel/motel personnel such as the desk clerk, the cashier, the reservations clerk, the housekeeping supervisor, and the like. Each of the consoles includes a plurality of push-button selector switches by which the respective operators can directly communicate with the microprocessor by entering the individual room number and that particular parameter/feature code pertaining to the desired communication. The microprocessor converts the console entry into Feature circuit addressing information, interrogates or instructs the appropriate Feature circuits, and automatically performs the requested operation, simultaneously displaying on the active console the desired Feature information. All console entries and transactions are automatically recorded under microprocessor control by the hardcopy printer apparatus.

Under the Call-Counting feature, the control system automatically maintains a count, on an individual room basis, of outgoing telephone calls for the duration of each guest's occupancy of that respective room. As part of the Message Waiting feature, a message waiting indicator within an addressed room is energized under microprocessor command when a message is to be delivered to the occupant of that room, and a plurality of Message Waiting Display Scanners located at prominently visible locations throughout the common areas of the hotel/motel automatically sequentially display, under microprocessor control, the room identifying numbers of those rooms for which messages are waiting. As a part of the Automatic Wake-up Feature, the hotel operator or desk cleark enters the room number and the desired wake-up time into the microprocessor, after which the microprocessor automatically places a wake-up call and plays a recorded wakeup message to the appropriate room at the proper pre-requested time, and records by means of the printer whether or not the wake-up message was received and the time of such transaction.

Under the Room Status feature of the system, the microprocessor maintians a real-time log of four different room conditions: room occupied, room unoccupied and ready to be cleaned, room unoccupied and being cleaned, and room ready for occupancy. When a guest either checks into or out of the hotel/motel the desk personnel instructs the microprocessor by means of a proper console entry to change the room status to the appropriate "room occupied" or "room unoocupied and ready for cleaning" status. The microprocessor automatically thereafter determines the housekeeping status of the room in response to signals received by means of the telephone set within the individual room. The microprocessor automatically disconnects the telephone sets within unoccupied rooms from registering normal calls, but permits emergency calls to be made from any disabled telephone set. A plurality of maid or room status display scanners strategically located at maids' quarters throughout the hotel/motel automatically sequentially display, under micrprocessor command, the numbers of those rooms within the responsibility of that maid or housekeeping sector within which that display scanner is located, which required maid or housekeeping servicing. When a room has been serviced, or when a message has been delivered to the room occupant, the microprocessor automatically removes that particular room identifier number from the respective room status or message waiting display scanners.

A plurality of listing conditions are available for printing on a printer, under micrprocessor control and in response to proper list request entries on the consoles.

While the preferred embodiment of the invention will be disclosed with respect to a particular type of microprocessor it will be understood that any microprocessor acting under firmware program instructions can be employed within the spirit and intent of this invention. Further, while specific features and associated monitoring and control circuits will be described with respect to the monitoring and control of specific parameters or features throughout the hotel/motel it will be understood that other features and monitoring and control circuits could equally well be employed within the spirit and intent of this invention.

BRIEF DESCRIPTION OF THE DRAWING

Referring to the Drawing, wherein like designations represent like parts throughout the several views:

FIG. 17 is a Flow Diagram for the Main Firmware Program executed by the Control System of the preferred embodiment of this invention;

FIG. 18 is a Flow Diagram for the Interrupt firmware routine executed by the Control System of the preferred embodiment of this invention;

FIG. 19 is a Flow Diagram for the Operations firmware routine executed by the Control System of the preferred embodiment of this invention, and disclosed in FIG. 17;

FIG. 20 is a Flow Diagram for the Wake-Up Scan firmware routine executed by the Control System of the preferred embodiment of this invention, and disclosed in FIG. 17;

FIG. 21 is a Flow Diagram for the Automatic Wake-Up Ring Phone firmware routine executed by the Control System of the preferred embodiment of this invention, and disclosed in FIG. 17;

FIG. 22 is a Flow Diagram for the Message Waiting and Message Register Refresh firmware program executed by the Control System of the preferred embodiment of this invention, and disclosed in FIG. 17;

FIG. 23 is a Flow Diagram for the Room Status Refresh firmware routine executed by the Control System of the preferred embodiment of this invention, and disclosed in FIG. 17;

FIG. 24 is a Flow Diagram for the Printer List firmware routine executed by the Control System of the preferred embodiment of this invention and disclosed in FIG. 17; and FIG. 25 is a Flow Diagram for the Display Scanner firmware routines executed by the Control System of the preferred embodiment of this invention, and disclosed in FIG. 17.

DESCRIPTION OF THE PREFERRED EMBODIMENT

General

Figure 1:
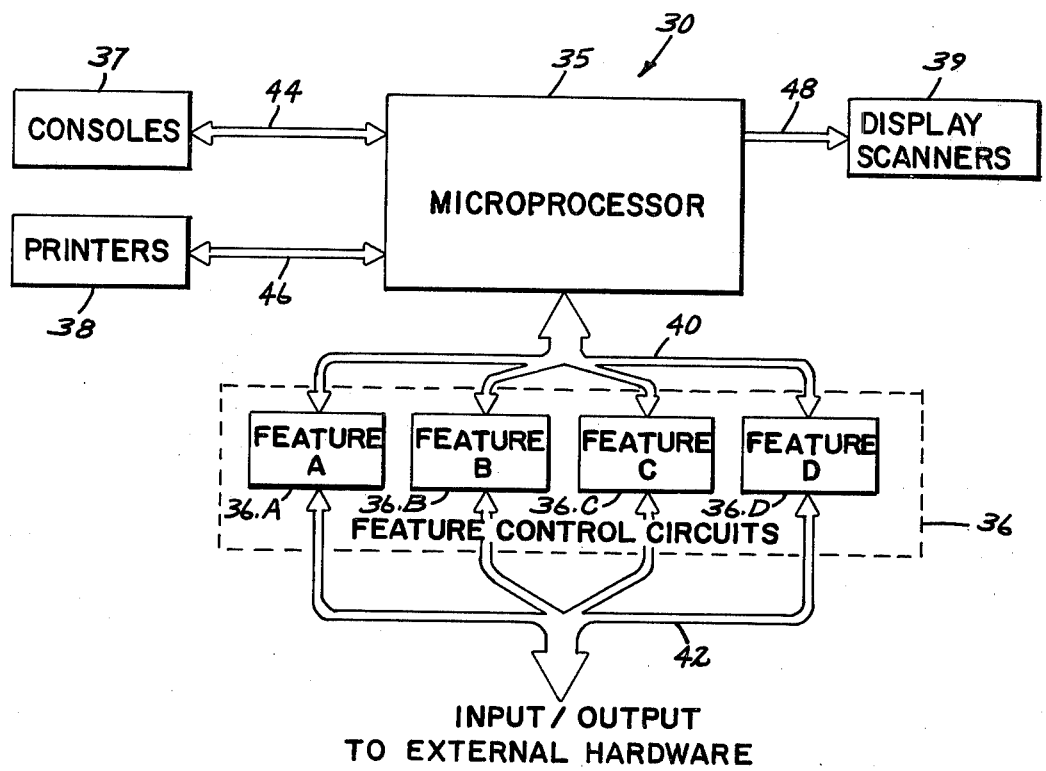
FIG. 1 is a diagrammatic representation generally illustrating the major functional blocks and the signal flow interrelationship there among of a preferred embodiment application of the control system of the present invention.

Referring to the Figures, there is generally illustrated at 30 in FIG. 1, a preferred embodiment of a control system utilizing a microprocessor hardwired into the system for coordinating and directly controlling the operative functions of the system. At the heart of the control system 30 is a microprocessor, generally designated at 35. The microprocessor 35 communicates with and controls the operations of a plurality of varied feature control circuits generally designated at 36 by means of a signal flow path 40. The feature control circuits 36 are operable to monitor and control any number of varied functions requiring control and/or monitoring by the control system 30. The feature control circuits 36 are illustrated in FIG. 1 as including four such features or functions labeled Feature A through Feature D (36.A through 36.D, respectively); however, it will be understood that any number of such features are includable within the spirit and intent of this invention. The feature control circuits 36 communicate with their respectively monitored and/or controlled environments by means of a signal flow path generally designated at 42.

One or a plurality of consoles 37 are operatively connected for communication with the microprocessor 35 by means of a signal flow path 44. As will become more apparent from a more detailed description herein, the consoles 37 provide rapid real time communication between the control system 30 and its users and provide the users with a significant degree of flexibility in communicating with the monitored and/or controlled environments by means of the control circuits 36. A hard copy of the environmental monitoring and control functions performed by the microprocessor 35 may be recorded by one or more printers 38 communicating with the microprocessor 35 by means of a signal flow path 46. A microprocessor 35 may also provide a visual indication of selected information to external environments by means of a signal flow path 48 connected for communication with one or a plurality of display scanners 39.

It will be understood throughout this specification that the terminology "signal flow path" is intended to refer to an established means of appropriate signal communication between those entities between which it extends, and that such a signal flow path may in fact comprise a large number of conduits, conductors, connectors or other appropriate signal carrying media required to effect a transmission of the appropriate signals between the end terminals of the respective signal flow path. Further, throughout this specification, an attempt will be made to maintain identity between the designated signal flow paths and their respective constituent components or elements. For example, those conductors comprising the signal flow path 42 will be designated by numerical identifiers each having as its prefix the numerical identifier "42". In those instances which due to overlapping of signal flow paths, require departure from the above described reference identification procedure, notation of such departure will be noted.

Figure 3:
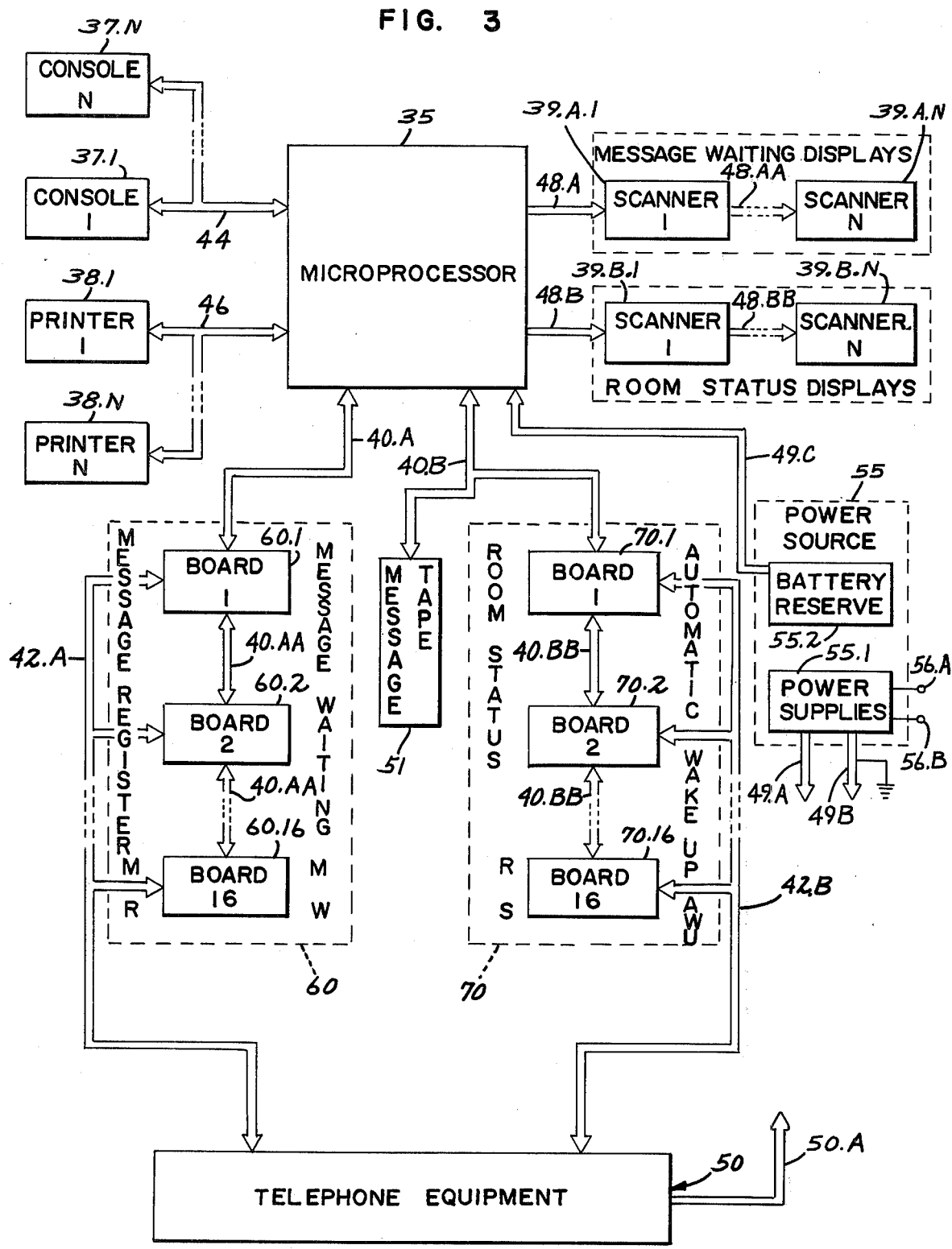
FIG. 3 is a diagrammatic block diagram representation of the preferred embodiment of the control system disclosed in FIG. 1.

A preferred embodiment application of the control system 30 of this invention is illustrated in FIG. 3. In the preferred embodiment usage, the control system 30 is employed to monitor and control various functions within a hotel/motel environment wherein a plurality of different signals or features must be monitored and/or controlled for a large number of rooms. In such an application, the control system 30 is designed to interface directly with the centrally located telephone equipment 50 already existing within the hotel/motel, without requiring any additional installations within or wiring to individual rooms throughout the hotel/motel. The telephone equipment 50 would typically represent the centrally located nerve center of an existing signal handling station and would in the preferred embodiment usage of the control system 30 represent either the central office of a telephone network for the hotel/motel or what is commonly referred to in the telephone art as a personalized business exchange hereinafter referred to as a PBX. In a hotel/motel controlled by means of a central office, the main switching circuits for controlling the telephones are located within the so-called central office, and there is typically a separate telephone line corresponding to each telephone within the hotel/motel, disposed between the central office and the hotel/motel. In contrast to the central office type of a system, the PBX represents a switching control circuit physically located within the hotel/motel proper, wherein the PBX includes fan-out and switching networks which allow communication between a relatively small number of telephone lines leading into the hotel/motel and a relatively large number of telephone lines distributed throughout the hotel/motel. By directly interfacing with the central office or PBX networks, the control system 30 can communicate directly with individual rooms and telephones within the hotel/motel by means of pre-existing and pre-wired signal flow paths and lines connected to the central office or PBX telephone equipment 50.

In the preferred embodiment application of the control system for monitoring and controlling various events and signals within a hotel/motel system, the individual Features of the feature control circuits 36 (FIG. 1) are broadly identified as follows: Feature A (36.A) represents the monitoring or counting of the number of outgoing telephone calls made from each room telephone throughout the hotel/motel, and will be broadly referred to as the Message Register (MR) Feature of the preferred embodiment application of the control system 30; Feature B (36.B) represents the control portion of the system which automatically logs and displays a continually updated listing of those rooms within the hotel/motel for whose respective occupants a message is waiting at the main hotel/motel desk, and will be broadly referred to as the Message Waiting (MW) Feature of the preferred embodiment application of the control system 30; Feature C (36.C) represents the monitoring and control of the occupancy and housekeeping status of the respective rooms throughout the hotel/motel, and will be broadly referred to as the Room Status (RS) feature of the preferred embodiment application of the control system 30; and Feature D (36.D) represents that feature of the system which provides for automatically distributing on a pre-programmable pre-selected basis automatic wake-up messages to rooms throughout the hotel/motel, and will be broadly referred to as the Automatic Wake-Up (AWU) Feature of the preferred embodiment application of the control system 30 of this invention. It will be understood that while four specific broad categories or features will be disclosed with respect to usage of the preferred embodiment application of the control system 30, that the control system may equally well be applied to any number of such Features for controlling and/or monitoring any number of varied events.

Referring to FIG. 3, the control system 30 is schematically illustrated as it would operatively appear when employed in its preferred embodiment application of controlling and monitoring a plurality of feature events within a hotel/motel system. As distinguished from the functional schematic diagram of FIG. 1, it will be noted that the specific features (36.A-36.D) as disclosed in FIG. 1 are not physically represented in FIG. 3. The individual functional Features are represented in FIG. 3 by the control circuits which are employed to generate or to achieve the specific Feature functions. Referring to FIG. 3, the Message Register (MR) and the Message Waiting (MW) feature control circuits are collectively comprised within a plurality of first set of mother boards generally designated at 60. As will become apparent upon a more detailed description of the preferred embodiment, the number of mother boards 60 required depends upon the number of like or similar-type events to be monitored or controlled. In the case of the preferred embodiment, the number of like or similar events corresponds to the number of rooms within the hotel/motel in which the control system 30 is installed. A preferred embodiment system illustrated includes sixteen such mother boards within the first set 60 of such mother boards, respectively consecutively designated as 60.1-60.16, respectively. In the preferred embodiment, each of the mother boards 60.1-60.16 is capable of servicing, with respect to those features monitored or controlled by that mother board, 128 rooms of the hotel/motel. In a preferred embodiment, the microprocessor 35 directly communicates with the first mother board 60.1 within the first set of such mother boards by means of the signal flow path 40.A. The microprocessor 35 communicates with the remaining mother boards 60.2-60.16 within the first set of mother boards 60, by means of interconnecting signal flow paths between the mother boards 60.2-60.16, generally designated at 40.AA in FIG. 3. As will become apparent upon a more detailed description of the construction of individual ones of the mother boards 60, the microprocessor 35 actually directly communicates with the circuits of each of the mother boards 60.1-60.16 by means of the combination of the signal flow paths 40.A and 40.AA. Each of the mother boards 60.1-60.16 within the first set 60 of such mother boards communicates with the external environment telephone equipment 50 by means of the signal flow path 42.A.

The Room Status (RS) and the Automatic Wake-Up (AWU) Feature control circuits are collectively comprised within a plurality of second sets of mother boards generally designated at 70. As will become apparent upon a more detailed description of the preferred embodiments, the number of mother boards 70 required within the control system depends upon the number of like or similar-type events to be monitored or controlled. In the preferred embodiment, the number of like or similar events corresponds to the number of rooms within the hotel/motel in which the control system 30 is installed. The preferred embodiment system illustrated includes sixteen such mother boards within the second set 70 of such mother boards, respectively consecutively designated at 70.1-70.16. It will be noted that for both the first and second sets of mother boards 60 and 70, respectively, only representative ones of each of the mother boards within the respective sets of mother boards are illustrated in the figures. In the preferred embodiment, each of the mother boards 70.1-70.16 is capable of servicing with respect to the RS and AWU features, 128 rooms within the hotel/motel in which the control system 30 is installed. In the preferred embodiments, the microprocessor 35 directly communicates with the first mother board 70.1 within the second set of such mother boards 70 by means of the signal flow path 40.B. The microprocessor 35 communicates with the remaining mother boards 70.2-70.16 within the second set of mother boards 70 by means of interconnecting signal flow paths between the mother boards 70.2-70.6, generally designated at 40.BB in FIG. 3. As will become apparent upon a more detailed description of the construction of individual ones of the mother boards 70, the microprocessor 35 actually directly communicates with the circuits of each of the mother boards 70.1-70.16 by means of the combination of the signal flow paths 40.B and 40.BB. Each of the mother boards 70.1-70.16 within the second set of such mother boards 70 communicates with the external environment telephone equipment 50 by means of the signal flow path 42.B. The Microprocessor 35 also communicates with an external message tape apparatus 51 by means of the signal flow path 40.B.

As previously discussed, while two sets of mother board circuits (60 and 70) have been disclosed with respect to the preferred embodiment application of the control system 30, it will be understood that any number of such sets of mother boards can be employed within the spirit and intent of this invention. The number of such mother board sets required for any system depends upon the number of features or different events monitored and/or controlled by the system, and the number of mother boards within each particular set of mother boards is determined by the number of like or similar-type ones of such respective events or features which are to be monitored and/or controlled.

In the preferred embodiment application of the control system 30 to operative use in a hotel/motel system, the microprocessor 35 communicates by means of the signal flow path 44 with a plurality of consoles designated in FIG. 3 as 37.1 (corresponding to the first of such consoles) through 37.N (corresponding to the Nth such console). In a typical hotel/motel application of the control system 30, four such consoles are desirable. As illustrated in FIG. 3, the microprocessor 35 can communicate by means of the signal flow path 46 with a plurality of printers designated at 38.1 (corresponding to the first of such printers) through 38.N (corresponding to the Nth such printer).

In a preferred embodiment, the microprocessor 35 communicates with two sets of display scanners 39. The microprocessor 35 communicates by means of the signal flow path 48.A with a first set of such display scanners designated as scanner displays 39.A.1 (representing the first of such scanner displays) through 39.A.N (representing the Nth of such scanner displays). The scanner displays 39.A.1–39.A.N within the first set of such scanner displays are employed in the preferred embodiment application of the control system 30 to sequentially display the numbers of rooms within the hotel/motel for which messages are waiting at the main desk of the hotel/motel for the occupants of those rooms. In the preferred embodiment, the microprocessor 35 communicates with the first scanner display 39.A.1 within the first set of such displays by means of the signal flow path 48.A, and the communication signals from the microprocessor are serially transmitted to the remaining scanner displays within the first set of such displays by means of interconnecting flow paths 48.AA. The microprocessor communicates by means of the signal flow path 48.B with a second set of display scanners designated as 39.B.1 (representing the first of such scanner displays) through 39.B.N (representing the Nth of such scanner displays). The scanner displays 39.B.1–39.B.N within the second set of such display scanners are employed within the preferred embodiment application of the control system 30 to sequentially display throughout remotely located maid stations throughout the hotel/motel the room numbers of those rooms throughout the hotel/motel requiring cleaning, servicing, or the like. In a preferred embodiment, the microprocessor 35 communicates with the first display scanner 39.B.1 within the second set of such displays by means of the signal flow path 48.B, and the communication signals from the microprocessor are serially transmitted to the remaining display scanners within the second set of such displays by means of the interconnecting signal flow path 48.BB.

Power signals are provided to energize the electrical circuits throughout the control system 30 by power source circuits generally designated at 55 in FIG. 3. The power source circuits 55, generally comprise a bank of power supply circuits designated at 55.1 and a battery reserve source of power designated at 55.2. The power supply circuits 55.1 generally receive power from an external alternating current source by means of a pair of input lines 56A and 56B which are energized in the preferred embodiment by means of a standard 115 volt a.c. power source. The power supply circuits 55.1 are of any type suitable for transforming the input a.c. current to a plurality of raw d.c. output voltages suitable for energizing the logic circuitry of the control system 30. The power supply circuits 55.1 also include means for providing an alternating 60 hertz output signal, and a plurality of lamp driving signals which may typically comprise ± 150 volts and a pulse train signal having ± 150 volt levels. It will be understood that the power supply circuits 55.1 may comprise any appropriate circuits capable of generating the power signals required to energize the circuits of the control system 30. The power output signals from the power supply circuits 55.1 are connected to energize the circuits within the control circuit 30 by means of a signal flow path 49.A, and the ground buss is provided to the circuits within the control circuit 30 by means of a signal flow path 49.B. It will be noted that while the signal flow paths 49.A and 49.B from the power source 55 are not illustrated in FIG. 3 as being directly connected to each of the circuit functional blocks within the control circuit 30, that it will be understood that such energizing connections are in fact present between the power supply circuits 55.1 and each of the electrical circuits within the control system 30. Throughout the specification it will be understood that the ground buss 49.B is intended to refer to the common ground buss for the logic circuits within the control system 30. The telephone equipment 50 with which the control system 30 interfaces and services, also includes a ground buss designated in FIG. 3 as 50.A. The telephone equipment ground buss 50.A will hereinafter generally be referred to as the PBX ground buss as distinguished from the logic ground buss 49.B. The battery reserve power source 55.2 includes a bank of d.c. batteries (not illustrated) operatively connected by means of a signal flow path 49.C to provide reserve d.c. power for energizing the memory circuits (to be hereinafter described) within the microprocessor 35 in the event of a power failure at the main energizing input lines 56.A and 56.B. The battery reserve circuits 55.2 are operatively connected by means of the signal flow path 49.C to the memory circuits within the microprocessor 35 such that in the event of a loss of a.c. power to the system, the battery reserve energizing power is automatically continuously provided to the memory circuits to provide any loss of data within the respective memory circuits.

Microprocessor

The microprocessor 35 may comprise any one of a plurality of microprocessor configurations well known in the art, which are operative to simulate a dedicated, stored program digital computer. Since many such microprocessors of varied construction are known in the art and can be fabricated by those skilled in the art so as to perform the control and/or monitoring functions of this invention, a detailed description of each functional block of such a microprocessor will not be belabored herein. A preferred embodiment construction of such a microprocessor will, however, be hereinafter described. In general, such a microprocessor includes: a central processing unit or circuitry for performing arithmetic, logical, manipulative and control functions upon digital information including digital instructions and data; invariable or firm program memory capabilities typically represented by read-only-memories or programmable read-only-memories used to store instructions dedicated to the performance of the control and/or monitoring functions to be performed by the control system; a working memory for reading and writing of information, typically represented by a random access volatile memory capable of storage of intermediate results or changeable digital information received by or generated within the microprocessor; timing and control circuits suitable for coordinating the transfer between and the manipulation and processing of digital information throughout the microprocessor system and for coordinating the timing interface of the microprocessor networks with external environments; and input/output capabilities for providing the input/output transfer of digital information between and among the central processor unit, the respective memories and the external environments.

More specifically, as applied to the preferred embodiment application of the control system, wherein the microprocessor operates at the nerve center of a control apparatus which monitors and/or controls a plurality of different events or Features each applicable to a large plurality of like or similar-type cases, the microprocessor must have: sufficient input/output channels to accept and transmit sensed signals and/or control information signals corresponding to each of the events or features being monitored and/or controlled by the control system 30; sufficient addressing and discriminating capabilities for distinguishably differentiating between and addressing each of the large plurality of like or similar-type entities to which the plurality of monitored and/or controlled events apply; sufficient capability to store firm or invariable programs that can be rapidly executed by the central processing circuits of the microprocessor in its monitoring and/or controlling operations being performed on and in response to the various events or features of the system; sufficient capability for storing and selectively varying in real time the plurality of events as they respectively apply to respective ones of the plurality of like or similar-type entities; and the capability of servicing the large plurality of like or similar-type entities substantially simultaneously in real time so as to avoid the loss of any information or changes to pre-existing information related to each of the plurality of events or Features controlled and/or monitored by the system; and the capability of interfacing with external peripheral input/output, display and record-keeping hardware suitable for communicating to the external environment the decision-making operations being performed by the microprocessor.

Figure 4:
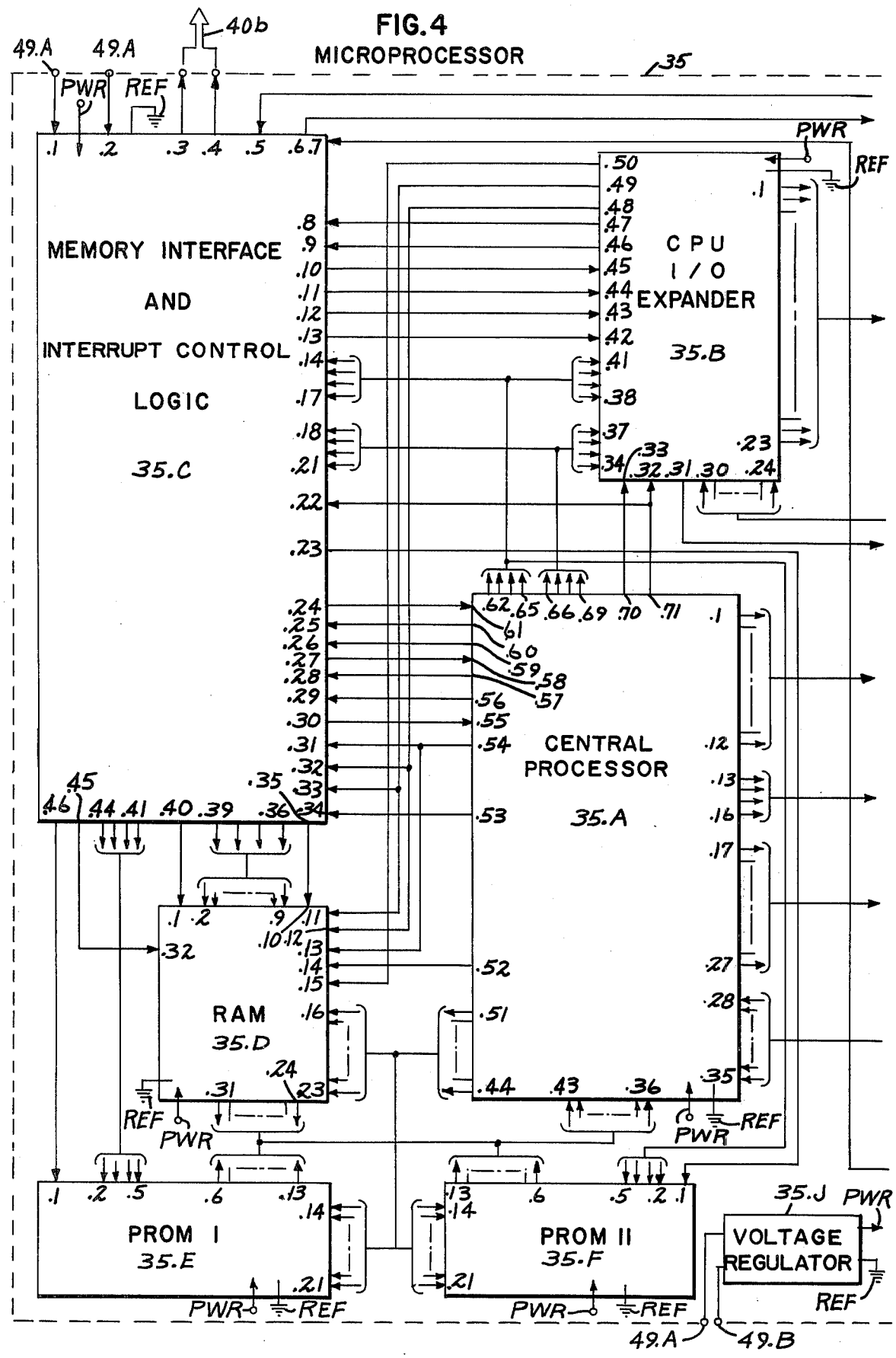
FIG. 4 is a first portion of a composite two-figure diagrammatic block diagram of the Microprocessor functional block of the preferred embodiment disclosed in FIG. 3.
Figure 5:
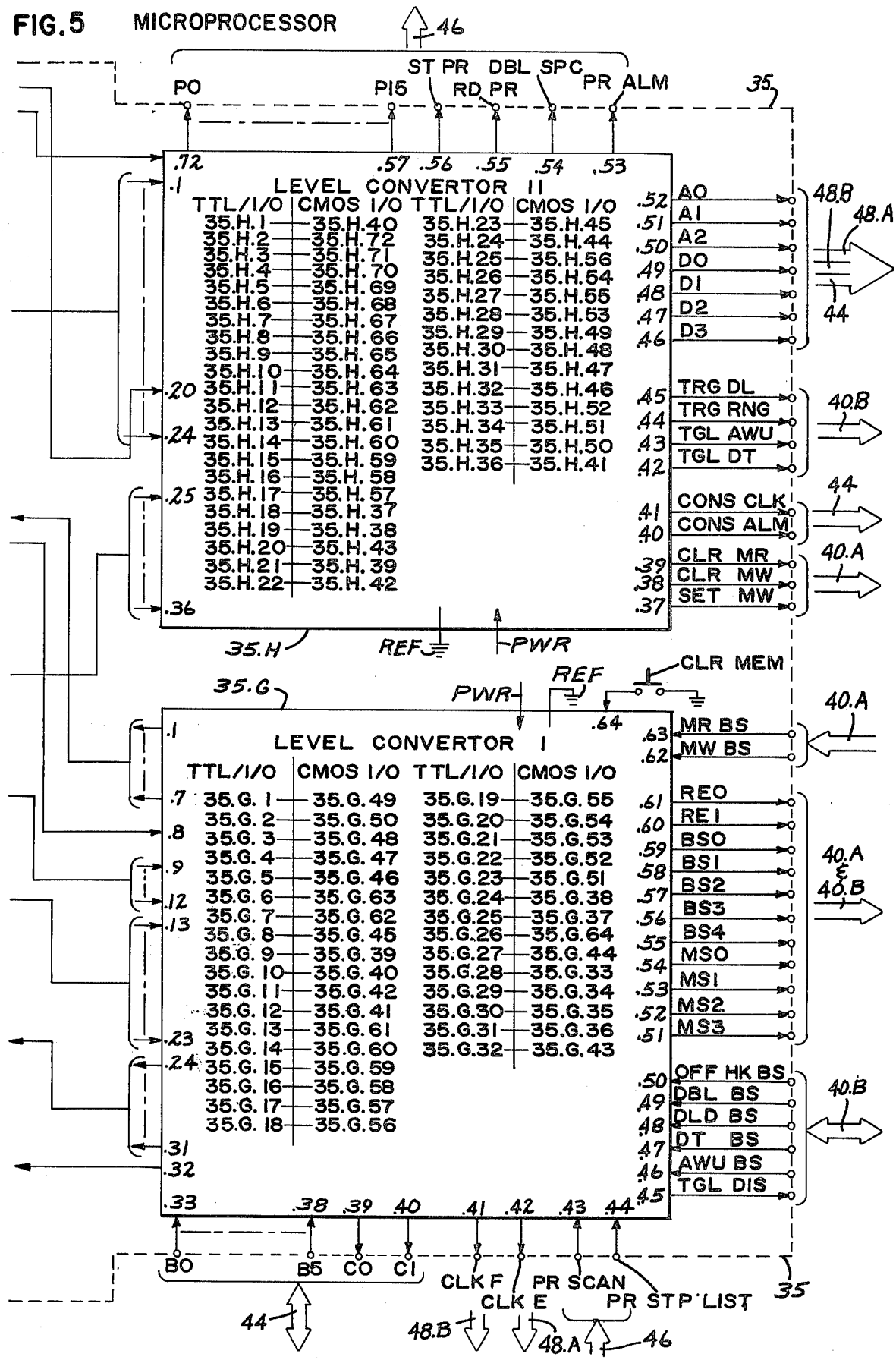
FIG. 5 is a second portion of a composite two-figure diagrammatic block diagram of the Microprocessor functional block of the preferred embodiment, disclosed in FIG. 3.

A block diagram of the microprocessor 35 of the preferred embodiment of this invention, which satisfies the above criteria is illustrated in FIGS. 4 and 5 which collectively comprise the block diagram of the microprocessor 35, and have been drafted in a manner such that the figures can be placed side by side in cooperative alignment with one another so as to provide a two-sheet composite schematic diagram of the microprocessor 35. Referring to FIGS. 4 and 5, the microprocessor 35 comprises: a Central Processor functional block 35.A, a Central Processor Input/Output Expander functional block 35.B, a Memory Interface and Interrupt Control Logic functional block 35.C, a Random Access Memory functional block 35.D, a first Programmable Read-Only Memory functional block 35.E, a second Programmable Read-Only Memory functional block 35.F, a first Level Convertor functional block 35.G, a second Level Convertor functional block 35.H, and a voltage regulator functional block 35.J. The above-identified functional block components which comprise the microprocessor 35 of the preferred embodiment, as hereinafter described in more detail, are available to those skilled in the art as standard off-the-shelf building-block circuit modules for constructing a microprocessor from Intel Corporation as individual modular components of the Intellec ® 4/MOD 40 system. Those functional blocks of the preferred embodiment microprocessor 35 which are not standard modular building-block components available to the designer will be described below in more detail. Complete schematic, functional, and theoretical descriptions of the configuration and operation of individual and cooperatively connected ones of the standard modular functional building blocks provided by Intel Corporation (in particular functional blocks 35.A, 35.B, 35.D, 35.E and 35.F of the microprocessor 35) are provided in a publication by Intel Corporation entitled intellec ® 4/Mod 40 Microcomputer Development System Reference Manual, Publication No. MCS-808-1175/500, published in 1975 and incorporated in its entirety herein by reference. For ease of future reference to applicable portions of this publication, the just-referenced publication will hereinafter be referred to as the Modular Circuit Reference Manual.

Microprocessor-Central Processing Unit

Referring to individual functional blocks of the microprocessor 35, the Central Processor functional block 35.A is a type IMM 4-43 circuit module completely described in pages 3-33 of the above-identified Modular Circuit Reference Manual and generally contains that logic necessary to serve as a general purpose microcomputer. In general, the Central Processor functional block 35.A comprises all of the classic elements of a microcomputer cooperatively connected in operative engagement upon a printed circuit card, including: a system clock, control logic, arithmetic logic, memory, memory control, addressable data inputs and addressable data outputs. The Central Processor functional block 35.A is essentially a self-contained microcomputer and performs under pre-programmed firmware control the basic control functions of the microprocessor 35. The Central Processor functional block 35.A basically controls the signal flow at all output ports of the microprocessor 35 and receives the data entering the microprocessor 35 by means of its respective input ports, controls all reading and writing of data into the RAM memories, controls reading of instructions from the PROM memories and initiates and coordinates all timing control functions throughout the microprocessor 35 and the control system 30.

The Central Processor functional block 35.A includes an Intel brand type-4040 monolithic CPU MOS circuit chip, not illustrated but completely described in the Modular Circuit Reference Manual, which basically includes an accumulator and adder, an instruction register and program counter and stack, 24 index registers, memory control circuits, an I/O buffer and the miscellaneous timing and control circuitry necessary to perform its operations. The CPU chip recognizes and responds to a basic instruction set of 60 different eight-bit binary instructions, including conditionals, binary and decimal arithmetic and input/output types of instructions. In addition to the CPU circuit, the Central Processor functional block 35.A includes 1,024 eight-bit words of fixed program read-only memory (ROM) for holding program data, including both instructions and program constants. The contents of the program memory is effectively hardwired program since the processor cannot alter the contents of the program memory, and is typically referred to as firmware. The Central Processor functional block proper also includes 320 four-bit words of working storage or read/write random access volatile memory (RAM) which the processor can use to store data and later retrieve that data as instructed by firmware program command. The working RAM memory enables the Central Processor to save intermediate results in the course of executing a program. The Central Processor functional block 35.A also includes, as below described, outputs enabling expansion of both the program (PROM) and the working (RAM) memory capabilities of the central processing function.

The circuits comprising the Central Processor functional block 35.A can be broadly classified into the following four functional groups: clock/timing; processing; memory and input/output functions. The clock and timing signals are basically distributed and coordinated by means of the processing (CPU) unit, and the CPU, memory and input/output functional blocks exchange information by means of a four-line signal flow path called the main data buss.

Microprocessor-Timing

Timing functions are performed within the Central Processor functional block 35.A by means of a crystal controlled clock oscillator which provides a nominal 5.185 MHz clock output signal. The nominal clock output signal is divided to obtain the seventh submultiple thereof, which 740.7 KHz signal is separated into two nonoverlapping phase signals which are distributed to the CPU, the memory and the input/output functional circuits of the Central Processing functional block 35.A. The CPU divides one of the two clock phase signals into one-eighth submultiples to obtain a 92.589 KHz sync signal which is distributed to the memory and the input/output functional blocks of the Central Processor 35.A. The relationship between the two clock phase signals and the sync signal establishes a basic 10.8 microsecond system cycle. The two clock phase pulse signals divide the basic system cycle into eight equal subintervals following a sync pulse, each subinterval being of 1.35 microseconds duration.

A second timing clock, located within the Memory Interface and Interrupt Control Logic functional block 35.C of the microprocessor 35 generates a 10 millisecond interrupt signal which is applied to an input port of the Central Processor 35.A. The purpose of this clock interrupt signal will be described later herein. Referring back to the eight subinterval instruction cycle, the first three consecutive subintervals or minor cycles are reserved for addressing. During the first three subintervals, the CPU transmits an address to the memory controller, specifying the memory location whose contents is to be read. In the fourth and fifth consecutive subintervals, the memory returns the contents of the addressed memory location to the CPU. The sixth, seventh, and eighth consecutive subintervals are allocated for processing responses which may include the input or output of data. The memory cycle time of the Central Processor functional block 35.A is 900 nanoseconds.

The CPU chip contains a program counter which tells the CPU where to find the next instruction in ROM memory. Under normal operation of the system, unless a "jump" instruction is encountered, the program counter will call for a consecutively ordered execution of the program instructions. This address is consecutively placed on the main data buss of the Central Processing functional block 35.A in three bytes of four bits each, during the first three consecutive subintervals of the instruction cycle. The ROM memory elements locate the proper memory address of the instruction and return consecutively two bytes of data from that memory location, to the CPU by way of the main data buss during the fourth and fifth subintervals of the instruction cycle. Therefore, the first through the fifth subintervals of the instruction cycle constitute what is typically called the "fetch" portion of the instruction cycle. The two bytes returned to the CPU during the fourth and fifth subintervals of the instruction cycle are assembled in the CPU's instruction register to make up an eight-bit instruction field. In the preferred embodiment, the four bits returned during the fourth subinterval of the instruction cycle specify the kind of operation which is to be performed (i.e. procedural, input/output, or arithmetic). The four bits returned to the CPU during the fifth subinterval of the instruction cycle, represents the modifier portion of the instruction, which may specify the location of an information byte that the CPU will need to execute the instruction, or may specify a sub-operation of the instruction group indicated by the operator specifying portion of the instruction. In most cases, the CPU executes the instruction during the remaining three subintervals of the 10.8 microsecond processor instruction cycle (i.e. during the sixth through eighth subintervals of the instruction cycle).

As will become apparent upon a more detailed description of the respective functional blocks of the microprocessor 35, the CPU circuit within the Central Processor functional block 35.A is operatively connected so as to cooperatively interface with additional external RAM and PROM memory banks. The Central Processor 35.A is also operatively connected to interface with the Central Processor Input/Output Expander functional block 35.B for increasing the input/output capabilities of the CPU circuit. Referring to FIG. 4, the Central Processor functional block 35.A has a plurality of input and output terminals respectively consecutively labeled as 35.A.1–35.A.71. To simplify the figures, only the first and the last of consecutive ones of a group of such input/output terminals which are commonly connected by means of a single signal flow path are numerically identified in the figures. It will be understood, however, that those respective intermediate terminals which are consecutively included between the first and last designated ones of such terminals, are operatively present. For simplifying the drawing, this convention will be employed throughout the figures and specification. The terminals 35.A.1–35.A.16 are output terminals for the ROM memory within the Central Processor 35.A. The ROM output terminals 35.A.1–35.A.16 represent four output ports of four bits each. Two ports of input terminals for the ROM are provided to the Central Processor 35.A by means of the input terminals 35.A.28–35.A.33, whereby each input port is a four-bit port. The output terminals 35.A.17–35.A.27, 35.A.52, 35.A.53, 35.A.57 and 35.A.60 comprise the output terminals for the RAM memory within the Central Processor 35.A. In the preferred embodiment, the RAM has four output ports of four bits each, two of which are not connected in the preferred embodiment application of the microprocessor 35.

The terminals 35.A.36–35.A.43 are input data terminals for eight bits of data from the supplemental PROM and RAM memories, and are directly connected to the memory data buss within the Central Processor 35.A. The terminals 35.A.44–35.A.51 are output terminals for carrying the lower eight bits of memory address for both the RAM and PROM memories located external of the Central Processor 35.A. The terminals 35.A.62–35.A.65 are output terminals for carrying the four upper bits of memory address for addressing the program PROM memory banks outside of the Central Processor 35.A.

The terminals 35.A.66–35.A.69 are both input and output terminals which are directly connected to the CPU circuit within the Central Processor 35.A. The CPU circuit sends and receives all of its data by means of these input/output terminals. The terminals 35.A.70 and 35.A.71 are output terminals which carry the signals for indicating whether the input/output terminals 35.A.66–35.A.69 are acting as input or as output terminals (i.e. whether they are respectively receiving or transmitting data).

The terminal 35.A.54 is an output terminal from the Central Processor which carries a signal for indicating whether the upper or lower byte of memory is being used. Terminal 35.A.55 is an input terminal for receiving a reset signal for the Central Processor during a power-up of the system. Output terminal 35.A.56 carries an active signal during the reading or writing to RAM memory that is external of the Central Processor 35.A and during the reading of PROM data tables (to be hereinafter described). Input terminal 35.A.61 receives interrupt request signals to the Central Processor from external sources. In the preferred embodiment, such interrupt signals can be originated by a power failure, by a ten millisecond clock within the memory Interface and Interrupt Control Logic 35.C, and by peripheral printer equipment.

The terminals 35.A.58–35.A.60 may be classified as memory bank select terminals and carry information for selection of the two PROM memory banks 35.E and 35.F, respectively, which are located external of the Central Processor 35.A.

The Central Processor 35.A also includes an input terminal for regulated power signals, generally designated at PWR, and a ground or reference buss terminal generally designated at REF.

A comparison of the input/output terminals of the Central Processor functional block 35.A of FIG. 4 with the pin or terminal designation of the type IMM 4-43 circuit module described in detail in the Modular Circuit Reference Manual is presented in Table 1.

Microprocessor-Random Access Memory

The Ramdom Access Memory functional block 35.D (FIG. 4) provides the Central Processor 35.A with an expanded data storage facility of 4K × 8 bits. The Ramdom Access Memory functional block 35.D is a type IMM 6-28 circuit module completely described on pages 35–42 of the above-identified Modular Circuit Reference Module, and is designed for ease of interface with the Central Processor functional block 35.A. The RAM functional block 35.D contains a main memory array, an address buffer, address logic, input and output buffers and command logic. The main memory array contains 32 individual 1K × 1 memory elements, arranged in four logical rows of eight chips each. Each row is further divided into two four-element banks. Therefore, there are 8K × 4 separately addressable locations on the RAM block 35.D. The organization and addressing structure of the RAM memory is configured to accomodate the CPU within the Central Processor 35.A, which recognizes an eight-bit instruction word. Therefore, the RAM block 35.D provides a storage capacity of 4K × 8 instructions, each consisting of two separately addressable four-bit bytes.

The RAM functional block 35.D has 32 input and output terminals respectively consecutively designated as 35.D.1–35.D.32 in FIG. 4. The input terminals 35.D.11–35.D.12 and 35.D.14–35.D.23 comprise the twelve input address terminals for receiving the addressing signals for specifying the basic 4K × 8 location. The address input terminals 35.D.11–35.D-12 and 35.D.14–35.D.15 comprise the upper four address terminals, and the input terminals 35.D.16–35.D.23 are employed to specify the lower eight address bits for addressing the RAM memory. Ten of the address inputs 35.D.11, 35.D.12 and 35.D.16–35.D.23 are directly connected through the address buffer, in parallel to all elements of the memory array. The remaining two input address terminals 35.D.14 and 35.D.15 are applied via the address buffer to the address logic circuit and are decoded to obtain a four-line row selection signal which is applied to the memory array.

The output terminals 35.D.24–35.D.31 comprise the output data terminals of the RAM block 35.D. The input terminals 35.D.13 and 35.D.10 receive input signals for specifying respectively, byte one or byte two of the selected row in the array, during write operations of the RAM memory. All eight bits of the selected row are enabled simultaneously during readout, and the eight bits of data are made available at the data output terminals 35.D.24–35.D.31 of the RAM block 35.D.

The input terminal 35.D.1 receives an external Write command and the input terminals 35.D.32 receives the Enabling signal for the RAM functional block 35.D. The byte one and byte two control signals and the Enable and Write input signals are applied to the command logic portion of the RAM functional block 35.D. The command logic enables the RAM inputs and outputs when an enabling signal is received at the input terminal 35.D.32 and uses the input signal received at the Write input terminal 35.D.1 to activate the appropriate buffer and memory control lines. A first Write input signal initiates a data Write-in, while a second level of the Write input signal causes a readout operation.

The input terminals 35.D.2–35.D.9 are data input terminals for the RAM functional block 35.D. The input and output buffer circuits within the RAM functional block 35.D handle all data passing into and out of the memory storage array within the RAM functional block 35.D. The RAM functional block 35.D further has a power input terminal for receiving regulated input power signals, generally designated as PWR, and a reference or common terminal, generally designated as REF.

A comparison of the input/output terminals of the Random Access Memory functional block 35.D of FIG. 4, with the pin or terminal designation of the type IMM 6-28 circuit module described in detail in the Modular Circuit Reference Manual is presented in Table 2.

Microprocessor-Programmable Read Only Memories

The Programmable Read Only Memory I and II functional blocks 35.E and 35.F, respectively, are identical in construction and operation to one another and are respectively of a type IMM 6-26 circuit module completely described on pages 81-86 of the above-identified Modular Circuit Reference Manual. The PROM functional blocks 35.E and 35.F expand the instruction storage capacity of the basic PROM storage available within the Central Processor functional block 35.A. Each of the PROM functional blocks 35.E and 35.F contain a plurality of erasable Programmable Read Only Memory circuits, each being erasable only by exposure to ultraviolet light and can be re-programmed as often as necessary to change the program instructions contained within the respective memories. Once the memory circuits within the PROM have been programmed, they cannot be changed by command from the Central Processor 35.A, but can be read only upon proper addressing thereof.

The PROM I and II functional blocks 35.E and 35.F, respectively, each has sixteen individual PROM memory elements, each containing 256 × 8 bits, comprising a maximum expanded storage capacity of 4096 × 8 (4K) for each functional block, giving a composite additional PROM memory of 8K. Each PROM functional block 35.E and 35.F includes a bank of sixteen 256 × 8 PROM memories, an address buffer, a chip select decoder and output buffers. The eight addressing inputs of each of the individual PROM (256 × 8) circuits are connected in parallel to the corresponding inputs of the other individual PROM circuits. Similarly, the eight data outputs of each of the individual PROM circuits share an output buss with the outputs of all of the other PROM circuits. The PROM functional blocks 35.E and 35.F receive a twelve bit address from the Central Processor 35.A during the fourth and fifth subintervals of the instruction cycle. The eight low order address bits are received by the address buffer circuit of the respective PROM functional blocks 35.E and 35.F and are directed to the common address buff connecting all of the plurality of PROM circuits within the respectively PROM memory banks. The lower eight-but component of the twelve-bit address specifies one of the 256 eight-bit locations within each of the plurality of PROM circuits. The chip select decoder circuit receives the four upper order bits of the address from the Central Processor and translates these four bits (referred to as chip select signals) to a one of sixteen output signal which is used to enable only one of the sixteen PROM memory circuits within the respective PROM functional blocks 35.E and 35.F. The enabled one of the sixteen PROM memory circuits responds by placing the contents of the addressed location on the eight data output terminals of the respective energized PROM circuit. The output buffer circuits receive the data output signal and apply the signal to the eight data output terminals of the respective PROM functional blocks 35.E and 35.F. A functional block enabling signal applied to the PROM functional blocks 35.E and 35.F enables only one of the PROM I or II functional blocks 35.E and 35.F respectively at a time.

Referring to the PROM I functional block 35.E, the input terminal 35.E.1 receives the enable signal for the entire PROM I functional block. The input terminals 35.E.2–35.E.5 receive the chip select or upper four bits of the twelve-bit address. The input terminals 35.E.14–35.E.21 receive the lower eight bits of the twelve-bit address. The output terminals 35.E.6–35.E.13 comprise the eight data output terminals of the PROM I functional block.

Referring to the PROM II functional block 35.F, the input terminal 35.F.1 receives the enable signal for the entire PROM II functional block. The input terminals 35.F.2–35.F.5 receive the chip select or upper four bits of the twelve-bit address. The input terminals 35.F.14–35.F.21 receive the lower eight bits of the twelve-bit address. The output terminals 35.F.6–35.F.13 comprise the eight data output terminals of the PROM II functional block.

Each of the PROM I and II functional blocks 35.E and 35.F respectively has a power input terminal designated as PWR, for receiving regulated power input signals, and a common or ground reference terminal generally designated at REF.

A comparison of the input/output terminals of the PROM I and II functional blocks 35.E and 35.F respectively of FIG. 4, with the pin or terminal designation of the type IMM 6–26 circuit module described in detail in the Modular Circuit Reference Manual is presented in Table 3.

Microprocessor-Input/Output Expander

The input/output capability of the Central Processor functional block 35.A is limited by four 4-line input ports and by eight 4-line output ports. The Central Processor Input/output Expander functional block 35.B is configured to expand the input/output capacity of the basic Central Processor 35.A. The CPU I/O Expander functional block 35.B is a type IMM 4-60 circuit module completely described on pages 97–106 of the above-identified Modular Circuit Reference Manual, and generally provides eight 4-line input ports and eight 4-line output ports which simulate the I/O ports normally associated with the ROM memory portion of the Central Processor functional block 35.A. All input and output ports of the Expander functional block 35.B are directly compatible with TTL logic components. In the preferred embodiment application of the I/O Expander functional block 35.B, the expanded output terminals comprise 35.B.1–35.B.23, 35.B.31, and 35.B.46–35.B.50. It will be noted that several of the output terminals available on the I/O Expander 35.B are not actually employed in the preferred embodiment application of the system 34. The input terminals to the I/O Expander 35.B comprise, in the preferred embodiment application of the system, terminals 35.B.24–35.B.30 and 35.B.42–35.B.45. Addressing identification of the input and output ports of the I/O Expander functional block 35.B is accomplished so as to eliminate any logical overlap with the addressable ports of the Central Processor 35.A.

The I/O Expander functional block 35.B further has four input terminals 35.B.38–35.B.41 for receiving a four-bit address from the chip select buss. The four-bit chip select address indicates the source or the destination of data to be transferred to or from the Central Processor 35.A. Data transfer between the I/O Expander 35.B and the Central Processor 35.A takes place by means of four input/output terminals designated as 35.B.34–35.B.37. The I/O Expander 35.B responds to command signals which originate within the Central Processor 35.A. The input terminals 35.B.33 and 35.B.32 respectively, receive IN and OUT commands, respectively. The IN and OUT commands select and synchronize the data transfer that takes place via the I/O terminals 35.B.34–35.B.37. The actual data being exchanged between the Central Processor 35.A and the I/O Expander 35.B travels between the accumulator of the CPU within the Central Processor 35.A, and the port whose address is indicated by the chip select terminal, via the four I/O terminals 35.B.34–35.B.37.

The Central Processor 35.A initiates an "input" transaction in response to a "read ROM input" instruction fetched from its program memory. The four-bit address of the input to be read is placed on the chip select buss. Simultaneously, the Central Processor 35.A will activate the IN command line to the I/O Expander block 35.B. The circuits within the I/O Expander 35.B decode the four-bit address on the chip-select input terminals 35.B.38–35.B.41, and forward the data present at the addressed port to the I/O terminals 35.B.34–35.B.37 (which data is immediately transferred to the accumulator register of the CPU within the Central Processor 35.A) in response to a strobe command received by the I/O Expander 35.B at its IN terminal 35.B.33.

A "write ROM output" instruction fetched from program memory causes the Central Processor 35.A to initiate an output transaction. The Central Processor places the current "send register control" instruction pointer address on the four lines of its chip select buss. Simultaneously, the four-bit contents of the CPU's accumulator register are placed on the four I/O lines 35.A.66–35.A.69, and the Central Processor's OUT command line (terminal 35.A.71) is pulsed in order to synchronize the transfer. Upon receipt of the chip-select four-bit address and the OUT strobe signal, the I/O Expander block 35.B decodes the port address indicated on the chip-select lines (35.B.38–35.B.41) and forwards the strobe pulse received at its OUT signal terminal 35.B.32, to the addressed port, causing that output port to latch and to hold the four-bits of data being presented at the I/O terminals (35.B.34–35.B.37), for presentation to a peripheral device. The data thus latched on the addressed output port will be available continuously at that port, until such time as it is displaced by data from a subsequent output transaction.

The I/O Expander 35.B also has a power supply input terminal generally designated as PWR, suitable for receiving a plurality of regulated power input signals, and a common or reference terminal generally designated as REF.

A comparison of the terminals of the I/O Expander functional block 35.B of FIG. 4, with the pin or terminal designation of the type IMM 4-60 circuit module described in detail in the Modular Circuit Reference Manual, is presented in Table 4.

Microprocessor-Memory Interface and Interrupt Control

The Memory Interface and Interrupt Control Logic functional block 35.C generally provides an interface between the Central Processor and Expander functional blocks 35.A and 35.B and the RAM and PROM memory modules 35.D–35.F respectively. In general, the Memory Interface and Interrupt Control Logic 35.C includes buffer registers for buffering signals between the Central Processor and Memory circuits, logical decoding and selection circuits for selecting the particular RAM and PROM memory circuits for communicating with the Central Processor and networks for generating and/or processing interrupt signals for the Central Processor 35.A. The Memory Interface and Interrupt Control Logic functional block 35.C generally has 46 input and output terminals respectively designated in FIG. 4 as 35.C.1–35.C.46. The input terminal 35.C.1 receives a 60 Hz input signal, and the input terminal 35.C.2 receives an unregulated ten volt power signal. Both the input terminals 35.C.1 and 35.C.2 are energized directly from the power output terminal 49.A of the Power Supply functional block 55.1. The terminals 35.C.3 and 35.C.4 are connected to a tape-recorder circuit used in the Automatic Wake-up feature of the preferred embodiment.

The output terminals 35.C.10–35.C.13 carry interrupt signals for the Central Processor, respectively consecutively designated as Power Down Interrupt, Fault Interrupt, ten millisecond Clock Interrupt, and Print Scan Interrupt. The input terminal 35.C.7 receives input signals from the peripheral printer equipment used in generating the Print Scan Interrupt signals. The input terminals 35.C.8 and 35.C.9 receive commands from the Central Processor 35.A for respectively clearing the ten millisecond Clock Interrupt and the Print Scan Interrupt conditions and are respectively designated as the Clear Clock and Clear Scan input signals. The output terminal 35.C.24 provides a composite interrupt signal condition signal to the Central Processor 35.A.

The input terminals 35.C.14–35.C.17 receive the four-bit chip-select address signals generated within the Central Processor 35.A. The input terminals 35.C.18–35.C.21 receive the four bits of data from the I/O data terminals of the Central Processor 35.A. The input terminal 35.C.22 receives strobe command signals from the OUT terminal 35.A.70 of the Central Processor 35.A. The input terminals 35.C.25 and 35.C.26 receive memory bank select signals from the Central Processor 35.A for selecting one of the PROM I or II memory banks 35.E and 35.F, respectively. The output terminals 35.C.46 and 35.C.23, respectively, provide the bank select enabling signals for the PROM I and II memory banks 35.E and 35.F, respectively. The output terminal 35.C.27 provides a memory select return signal to the Central Processor 35.A.

The input terminal 35.C.28 provides an input signal to the Interface and Interrupt Control Logic 35.C for enabling the RAM functional block 35.E. The input terminal 35.C.29 receives a timing input signal from the Central Processor 35.A for coordinating enabling of the RAM and PROM I and II memory functional blocks 35.D–35.F. The output terminal 35.C.45 provides an enabling output signal for the RAM functional block 35.D. The output terminal 35.C.40 provides a WRITE strobe signal for writing data into the RAM functional block 35.E. The input terminal 35.C.31 receives a byte select signal from the Central Processor 35.A for selecting the first or second byte of the selected memory address within the RAM functional block 35.D, and the output terminal 35.C.35 transmits the byte select information to the RAM functional block 35.D. The output terminals 35.C.36–35.C.39 carry the buffered data from the I/O terminals 35.C.18–35.C.21 which is received from the Central Processor 35.A.

The input terminals 35.C.32 and 35.C.33 receive two bits of input data from one of the output ports of the ROM within the Central Processor 35.A. The output ports 35.C.41–35.C.44 carry the upper four bits or chip select address information for addressing the individual memory circuits within the PROM I functional block 35.E, and can be selected as hereinafter described, to carry the data from the input ports 35.C.32 and 35.C.33.

The input terminal 35.C.34 receives an input signal from one of the output ports of the RAM within the Central Processor functional block 35.A and provides in response thereto a Console Alarm signal at the output terminal 35.C.6. The output terminal 35.C.30 provides a reset input pulse to the Central Processor 35.A. The input terminal 35.C.5 receives a Toggle AWU signal from the Central Processor functional block 35.A for energizing the pre-recorded Automatic Wake-Up Message.

The Memory Interface and Interrupt Control Logic functional block 35.C further has a power supply input terminal generally designated as PWR for receiving regulated voltage input signals and a common or reference terminal generally designated as REF. A more detailed schematic diagram of the Memory Interface and Interrupt Control Logic functional block 35.C is disclosed in FIG. 6. Referring thereto, the input terminal 35.C.34 is connected by means of a retriggerable timer circuit 200 to the Console Alarm output terminal 35.C.6. The retriggerable timer circuit 200 operates to monitor pulses received at the input terminal 35.C.34, and provides an output signal to the Console Alarm output terminal 35.C.6 only if the rate of receipt of pulses from the CPU, by means of the input terminal 35.C.34 falls below a specified predetermined rate.

It will be understood that the appropriate regulated logic power supply inputs are provided to the circuit elements within the Memory Interface and Interrupt Control Logic 35.C from the power input terminal PWR. It will also be understood that the appropriate common or reference connections are provided to each of the circuit elements throughout the functional block 35.C from the Reference or common input terminal REF.

The input terminal 35.C.5 is connected to provide an input signal to a timer network 202 having a relay driver output network. The output terminals of the timer 202 are connected to energize the coil (a) of a relay 203. The timer 202 provides an output signal for energizing the relay coil 203(a) in response to a Toggle AWU signal received from the Central Processor 35.A. The relay 203 has a normally open contact 203(b) which is movable to a closed position upon energization of the relay coil 203(a) to complete the circuit between the output terminals 35.C.3 and 35.C.4. The closed circuits between the output terminals 35.C.3 and 35.C.4 enables energization of a peripheral tape recording apparatus containing pre-taped sound recordings for the Automatic Wake-up feature.

The input terminal 35.C.1 is directly applied to the input of a frequency synthesizer network 205. The input terminal 35.C.1 receives a 60 Hz input signal and provides a ten millisecond output signal to the "clock" input terminal of a flip-flop 206. The flip-flop 206 further has a "clear" or reset input and a Q output terminal. The "set" input terminal of the flip-flop 206 is connected to a positive voltage level. The flip-flop 206 may be of a D-type 7474 circuit well-known in the art having its D input terminal tied to a logical high level. The input terminal 35.C.8 is directly connected to the "clear" or reset input terminal of the flip-flop 206. The frequency synthesizer 205 in combination with the flip-flop 206 provide a Clock Interrupt output signal once every ten milliseconds at the Q output terminal of the flip-flop 206. The Q output terminal is directly connected to the Clock Interrupt output terminal 35.C.12 and is also connected to a first input terminal (a) of an OR gate 207. The OR gate 207 further has second and third input terminals 207(b) and (c), respectively, and a signal output terminal 207(d). The output terminal 207(d) of the OR gate 207 is connected by means of an inverter 208 to the Interrupt output terminal 35.C.24.

The input terminal 35.C.7, which receives the Print Scan input signal is directly connected to the Clock input terminal of a flip-flop 210. The flip-flop 210 further has a clear or reset input terminal (CLR) and a Q output terminal. The clear (CLR) input terminal of the flip-flop 210 is directly connected to the Clear Scan input terminal 35.C.9. The flip-flop 210 may be of a standard D-type 7474 having its D input terminal connected to a logical high, and is employed to generate the Printer Scan Interrupt output signal in response to an input clock pulse from the input terminal 35.C.7. The Print Scan Interrupt signal is applied by means of the Q output of the flip-flop 210 to the second input terminal 207(b) of the OR gate 207 and is also directly applied to the Print Scan Interrupt output terminal 35.C.13.

The input terminal 35.C.2 is directly connected to the input terminal of the threshold detector network 212. The threshold detector network 212 operates to sense the voltage level of the unregulated ten volt d.c. signal applied to the input terminal 35.C.2 and to provide a Power Interrupt signal at its output whenever the sensed input voltage falls below a predetermined threshold level. This condition would represent a failure or an interruption in the power being supplied to the circuits within the Microprocessor 35. The Power Interrupt output signal from the threshold detector 212 is directly applied to the third input terminal 207(c) of the OR gate 207 and is also directly applied to the Power Interrupt output terminal 35.C.10. The Power Interrupt output signal is also connected by means of a time delay circuit 214 to a first input terminal 216(a) of a NAND gate 216. The time delay circuit is operative to inhibit writing into RAM after the Power Down Interrupt (to be hereinafter described) is serviced. The NAND gate further has second and third input terminals 216(b) and (c) respectively and an output terminal 216(d). The output terminal 216(d) of the NAND gate 216 is directly connected to the Write output terminal 35.C.40.

The input terminal 35.C.22 applies a received OUT input signal and applies that received strobe signal by means of an inverter 217 to the second input terminal 216(b) of the NAND gate 216. The input terminal 35.C.29 is connected to directly provide an input signal received thereat to the third input terminal 216(c) of the NAND gate 216. The input terminal 35.C.29 is also directly connected to provide an input signal to the first input terminal 218(a) of an AND gate 218. The AND gate 218 further has a second input terminal 218(b) and a signal output terminal 218(c). The second input terminal 218(b) of the AND gate 218 is directly connected to the input terminal 35.C.28, and the signal output 218(c) of the AND gate 218 is directly connected to the RAM enabling output terminal 35.C.45.

The signal output 218(c) of the AND gate 218 is also connected by means of an inverter 219 to a first signal input 220(a) of an AND gate 220. The AND gate 220 further has a second signal input 220(b) and a signal output terminal 220(c). The signal output terminal 220(c) is directly connected to the output terminal 35.C.46 for enabling the PROM I functional block 35.E. The input terminal 35.C.29 is also directly connected to a first signal input 221(a) of an OR gate 221. The OR gate 221 further has a second signal input 221(b) and a signal output terminal 221(c). The signal output terminal 221(c) is directly connected to the second signal input terminal 220(b) of the AND gate 220.

The input terminals 35.C.16 and 35.C.17 are respectively directly connected to the input terminal of an OR gate 222. The OR gate 222 further has a signal output terminal directly connected to a first input terminal 223(*a*) of an AND gate 223. The AND gate 223 further has a second signal input 223(*b*) and a signal output terminal 223(*c*) which is directly connected to the second input terminal 221(*b*) of the OR gate 221. The input terminal 35.C.25 is directly connected to a first input terminal 225(*a*) of an OR gate 225. The OR gate 225 further has a second input terminal 225(*b*) and a signal output terminal 225(*c*) which is directly connected to the output terminal 35.C.27. The input terminal 35.C.25 is also directly connected to the "reset" input of an RS Latch network 226. The RS Latch further has a "set" input, and a pair of output terminals, Q and $\overline{Q}$. The RS Latch 226 is operative to provide a logical low signal at the Q output when the latch is cleared by means of its clear or reset input terminal, and to provide a logical high signal at its Q output terminal upon receipt of a logical high input signal at its set input. The input terminal 35.C.26 is directly connected to the second input terminal 225(*b*) of the OR gate 225 and is also directly connected to the "set" input terminal of the RS Latch 226. The $\overline{Q}$ output terminal of the RS Latch 226 is directly connected to the second input terminal 223(*b*) of the AND gate 223.

The Q output terminal of the RS Latch 226 is directly connected to a first signal input 228(*a*) of an AND gate 228. The AND gate 228 further has a second signal input 228(*b*) and a signal output terminal 228(*c*) which is directly connected to the output terminal 35.C.23, for providing an enabling select signal to the PROM II functional block 35.F. The input terminal 35.C.29 is also connected by means of an invertor 230 to the second input terminal 228(*b*) of the AND gate 228. And is further connected by means of the inverter 230 to a select input terminal (*t*) of a data selector circuit 232. The data selector circuit further has a first set of input ports 232(*a*1, *a*2, *a*3, and *a*4) and a second set of input ports 232(*b*1, *b*2, *b*3, and *b*4). The data selector 232 also has a set of four output terminals 232(*c*1, *c*2, *c*3, and *c*4). The first set of input terminals 232(*a*1–*a*4) are respectively consecutively directly connected to the input terminals 35.C.14–35.C.17, and directly receive the four-bit chip-select input signals presented to those terminals. The first two input terminals of the second input port 232(*b*1 and *b*2) are tied to the common or reference potential, and the second two input terminals 232(*b*3 and *b*4) of the second input port of the data selector 232 are respectively directly connected to the input terminals 35.C.32 and 35.C.33, respectively, of the functional block 35.C. The data selector 232 is in the preferred embodiment of the standard type 74157 data selector circuit which selects for presentation at its output terminals 232(*c*1–*c*4) either the input presented at its first set of input terminals 232(*a*1–*a*4) or its second set of input terminals (232(*b*1–*b*4) depending upon the state of the select signal applied to the select input 232(*t*) of the circuit. The output terminals 232(*c*1–*c*4) of the data selector circuit 232 are respectively directly connected to the memory address output terminals 35.C.44–35.C.41, respectively.

Figure 6:
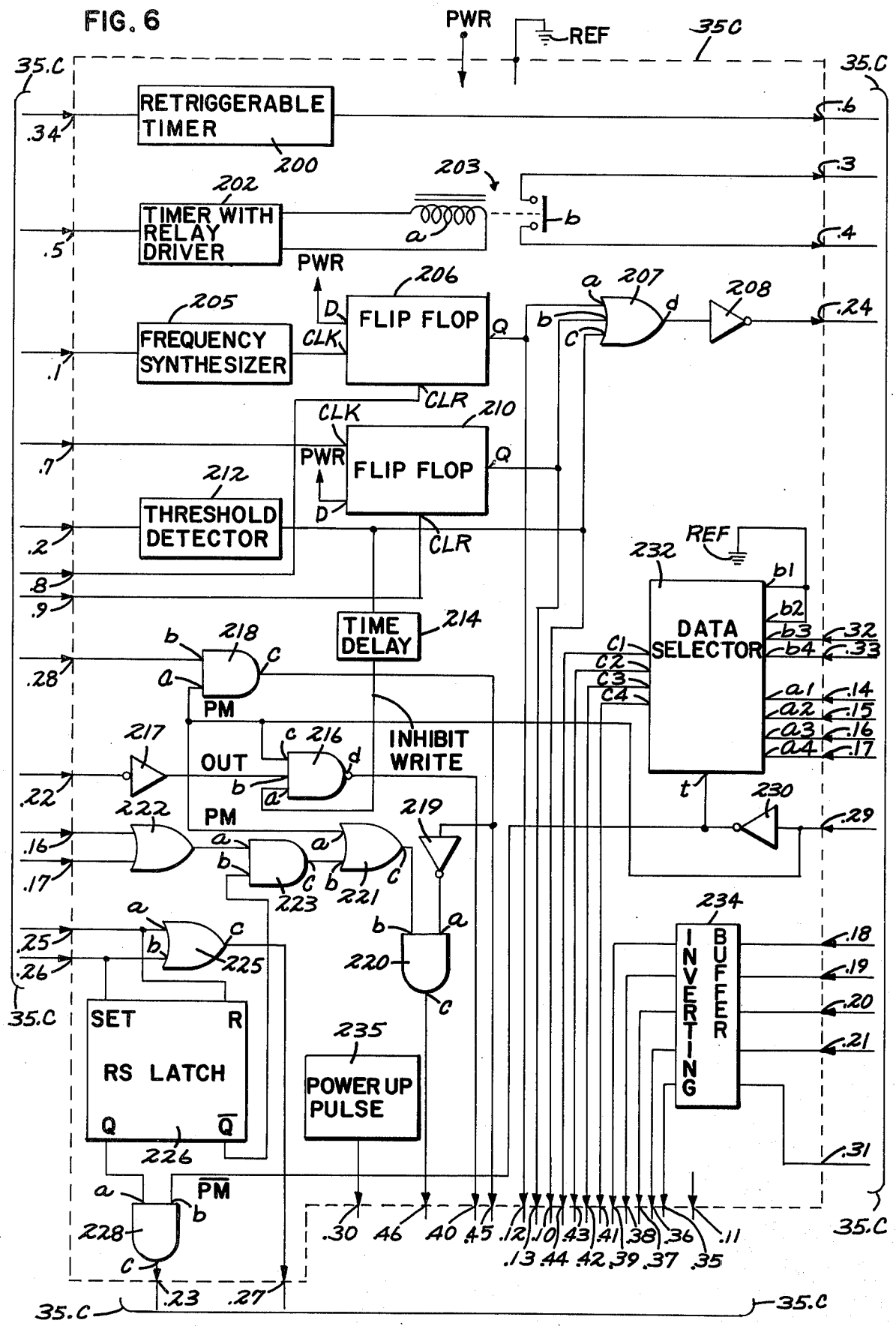
FIG. 6 is a schematic diagram of the Memory Interface and Interrupt Control Logic functional block of the Microprocessor of the preferred embodiment, disclosed in FIG. 4.

The four-bit I/O input terminals 35.C.18–35.C.21 are inverted and buffered by an inverting buffer network 234, and are respectively applied to the Data Signal output terminals 35.C.39–35.C.36, respectively of the functional block 35.C. The input terminal 35.C.31 carrying the byte select signal from the Central Processor 35.A is buffered and inverted by the inverting buffer network 234 and is applied thereby to the output terminal 35.C.35 of the functional block 35.C. The output terminal 35.C.11 is illustrated in FIG. 6, but is not connected in the preferred embodiment application of the control system.

A pulse generator circuit 235 provides a single reset output pulse to the output terminal 35.C.30 upon a power-up sequence of the control system 30.

Referring to FIG. 4, the voltage regulator network 35.J has a pair of input terminals connected to receive the raw d.c. power and common buss signals from the output terminals 49.A and 49.B of the power supply 55.1. The voltage regulator 35.J includes those regulating circuits required for providing the regulated d.c. output signals at its power output terminal (PWR) to the logical circuits within the microprocessor. The regulated d.c. signals are referenced to the voltage level of the common or reference output terminal of the voltage regulator designated as REF. The 60 Hz signal applied to the input terminal 35.C.1 of the Memory Interface and Interrupt Control Logic functional block 35.C and the raw d.c. signal level applied to the input terminal 35.C.2 of the Interface and Interrupt Control Logic network 35.C originate at the output power terminal 49.A of the main power supply circuit 55.1 (see FIG. 1).

Microprocessor-Level Convertors

FIG. 5 illustrates the first and second Level Convertor networks 35.G and 35.H, respectively, are operative to buffer the signal flow between the TTL circuits of the Microprocessor 35, disclosed in FIG. 4, and the CMOS peripheral drive and logic control circuits. A detailed description of the Level Convertor functional blocks 35.G and 35.H will not be pursued herein, it being understood that the requisite buffering circuits required to provide the voltage level changes to convert a signal from TTL to CMOS and vice versa between any respective input and output terminal of the Level Convertors are provided. The correlations between the respective input terminals and output terminals for each of the Level Convertors I and II (35.G and 35.H, respectively) are indicated in tabular form in FIG. 5 within the functional block outlines of the respective Level Convertor functional blocks.

The Level Convertor I 35.G has a plurality of 32 input/output terminals which interface with the TTL Logic circuits of the Microprocessor 35; these input-/output terminals are respectively consecutively indicated as 35.G.1–35.G.32. The input/output terminals of the Level Convertor I 35.G which interface with the peripheral CMOS networks comprise the 32 terminals designated as 35.G.33–35.G.64. The TTL upper terminals 35.G.1–35.G.7 are respectively consecutively connected to the ROM input terminals 35.B.24–35.B.30 of the Central Processor I/O Expander functional block 35.B. The signal output terminal 35.B.31 is directly connected to provide the signal input to the input terminal 35.G.8. The Central Processor ROM output terminals 35.A.13–35.A.16, representing one output port of the ROM memory within the Central Processor 35.A are respectively directly connected to the signal input terminals 35.G.9–35.G.12. The signal output terminals 35.A.17–35.A.27 comprising three output ports of the RAM memory within the Central Processor functional block 35.A are respectively directly connected to the signal input terminals 35.G.13–35.G.23 of the Level Convertor I 35.G. The signal output terminals 35.G.24–35.G.31 are respectively directly connected to the input terminals 35.A.28–35.A.35 of the Central Processor 35.A, which comprise two four-bit input ports of the ROM memory within the Central Processor 35.A. The signal output terminal 35.G.32 is directly connected to the input terminal 35.C.7 of the Memory Interface and Interrupt Control Logic functional block 35.C.

The CMOS interfacing output terminals 35.G.33–35.G.64 of the Level Converter I 35.G are labeled in FIG. 5 by the titles of the signals respectively carried thereby. The input terminals 35.G.33–35.G.38 receive input signals from the keyboard of the respective consoles communicating with the Microprocessor 35, and are respectively consecutively labeled as B0-B5. The output terminals 35.G.39 and 35.G.40 respectively carry a two-bit binary encoded console select signal for selecting one of the four peripheral consoles of the preferred embodiment, and are respectively labeled as C0 and C1. The output terminals 35.G.33–35.G.40 are connected to the consoles 37 by means of the signal flow path 44.

The output terminal 35.G.41 of the Level Convertor I 35.G is designated as a CLK F and provides the clock input signal to the room status display scanners 39.B by means of the signal flow path 48.B. The output terminal 35.G.42 is labeled as CLK E and provides the clock input signals to the message waiting display scanners 39.A by means of the signal flow path 48.A.

The input terminals 35.G.43 and 35.G.44 receive input signals from the peripheral printer 38 by means of the signal flow path 36 and are respectively labeled as PR SCAN (Printer Scan) and PR STP LIST (Printer Stop List).

The output terminal 35.G.45 and the input terminals 45.G.46–45.G.50 are connected to the Second Set of mother boards 70 by means of the signal flow path 40.B. The output terminal 35.G.45 carries the toggle disable (TDL DIS) signal. The input terminal 35.G.46 carries the Automatic Wake-Up buss (AWU BS) signal. The input terminal 35.G.47 carries the dialtone buss (DT BS) signal. The input terminal 35.G.48 carries the dialed buss (DLD BS). The input terminal 35.G.49 carries the disable buss (DBL BS) signal. The input terminal 35.G.50 carries the off hook buss (OFF HK BS).

The output terminals 35.G.51–35.G.61 are each respectively connected to both the First and Second Sets of mother boards 60 and 70, respectively, by means of the signal flow paths 40.A and 40.B. The output terminals 35.G.54–35.G.51 carry a four-bit binary Mother Board select signal for selecting one of the sixteen mother boards (60.1–60.16 and 70.1–70.16) within the First and Second Sets (60 and 70), respectively, of such Mother Boards (see FIG. 3). The output terminals 35.G.54–35.G.51 are respectively consecutively labeled as: MS0, MS1, MS2, MS3. The output terminals 35.G.59–35.G.55 respectively carry a five-bit binary signal for selecting one of thirty-two Room-Block Cards mounted to each of the sixteen Mother Boards within each of the First and Second Sets (60 and 70 respectively) of the Mother Boards. The output terminals 35.G.59–35.G.55 are respectively consecutively labeled as: BS0, BS1, BS2, BS3, and BS4. The output terminals 35.G.61 and 35.G.60 respectively carry a two-bit binary signal for selecting one of four room circuits upon each of the thirty-two Room Block cards mounted to each of the sixteen Mother Boards within the First and Second Sets (60 and 70 respectively) of such Mother Boards. The output terminals 35.G.61 and 35.G.60 are respectively labeled as RE0 and RE1.

The input terminals 35.G.62 and 35.G.63 are connected to receive input signals from the First Set of mother boards 60 by means of the signal flow path 40.A. The input terminal 35.G.62 carries the message waiting buss (MW BS) signal, and the input terminal 35.G.63 carries the call-counting or message register buss (MR BS) signal. The input terminal 35.G.64 receives a manually operable signal for clearing the memory and is entitled CLR MEM.

The Level Convertor II 35.H has a plurality of 36 input/output terminals which interface with the TTL Logic circuits of the Microprocessor 35; these input/output terminals are respectively consecutively indicated as 35.H.1–35.H.36. The input/output terminals of the Level Convertor II 35.H which interface with the peripheral CMOS networks comprise the thirty-six terminals respectively designated as 35.H.37–35.H.72.

The input terminal 35.H.1 is directly connected to the output terminal 35.C.6 of the Memory Interface and Interrupt Control Logic functional block 35.C. The input terminal 35.H.2–35.H.24 are respectively consecutively connected to the ROM output terminals 35.B.1–35.B.23 of the Central Processor I/O Expander functional block 35.B. In addition, the input terminal 35.H.20 is connected to the input terminal 35.C.5 of the Interface and Interrupt Control functional block 35.C. The Central Processor 35.A ROM output terminals 35.A.1–35.A.12 are respectively consecutively connected to provide input signals to the input terminals 35.H.25–35.H.36.

The output terminals which directly communicate with the CMOS peripheral hardware of the preferred embodiment are labeled in FIG. 5 according to the common name of the signals which they carry. The output terminals 35.H.37–35.H.39 are connected by means of the signal flow paths 40.A to the First Set of Mother Boards 60. The output terminal 35.H.37 carries the Set Message Waiting (SET MW) signal. The output terminal 35.H.38 carries the Clear Message Waiting (CLR MW) signal. The output terminal 35.H.39 carries the Clear Message Register (CLR MR) signal.

The output terminals 35.H.40 and 35.H.41 carry signal control information by means of the signal flow path 44 to the four consoles 37 of the preferred embodiment. The output terminal 35.H.40 carries the console alarm (CONS ALM) signal, and the output terminal 35.H.41 carries the console clock (CONS CLK) signal.

The output terminals 35.H.42–35.H.45 are respectively connected by means of the signal flow path 40.B to carry various control signals from the Central Processor 35.A to the Second Set of Mother Boards 70. The output terminal 35.H.42 carries the Toggle Dialtone (TGL DT) signal. The output terminal 35.H.43 carries the Toggle Signal for the Automatic Wake-Up feature (TGL AWU). The output terminal 35.H.44 carries the triggering signal for ringing a phone and is labeled as the Trigger Ring (TRG RNG) signal. The output terminal 35.H.45 carries the Trigger Dial (TRG DL).

The output terminals 35.H.46–35.H.52 are each respectively applied to the Consoles by means of the signal flow path 44, to the Message Waiting Display Scanners 39.A by means of the signal flow path 48.A, and to the Room Status Display Scanners 39.B by means of the signal flow path 48.B. The output terminals 35.H.49–35.H.46 carry four bits of display data and are respectively consecutively labled as D0, D1, D2, and D3. The output terminals 35.H.52–35.H.50 carry a three-bit encoded digit select output signal and are respectively consecutively labeled as A0, A1, and A2.

The output terminals 35.H.53–35.H.72 are respectively connected by means of the signal flow path 46 to provide signal input information to the printer 38. The printer (described in more detail hereinafter) is a sixteen column printer in the preferred embodiment and requires one signal input for each of the sixteen columns. These sixteen control signals are carried by the output terminals 35.H.72–35.H.57. The output terminals 35.H.72–35.H.57 are consecutively respectively labeled as P0–P15. The output terminals 35.H.53–35.H.56 carry special control instructions for the printer. The output terminal 35.H.53 carries a Printer Alarm (PR ALM) signal. The output terminal 35.H.54 carries a Double Space (DBL SPC) signal. The output terminal 35.H.55 carries a Red PRint (RD PR) signal. The output terminal 35.H.56 carries a Start Print (ST PR) output signal.

Each of the Level Convertor I and II functional blocks 35.G and 35.H respectively, also has a power input terminal generally designated as PWR suitable for receiving regulated d.c. voltage signals, and a common or reference input terminal generally designated at REF. The PWR and the REF input terminals are respectively connected to the PWR and REF output terminals of the voltage regulator 35.J within the Microprocessor 35.

Microprocessor-Interconnections

Referring to FIG. 4, the signal flow paths between the various TTL-type functional blocks within the Microprocessor 35 are generally as follows. The output terminal 35.B.47 provides a Clear Clock input signal to the input terminal 35.C.8. The output terminal 35.B.46 provides a Clear Scan input signal to the input terminal 35.C.9. The output terminal 35.C.10 provides a Power Down Interrupt signal to the input terminal 35.B.45. The output terminal 35.C.11 provides a Fault Interrupt signal to the input terminal 35.B.44. The output terminal 35.C.12 provides a ten millisecond Clock Interrupt signal to the input terminal 35.B.43. The output terminal 35.C.13 provides a Print Scan Interrupt signal to the input terminal 35.B.42.

The four-bit data from the I/O terminals (35.A.66-35.A.69) of the Central Processor 35.A is provided to both the four I/O input terminals 35.B.37–35.B.34 respectively of the Expander functional block 35.B and also to the four I/O input terminals 35.C.18–35.C.21 of the Memory Interface and Interrupt Control Logic functional block 35.C. The four-bit chip select address data provided on output terminals 35.A.62–35.A.65 of the Central Processor 35.A is provided to both the Expander functional block 35.B and to the Interface and Interrupt Control Logic functional block 35.C by means of the input terminals 35.B.41–35.B.38 and 35.C.14–35.C.17 respectively.

The IN output signal from the Central Processor output terminal 35.A.70 is applied to the input terminal 35.B.33 of the Expander functional block 35.B. The OUT output signal from the output terminal 35.A.71 of the Central Processor is directly applied to the input terminal 35.B.32 of the Expander network and is also applied to the input terminal 35.C.22 of the Interface and Interrupt Control network.

The primary Interrupt output signal from the functional block 35.C is supplied by means of the output terminal 35.C.24 to the input terminal 35.A.61 of the Central Processor 35.A. The PROM I and II (35.E and 35.F) select signals from the Central Processor 35.A are directly respectively applied by means of the output terminal 35.A.60 and 35.A.59, respectively, to the input terminals 35.C.25 and 35.C.26 respectively of the Memory Interface and Interrupt Control Logic functional block 35.C. The memory select return signal from the output terminal 35.C.27 of the functional block 35.C is directly applied to the input terminal 35.A.58 of the Central Processor. The output terminal 35.A.57 of the Central Processor is directly connected to the input terminal 35.C.28 of the Memory Interface and Interrupt Control Logic functional block. The PM timing and control signal is carried from the output terminal 35.A.56 of the Central Processor to the input terminal 35.C.29 of the functional block 35.C. The reset signal generated within the Memory Interface and Interrupt Control Logic functional block 35.C is carried from its output terminal 35.C.30 to the input terminal 35.A.55 of the Central Processor 35.A.

The RAM Byte Select output signal from the 35.A.54 output terminal of the Central Processor is directly applied to the input terminal 35.C.31 of the functional block 35.C and is also directly applied to the input terminal 35.D.13 of the RAM memory block 35.D. The RAM output terminal 35.A.52 of the Central Processor is directly applied to the input terminal 35.D.14 of the RAM memory module 35.D. The output terminal 35.B.50 of the Expander functional block 35.B is directly connected to provide an input signal to the input terminal 35.D.15 of the RAM memory functional block. The output terminal 35.B.49 of the I/O Expander functional block is directly applied to the input terminal 35.C.33 of the functional block 35.C and is also directly applied to the input terminal 35.D.11 of the RAM memory functional block 35.D. The output terminal 35.B.48 is directly applied to the input terminal 35.C.32 of the functional block 35.C and is also directly applied to the input terminal 35.D.12 of the RAM memory functional block 35.D.

The output terminal 35.C.23 of the Memory Interface functional block 35.C is directly applied to the input terminal 35.F.1 of the PROM II functional block 35.F. The output terminal 35.C.46 of the Memory Interface functional block 35.C is directly applied to the input terminal 35.E.1 of the PROM I functional block 35.E. The for-bit Memory Address select terminals 35.C.41–35.C.44 of the Memory Interface functional block 35.C are respectively directly connected to the four upper address input terminals 35.E.5–35.E.2 of the PROM I functional block 35.E. The four upper memory address input terminals 35.F.2–35.F.5 of the PROM II functional block 35.F are respectively directly connected to receive input signals from the chip select output terminals 35.A.62–35.A.65 of the Central Processor 35.A.

The eight Data Input terminals 35.A.36–35.A.43 of the Central Processor 35.A are directly connected to receive input data from each of the following functional blocks: from data output terminals 35.F.6–35.F.13 of the PROM II functional block 35.F; from data output terminals 35.E.13–35.E.6 of the PROM I functional block 35.E; and from data output terminals 35.D.31–35.D.24 of the RAM memory functional block 35.D. The Central Processor 35.A transmits eight bits of lower memory address information from its output terminals 35.A.51–35.A.44 respectively to the following functional blocks: to the lower address input terminals 35.D.16–35.D.23 of the RAM memory functional block 35.D; to the eight lower address input ports 35.F.21–35.F.14 of the PROM II functional block 35.F; and to the eight lower address input ports 35.E.21–35.E.14 of the PROM II functional block 35.E.

The output terminal 35.A.53 of the Central Processor provides an input signal to the input terminal 35.C.34 of the functional block 35.C. The output terminal 35.C.35 of the Memory Interface functional block 35.C. provides a Byte Select input signal to the input terminal 35.D.10 of the RAM memory functional block 35.D. The four data output terminals 35.C.36–35.C.39 of the Memory Interface and Interrupt Control Logic functional block 35.C are connected to provide eight bits of input data to the RAM memory functional block 35.D by means of the input terminals 35.D.9–35.D.2. Each of the respective output terminals 35.C.36–35.C.39 is respectively connected in parallel to two consecutive ones of the input ports 35.D.9–35.D.2 respectively. The output terminal 35.C.40 of the Memory Interface functional block 35.C is connected to provide a WRITE input signal to the terminal 35.D.1 of the RAM memory functional block 35.D. The output terminal 35.C.45 of the Memory Interface functional block 35.C is directly connected to provide an enabling input signal to the input terminal 35.D.32 of the RAM memory functional block 35.D.

The input terminals 35.C.1 and 35.C.2 respectively of the Memory Interface and Interrupt Control Logic functional block 35.C are connected to receive a 60 Hz and a ten volt raw d.c. input signal respectively from the power output terminal 49.A of the power supply network 55.1. The output terminals 35.C.3 and 35.C.4 are connected by means of the signal flow path 40.B to a Wake-up Message Tape apparatus and form a part of the Automatic Wake-up feature of the preferred embodiment.

Message Register/Message Waiting Features

Figure 7:
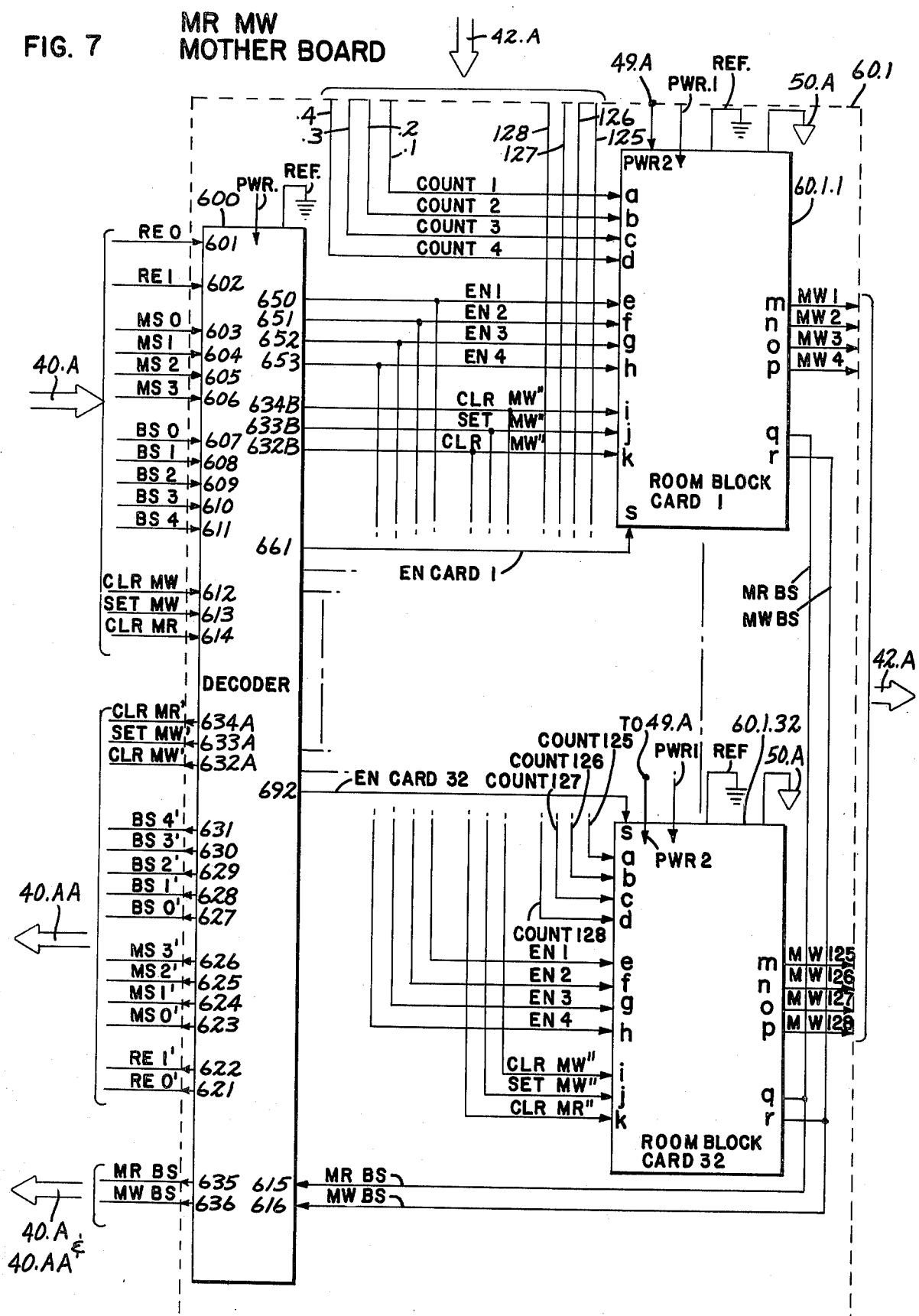
FIG. 7 is a schematic diagram of a Mother Board of a First Set of such Mother Boards for the Message Register and Message Waiting Features of the preferred embodiment, disclosed in FIG. 3.

Referring to FIGS. 3, 5, and 7, those plurality of output terminals from the Level Convertors I and II (35.G and 35.H respectively) which are connected to the signal flow paths 40.A are operatively connected by means of the signal flow path 40.A to a plurality of input/output terminals of the first Mother Board 60.1 of the First Set of such Mother Boards. The First Set (60) of Mother Boards provide the input/output monitoring and control circuitry that communicates and responds to the Microprocessor 35 commands for performing the Feature A 36.A (Call Counting) and the Feature D 36.D (Message Waiting) of the preferred embodiment application of the system 30 The number of Mother Boards within the First Set 60 of such Mother Boards required depends upon the number of like-kind of signals to be monitored. In the preferred embodiment, the like-number type of signals depends upon the number of phones or rooms within the hotel/motel in which the control system 30 is installed. In the preferred embodiment, the First Set 60 of Mother Boards contains sixteen such Mother Boards (60.1–60.16). As will become apparant upon a more detailed description of the respective Mother Boards within the First Set 60 of Mother Boards, each such Mother Board is capable of handling 128 rooms.

Referring to FIG. 7, the functional block diagram of the first Mother Board 60.1 within the First Set 60 of Mother Boards is schematically illustrated. It will be understood that each of the sixteen mother boards within the First Set 60 of such Mother Boards is identical in function and structure to that of the first such Mother Board 60.1. The signal flow path 40.A is connected to provide input signals to a Decoder network 600. The Decoder network 600 has a plurality of input terminals 601–616 consecutively. The RE0 and the RE1 signals from the Microprocessor 35 are respectively directly applied to the input terminals 601 and 602 of the Decoder. The MS0–MS3 output signals from the Microprocessor 35 are respectively consecutively applied to the input terminals 603–606 respectively. The BS0–BS4 signal outputs consecutively from the Microprocessor 35 are respectively applied to the input terminals 607–611 respectively. The CLR MW signal output from the Microprocessor 35 is applied to the input terminal 612 of the Decoder. The SET MW output signal from the Microprocessor 35 is applied to the input terminal 613 of the Decoder. The CLR MR output signal from the Microprocessor 35 is directly applied to the input terminal 614 of the Decoder 600.

The Decoder 600 has a plurality of output terminals 621–631 and 633A–634A consecutively to which the Decoder 600 applies those input signals provided to the input terminals 601–614 respectively after buffering the input signals, as hereinafter described. The output terminals 621–634A are also output terminals of the first Mother Board 60.1 and are applied by means of the signal flow path 40.A.A as input signals to the Second Mother Board 60.2 of the First Set 60 of Mother Boards. The Decoder 600 also has a pair of output terminals 635 and 636 also forming output terminals of the Mother Board 60.1, which apply the signals presented at these terminals by means of the signal flow path 40.A to the Microprocessor 35, and by means of the signal flow path 40.A.A to the Second Mother Board 60.2.

The Decoder 600 further has a plurality of buffered signal output terminals 632B–634B, a plurality of output terminals 650–653 for carrying room circuit enabling output signals, and a plurality of 32 output terminals 661–692 for providing room block card enabling output signals.

Figure 8:
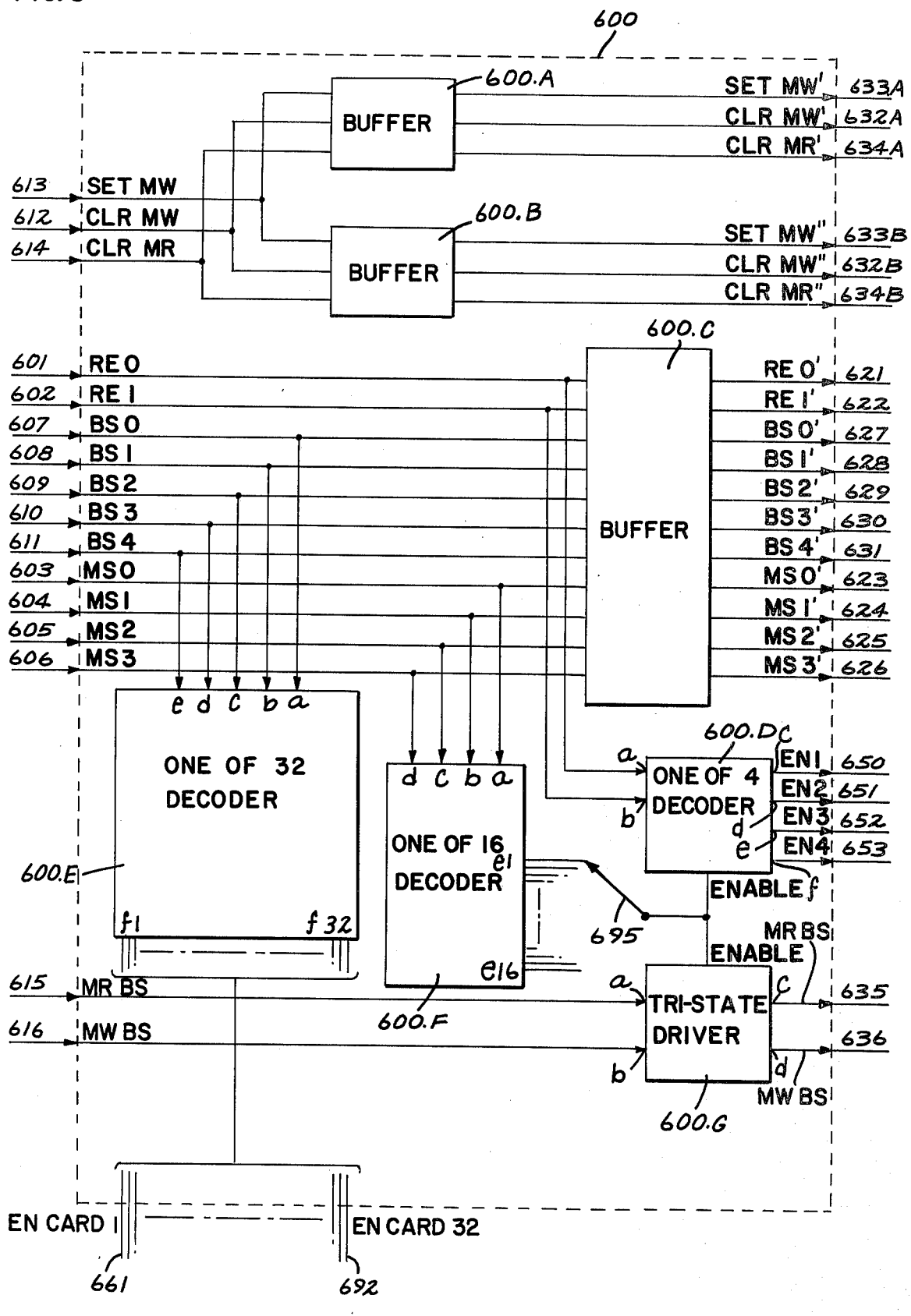
FIG. 8 is a schematic diagram of the Decoder functional block of the Mother Board schematic disclosed in FIG. 7.

A more detailed schematic diagram of the Decoder network 600 is illustrated in FIG. 8. Referring thereto, the input terminal 613 carrying the SET MW signal is buffered by means of a Buffer circuit 600.A and is applied as a buffered SET MW' to the signal output terminal 633A. The SET MW input signal is also applied by means of a second Buffer network 600.B to the output terminal 633B of the Decoder and is designated as SET MW". The CLR MW input signal applied to the input terminal 612 is buffered by the first and second Buffer networks 600.A and 600.B and is respectively applied to the output terminals 632A as CLR MW' and to output terminal 632B as CLR MW". The CLR MR input signal applied to the input terminal 614 of the Decoder 600 is buffered by means of the first and second Buffer network 600.A and 600.B respectively and is applied by the respective buffer circuits to the output terminals 634.A (as CLR MR') and the output terminal 634B (as CLR MR").

The input signal terminals 601–611 of the Decoder 600 are directly applied to a third Buffer network 600.C which buffers the respective signals carried therby and respectively applies the buffered output signals to the output terminals 621–631 respectively of the Decoder network 600. It will be noted that each of the buffered output signals from the third Buffer network 600.C appear with a (') designation. The input terminal 601 of the Decoder 600 is also connected to a first input terminal (a) of a One of 4 Decoder network 600.D. The Decoder network 600.D further has a second signal input (b), and enable input terminal and four signal output terminals (c–f). The signal input terminal 602 of the Decoder 600 is directly connected to the second signal input terminal (b) of the Decoder network 600.D. The One of 4 Decoder network 600.D is operative to receive a two-bit binary encoded signal at its input terminals (a) and (b) and to provide in response thereto, when enabled by means of its "enable" terminal, an output signal at one of its four output terminals (c–f) corresponding to the received encoded binary signal. The output terminals (c–f) of the One of 4 Decoder 600.D are respectively consecutively directly connected to the signal output terminal 650–653 of the Decoder functional block 600. The input terminals 607–611 of the Decoder functional block 600 are respectively consecutively connected to the five input terminals (a–e) consecutively of a One of 32 Decoder 600.E. The One of 32 Decoder 600.E has 32 output terminals (f1–f32) respectively consecutively directly connected to the output terminals 661–692 of the Decoder functional block 600. The One of 32 Decoder network 600.E is operative to receive a five-bit encoded binary input signal at its input terminals (a–e) and to decode the received binary signal to apply an output signal to that one of its 32 output terminals which corresponds with the received encoded binary signal. The least significant bit of the binary input code is received at the first input terminal (a) of the Decoder network 600.E. The enable signals respectively applied to the output terminals 661–692 of the Decoder functional block 600 are designated as EN CARD 1 - EN CARD 32.

The input terminals 603–606 of the Decoder functional block 600 are respectively consecutively connected to four input terminals (a–d) of a One of 16 Decoder network 600.F. The One of 16 Decoder circuit 600.F has a plurality of 16 output terminals (e1–e16). The One of 16 Decoder network 600.F is operative to receive a binary encoded four-bit signal at its input terminals (a–d) and to apply an output signal to that one of its output terminals (e1–e16) which corresponds to the encoded information applied to the input terminals of the Decoder 600.F.

The input terminals 615 and 616 of the Decoder functional block 600 are directly applied to the first (a) and the second (b) input terminals of a Tri-State Driver gate 600.G. The Tri-State Driver gate 600.G further has an enable input terminal and first and second output terminals (c and d) respectively. A connector selector wire 695 is wired to one of the output terminals (e1–e16) of the One of 16 Decoder network 600.F, and carries the signal applied to that hardwired output terminal to the "enable" input terminals of the One of 4 Decoder network 600.D and to the Tri-State Driver gate 600.G. The Tri-State Driver gate 600.G is operative in three states so as to produce at its respective output terminals either logical high or logical low output signals depending upon the logical state of the corresponding input terminals of the gate when enabled, and is operative in an "inactive" state when not enabled so as not to affect the logical state of any other logical elements to which the output terminals (c and d) of the Tri-State Driver gate 600.G are connected.

Referring to FIG. 7, the Decoder functional block 600 services 32 Room Block Cards (designated as 60.1.1–60.1.32 consecutively) on the first Mother Board 60.1. Each of the Mother Boards within the First Set 60 of Mother Boards includes 32 such Room Card networks. Each of the Room Block Card circuits 60.1.1–60.1.32 has a plurality of signal input terminals (a–k consecutively), a plurality of signal output terminals (m–r consecutively), and an enabling input terminal (s). The signal input terminals (a–d) are connected by means of the signal flow path 42.A to receive input pulse signals from the PBX or Central Office Telephone Equipment 50. There is one signal input line from the Telephone Equipment 50 corresponding to the telephone within each room of the hotel/motel. These input signal lines carry signal pulses from the Telephone Equipment 50, which signals are monitored by the circuits upon the Room Block Cards to determine when an outgoing call is being made by that respective telephone. These lines are designated as COUNT "X" (where the X number represents the specific room number identifier within the hotel/motel). For example, the COUNT 1 signal is applied by means of the signal flow path 42.A.1 to the first (a) call-counting input terminal of the Room Block Card 1 (60.1.1), and the COUNT 128 input signal is applied by means of the signal flow path 42.A.128 to the fourth (d) call-counting input terminal of the Room Block Card 32(60.1.32).

The output terminals 650–653 of the Decoder functional block 600 are respectively consecutively connected to provide input signals to the (e–h consecutively) input terminals on each of the Room Block Cards 60.1.1–60.1.32. The input terminals (e–h) of the respective Room Block Cards receive the enabling input signals for enabling one of the four Room Circuits (hereinafter described) upon the Room Block Card. These enabling signals are respectively identified as EN 1-EN 4.

The output terminals 632B–634B are directly connected to the (i–k) input terminals respectively of each of the Room Block Cards 60.1.1–60.1.32. These input terminals receive the command signals originated within the Microprocessor 35, for the individual Room Circuits located upon each of the Room Block Cards.

The Card Enabling output terminals 661–692 consecutively of the Decoder functional block 600 are respectively connected to the enabling input terminal (s) of the Room Block Cards 60.1.1–60.1.32 consecutively. Since only one of the output terminals 661–692 is energized at a time, only one of the Room Block Cards 60.1.1–60.1.32 is enabled at a time.

The four output terminals (m–p) of the Room Block Cards 60.1.1–60.1.32 provide a Message Waiting output signal to the Telephone Equipment 50 by means of the signal flow path 42.A. These Message Waiting Signals are designated as MW "X", wherein the "X" denotes the particular room identifier number for the particular room within the hotel/motel. One such signal output terminal exists for each room within the hotel/motel.

The (q) and (r) output terminals of the respective Room Block Card circuits are commonly respectively connected to each of the 32 Room Block Cards 60.1.1–60.1.32 and respectively carry the Message Register Buss signal (MR BS) and the Message Waiting Buss signal (MW BS).

The Decoder functional block also has a power input terminal generally designated as PWR and a common or reference terminal generally designated as REF. While not disclosed in FIG. 8, it will be understood that each of the functional blocks therein comprises appropriate power supply and reference networks connected respectively to the PWR and REF terminals. Each of the Room Block Card networks 60.1.1–60.1.32 also has a first Power Input terminal (designated as PWR1) for receiving regulated d.c. voltage signals for energizing the circuits within the respective Room Block Card, and a common or reference terminal (designated as REF) for providing a reference terminal connection for the logical circuits within the Room Block Cards. The Room Block Cards 60.1.1–60.1.32 further have a second Power input terminal (designated as PWR2) which receives "lamp-drive" signals from the output terminal 49.A of the Power Supply network 55.1. Each of the Room Block Cards 60.1.1–60.1.32 further has a ground terminal supplied by the output terminal 50.A of the Telephone Equipment 50. The PWR and PWR1 input terminals of the functional blocks within the First Set of Mother Boards 60 are each connected to receive power from Regulated d.c. supplies (not illustrated).

Figure 9:
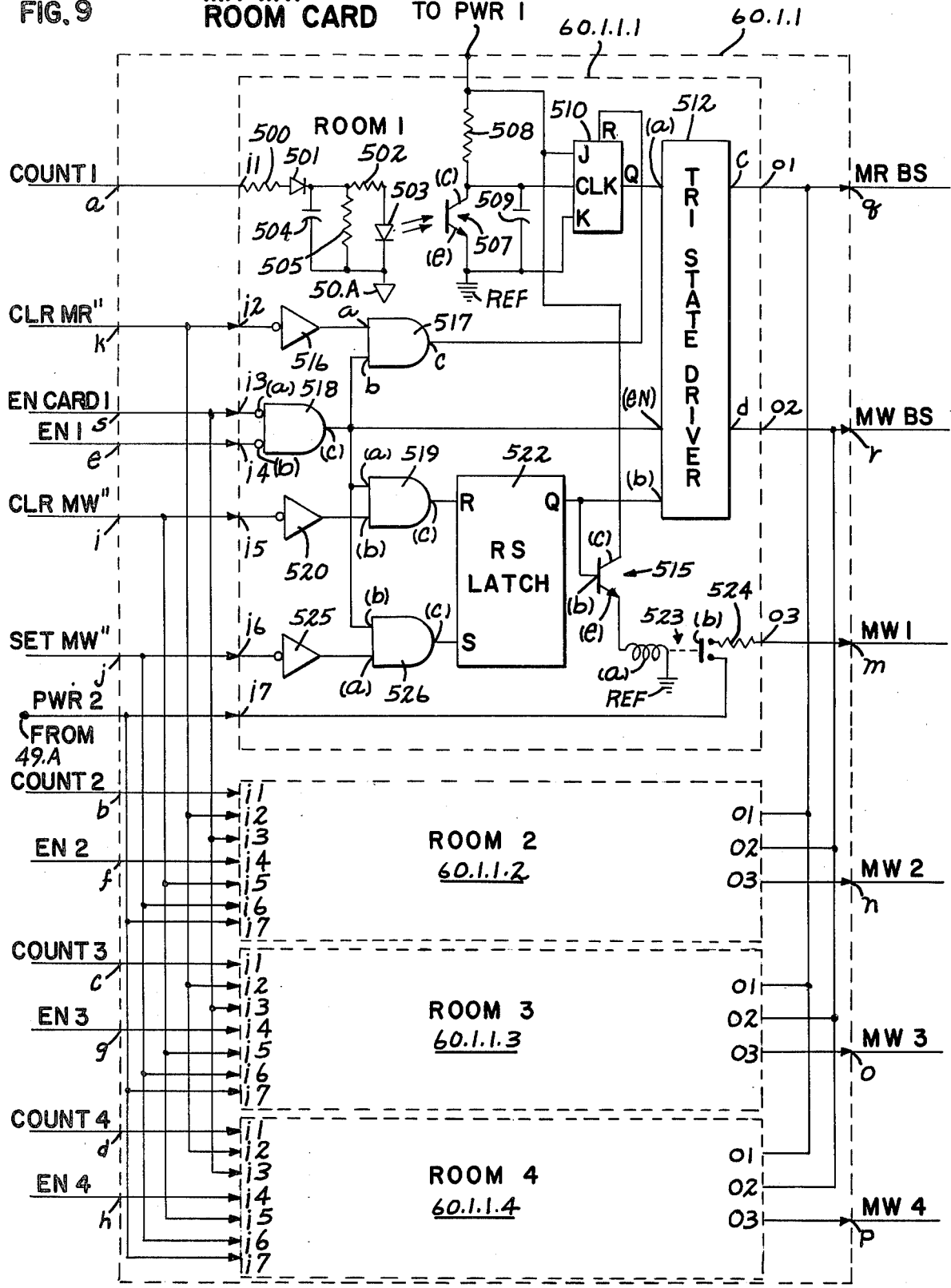
FIG. 9 is a schematic diagram of the Room Block Card network of the circuit disclosed in FIG. 7.

A more detailed schematic representation of the circuits within the Room Block Card 60.1.1 is illustrated in FIG. 9. Referring thereto, it will be noted that each of the Room Block Cards, of which Card 60.1.1 is typical, contains four Room Circuits (60.1.1.1–60.1.1.4). Each of the Room Circuits contains dedicated monitoring and control circuitry for the Call Counting or Message Register and the Message Waiting Features (36.A and 36.B of FIG. 1) for one of the rooms within the hotel/motel. For example, the Room Circuit 60.1.1.1 corresponds to that room within the hotel/motel identified with the room designator "ROOM 1". Since each of the Room Circuits is identical in configuration and function, only the schematic configuration of Room Circuit 60.1.1.1 will be described. To avoid confusion with other Room Circuits to be hereinafter described with respect to other ones of the Features, the Room Circuits of which 60.1.1.1 is typical will be referred to as the MR/MW Room Circuits. The MR/MW Room Circuits each have a plurality of seven input terminals respectively consecutively designated as $i1$–$i7$, and a plurality of three signal output terminals respectively consecutively designated as O1–O3. The CLR MR" input signal is commonly applied by means of the input terminal ($k$) of the Room Block Card 60.1.1 to each of the ($i2$) signal inputs of the MR/MW Room Circuits 60.1.1.1–60.1.1.4. Since the CLR MR" signal is also commonly applied to each of the Room Block Cards 60.1.1–60.1.32 on the Mother Board 60.1 and is also commonly applied to each of the sixteen Mother Boards 60.1–60.16 within the First Set of Mother Boards 60, this input signal is commonly applied to each of the MR/MW Room Circuits within the control system 30. Similarly, the SET MW" and the CLR MW" input signals are respectively applied to each of the ($i6$) and ($i5$) signal input terminals of each of the MR/MW Room Circuits within the system. The EN CARD 1 input signal from the Decoder functional block 600 is applied by means of the (5) input terminal of the Room Block Card 60.1.1 to the ($i3$) input terminal of each of the four MR/MW Room Circuits on the Room Block Card 60.1.1. Also, the PWR 2 lamp supply signal is commonly supplied to the ($i$) input terminal of each of the MR/MW Room Circuits throughout the system.

The input terminals ($a$–$d$) which receive the COUNT 1–COUNT 4 input signals respectively from the Telephone Equipment 50, are respectively directly connected to the first ($i1$) input terminals respectively of the MR/MW Room Circuits 60.1.1.1–60.1.1.4. The input terminals ($e$–$h$) of the Room Block Card 60.1.1, which respectively carry the EN 1–EN 4 circuit enable signals are respectively consecutively directly connected to the fourth ($i4$) input terminals of the MR/MW Room Circuits 60.1.1.1–60.1.1.4.

The O1 output terminals of the MR/MW Room Circuits are commonly connected to the output terminal ($q$) of the Room Block Card 60.1.1 and provide the Message Register Buss (MR BS) output signal. The O2 output terminals of each of the MR/MW Room Circuits are commonly connected to the ($r$) output terminal of the Room Block Card 60.1.1 and provide the Message Waiting Buss signal (MW BS). The O3 output terminals of the MR/MW Room Circuits 60.1.1.1–60.1.1.4 are respectively directly connected to the ($m$–$p$) output terminals of the Room Block Card 60.1.1 and provide the individual Message Waiting signals for the respective rooms throughout the hotel/motel to the Telephone Equipment 50.

The first input terminal ($i1$) of the Room Circuit 60.1.1.1 is connected by means of a resistor 500, a diode 501, a resistor 502, and a light-emitting diode 503, all connected in series, to the PBX common or reference terminal 50.A. The input terminal ($i1$) is also connected by means of the resistor 500 and the diode 501 in series with the parallel combination of a capacitor 504 and a resistor 505 to the PBX reference 50.A. The resistor 500 and capacitor 504 act as a threshold timing circuit for preventing energization of the light-emitting diode 503 until the input signal applied to the input terminal ($i1$) has maintained a minimum predetermined voltage level for a minimum predetermined time. The light-emitting diode 503 is connected to provide the base drive signal for a light-triggered transistor 507. The transistor 507 is of an npn-type having its emitter ($e$) directly connected to the logical common or reference terminal REF. The collector ($c$) of the transistor 507 is connected by means of a resistor 508 to the PWR 1 supply terminal and is also connected by means of a capacitor 509 to the common logic reference REF. The light-emitting diode 503 and light-triggered transistor 507 cooperatively comprise an optoisolator switch. It will also be noted that the ground or common terminals of the light-emitting diode circuit and the light-triggered transistor circuit are isolated and separate from one another.

The collector ($c$) of the transistor 507 is also connected to the clock (CLK) input terminal of a J-K flip-flop 510. The flip-flop 510 further has a J input terminal, a K input terminal, a reset (R) input terminal and a Q output terminal. The K input terminal of the flip-flop 510 is directly connected to the logical reference (REF). The J input terminal of the flip-flop 510 is directly connected to the logical Power Input Buss (PWR 1), and is also connected to the collector ($c$) of an npn transistor 515. The transistor 515 further has a base ($b$) and an emitter ($e$). The Q output terminal of the flip-flop 510 is directly connected to a first signal input terminal ($a$) of a Tri-State Driver Gate 512. The Tri-State Drive Gate 512 further has a second signal input ($b$), an Enable input terminal ($en$), and first and second signal output terminals ($c$ and $d$) respectively. The first signal output terminal ($c$) of the Tri-State Drive Gate 512 is connected directly to the first signal output terminal (O1) of the MR/MW Room Circuit 60.1.1.1, and the signal output terminal ($d$) of the Gate 512 is directly connected to the second output terminal (O2) of the Room Circuit 60.1.1.1.

The second input terminal ($i2$) of the Circuit 60.1.1.1 is connected by means of an inverter 516 to a first signal input ($a$) of an AND Gate 517. The AND Gate 517 further has a second signal input (b) and a signal output terminal (c) which is directly connected to the reset (R) input terminal of the J-K flip-flop 510. The third and fourth input terminals (i3 and i4) of the Room Circuit 60.1.1.1 are directly connected to the first and second input terminals (a) and (b) of a NOR Gate 518. The NOR Gate 518 further has a signal output (c) which is directly connected to the second input terminal (b) of the AND Gate 517 and is also directly directed to the Enable (en) input terminal of the Tri-State Driver Gate 512.

The signal output terminal (c) of the NOR Gate 518 is also directly connected to a first signal input terminal (a) of an AND Gate 519. The AND Gate 519 further has a second signal input terminal (b) and a signal output terminal (c). The fifth signal input terminal (i5) of the Room Circuit 60.1.1.1 is connected by means of an inverter 520 to the second signal input terminal (b) of the AND Gate 519. The signal output terminal (c) of the AND Gate 519 is directly connected to the R input terminal of an RS Latch Circuit 552. The RS Latch 522 further has a second input terminal (s) and a signal output terminal (Q). The output terminal (Q) of the RS Latch 522 is directly connected to the base (b) of the transistor 515. The emitter (e) of the transistor 515 is connected to energize the coil (a) of a relay 523. The coil (a) of the relay 523 is grounded to the logical reference buss REF. The relay 523 further has a normally open moveable contact (b) cooperatively operable with a pair of stationary terminals to close a signal flow path, in series with a resistor 524, between the seventh input terminal (i7) and the third signal output terminal (03) of the Room Circuit 60.1.1.1.

The sixth input terminal (i6) of the Room Circuit 60.1.1.1 is connected by means of an inverter 525 to a first signal input (a) of an AND Gate 526. The AND Gate 526 further has a second signal input terminal (b) and a signal output terminal (c) which is directly connected to the S input terminal of the RS Latch 522. The second signal input terminal (b) of the AND Gate 526 is directly connected to the signal output terminal (c) of the NOR Gate 518.

As previously pointed out, each of the MR/MW Room Circuits are identical in configuration and function to the 60.1.1.1 Circuit, it being understood that the respective input and output terminals of each particular Room Circuit are connected to signal flow paths as indicated in FIGS. 7 and 9.

Automatic Wake-Up/Room Status Features

Referring to FIGS. 1, 3, 5, and 10, those plurality of output terminals from the Level Convertors I and II (35.G and 35.H respectively) which are connected to the signal flow path 40.B are operatively connected by means of the signal flow path 40.B to a plurality of input/output terminals of the first Mother Board 70.1 of the Second Set of such Mother Boards (70). The Second Set of Mother Boards (70) provide the input/output monitoring and control circuitry that communicates and responds to the Microprocessor 35 commands, for performing the Feature C (36.C-Room Status) and the Feature D (36.D-Automatic Wake-Up) of the preferred embodiment application of the control system 30. The number of Mother Boards within the First Set (70) of such Mother Boards required depends upon the number of like-kind of signals to be monitored for the C and D Features. In the preferred embodiment, the like-numbered type of signals depends upon the number of phones or rooms within the hotel/motel in which the control system 30 is installed. In the preferred embodiment, the Second Set (70) of Mother Boards contains sixteen such Mother Boards (70.1–70.16). As will become apparent upon a more detailed description of the respective Mother Boards within the First Set (70) of Mother Boards, each such Mother Board is capable of handling 128 rooms.

Figure 10:
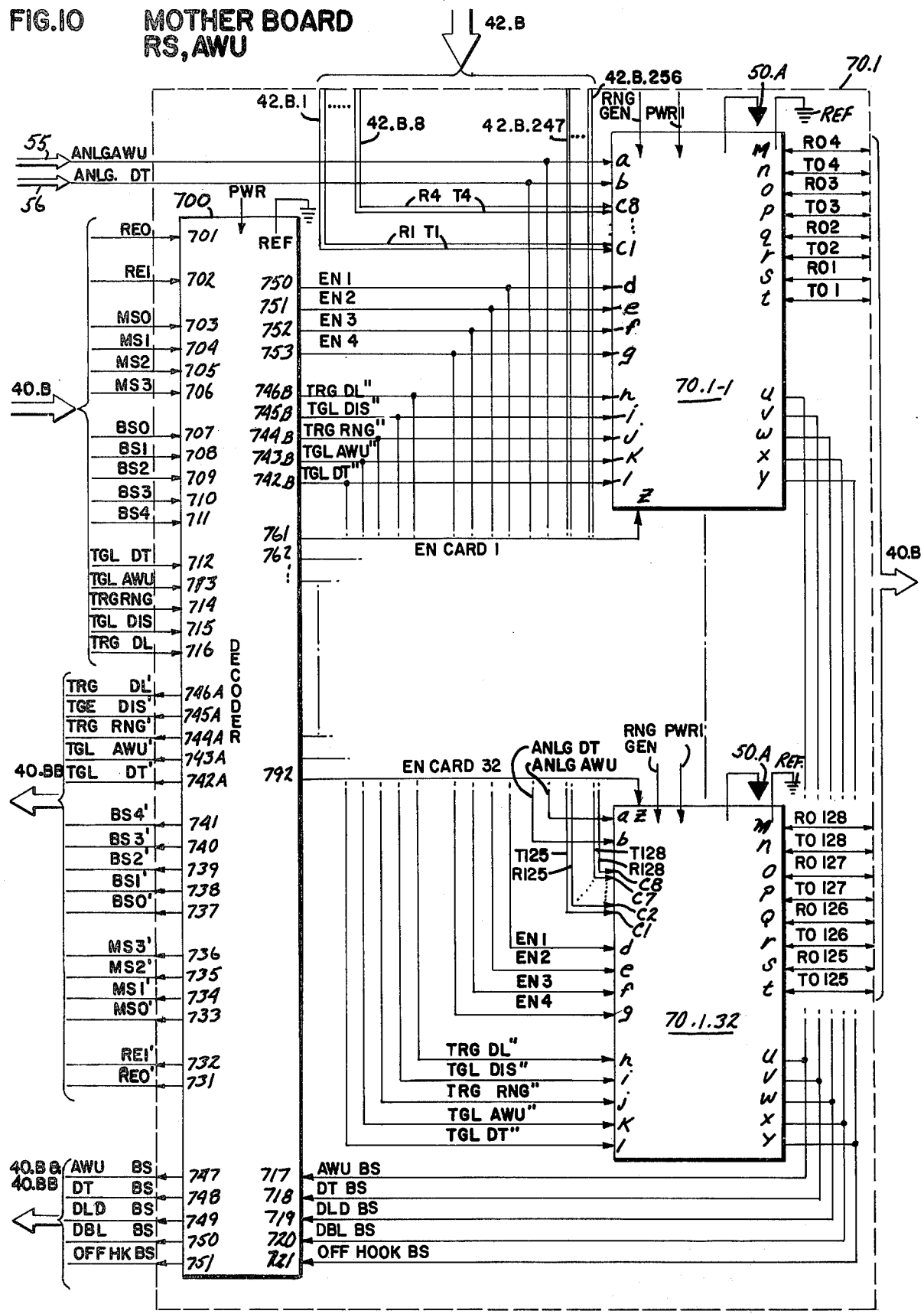
FIG. 10 is a schematic diagram of a Mother Board of a Second Set of such Mother Boards for the Room Status and Automatic Wake-Up Features of the preferred embodiment, disclosed in FIG. 3.

Referring to FIG. 10, the functional block diagram of the first Mother Board 70.1 within the Second Set 70 of the Mother Boards is schematically illustrated. It will be understood that each of the sixteen Mother Boards within the Second Set (70) of such Mother Boards is identical in function and structure to that of the first such Mother Board 70.1. The signal flow path 40.B is connected to provide input signals to a Decoder functional block 700. The Decoder functional block 700 has a plurality of input terminals 701–706 consecutively, also comprising input terminals to the first RS/AWU Mother Board 70.1. The RE0 and RE1 signals from the Microprocessor 35 are respectively directly applied to the input terminals 701 and 702 respectively of the Decoder 700. The MS0-MS3 output signals from the Microprocessor 35 are respectively consecutively applied to the input terminals 703–706 of the Decoder 700. The BS0-BS4 output signals from the Microprocessor 35 are respectively consecutively applied to the input terminals 707–711 respectively of the Decoder 700. The Toggle Dialtone (TGL DT) signal output from the Microprocessor 35 is applied to the input terminal 712 of the Decoder 700. The Toggle Automatic Wake-Up (TGL AWU) output signal from the Microprocessor 35 is applied to the input terminal 713 of the Decoder 700. The Trigger Ring (TRG RING) signal output from the Microprocessor 35 is applied to the input terminal 714 of the Decoder 700. The Toggle Disable (TGL DSI) output signal from the Microprocessor 35 is applied to the input terminal 715 of the Decoder 700. The Trigger Dial Operator (TRG DL) output signal from the Microprocessor 35 is applied to the input terminal 715 of the Decoder 700.

The Decoder functional block 700 further has a plurality of input terminals 717–721, connected to receive a plurality of control buss signals developed within the RS/AWU Mother Board 70.1. The input terminal 717 receives the Automatic Wake-Up Buss (AWU BS) signal. The input terminal 718 receives the Dialtone Buss (DT BS) signal. The input terminal 719 receives the Diode Buss (DLD BS) signal. The input terminal 720 receives the Disable Buss (DBL BS) signal. The input terminal 721 receives the Off Hook Buss (OFF HK BS) signal.

The Decoder functional block 700 has a plurality of output terminals 731–741 and 742A–746A consecutively to which the Decoder functional block 700 applies those input signals provided to the input terminals 701–716 respectively, after buffering the input signals, as hereinafter described. The output terminals 731-7-46A are also output terminals of the First Mother Board 70.1 and are applied by means of the signal flow path 40.BB as input signals to the Second Mother Board 70.2 of the Second Set 70 of Mother Boards. The Decoder functional block 700 also has a plurality of output terminals 747–751 consecutively, also forming output terminals of the Mother board 70.1, which apply the signal presented at these terminals (as hereinafter described) by means of the signal flow paths 40.B to the Microprocessor 35, and by means of the signal flow path 40.BB to the Second Mother Board 70.2.

The Decoder functional block 700 further has a plurality of buffered signal output terminals 742B-746B, a plurality of output terminals 750-753 for carrying Room Circuit Enabling output signals, and a plurality of 32 output terminals 761-792 for providing Room Block Card Enabling output signals.

Figure 11:
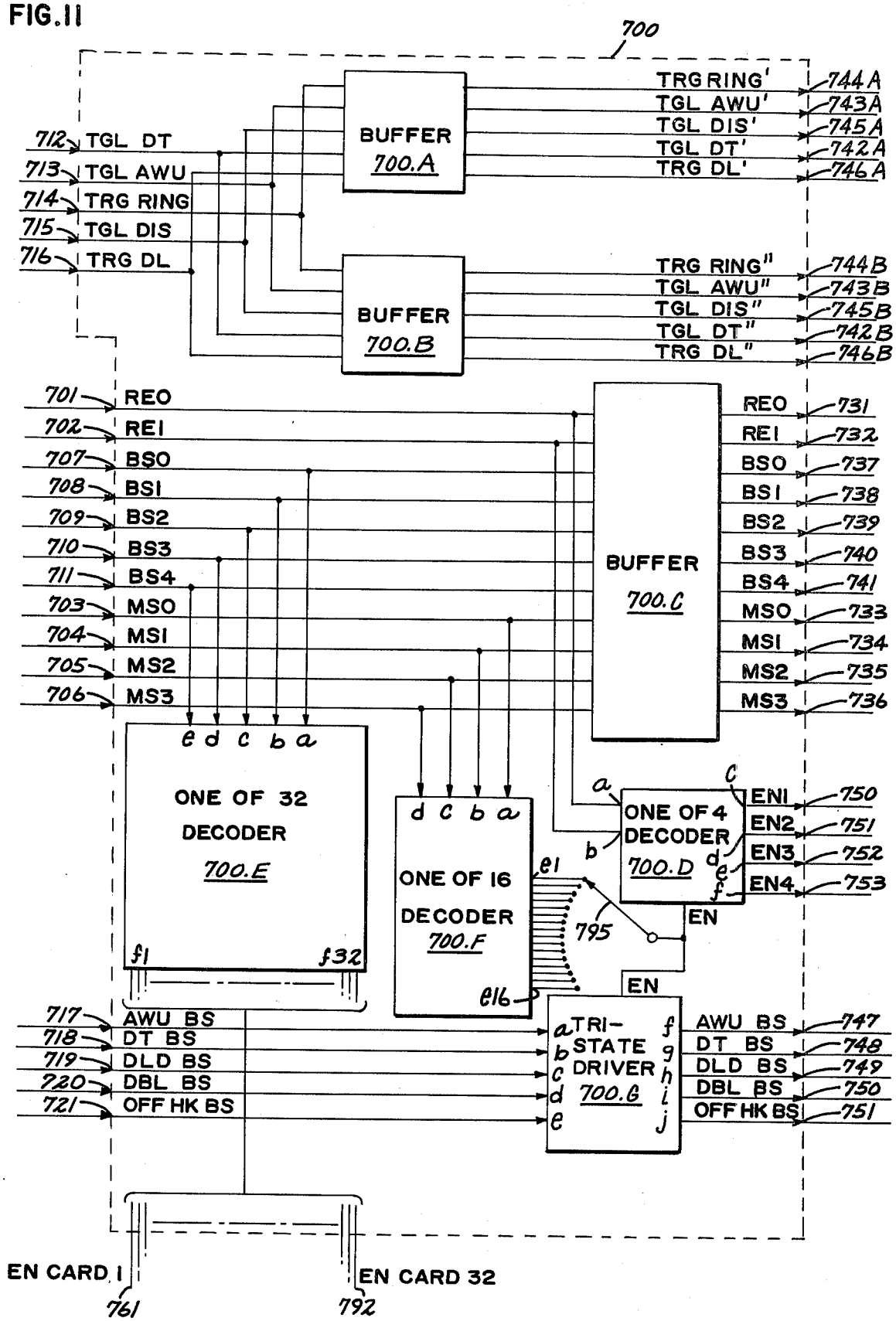
FIG. 11 is a schematic diagram of the Decoder functional block of the Mother Board schematic disclosed in FIG. 10.

A more detailed schematic diagram of the Decoder functional block 700 is illustrated in FIG. 11. Referring thereto, the input terminal 712 carrying the TGL DT signal is buffered by means of a first Buffer circuit 700.A, and is applied as a buffered TGL DT' signal to the signal output terminal 742A. The TGL DT signal is also applied by means of a second Buffering network 700.B to the output terminal 742B of the Decoder 700 and is designated as the output signal TGL DT". The TGL AWU input signal applied to the input terminal 713 is buffered by the First and Second Buffer networks 700.A and 700.B and is respectively applied as buffered output signals to the output terminals 743A as TGL AWU' and to output terminal 743B as TGL AWU". The input signal TRG RING applied to the input terminal 714 of the Decoder 700 is buffered by means of the First and Second Buffer networks 700.B respectively and is applied as buffered output signals to the output terminal 744A (as TRG RING') and to the output terminal 744B (as TRG RING"). The TGL DIS input signal applied to the input terminal 715 of the Decoder 700 is buffered by means of the First and Second Buffer network 700.A and 700.B respectively and is applied by the respective buffer circuits to the output terminal 745A (as TGL DIS') and to the output terminal 745B (as TGL DIS"). The TRG DL input signal applied to the input terminal 716 of the Decoder 700 is buffered by means of the First and Second Buffer network 700.A and 700.B respectively and is applied by the respective buffer circuits to the output terminal 746A (as TRG DL') and to the output terminal 746B (as TRG DL").

The input signal terminals 701-711 of the Decoder functional block 700 are directly applied to a Third Buffer network 700.C which buffers the respective signals carried thereby and respectively applies the buffered output signals to the output terminals 731-741 respectively of the Decoder functional block 700. It will be noted that each of the buffered output signals from the Third Buffer network 700.C appear with a (') designation. The input terminal 701 of the Decoder 700 is also connected to a first input terminal (a) of a One of 4 Decoder network 700.D. The Decoder network 700.D further has a second signal input (b), an Enable input terminal (en) and four signal output terminals (c-f). The signal input terminal 702 of the Decoder 700 is directly connected to the second signal input terminal (b) of the Decoder network 700.D. The One of 4 Decoder network 700.D is operative to receive a two-bit binary encoded signal at its input terminals (a) and (b) and to provide in response thereto, when enabled by means of its Enable (en) terminal, an output signal at one of its four output terminals (c-f) corresponding to the received encoded binary signal. The output terminals (c-f) of the One of 4 Decoder 700.D are respectively consecutively directly connected to the signal output terminals 750-753 of the Decoder functional block 700. The input terminals 707-711 consecutively of the Decoder functional block 700 are respectively consecutively connected to five input terminals (a-e) consecutively of a One of 32 Decoder 700.E. The One of 32 Decoder 700.E has 32 output terminals (f1-f32) respectively consecutively directly connected to the output terminals 761-792 of the Decoder functional block 700. The One of 32 Decoder network 700.E is operative to receive a five-bit encoded binary input signal at its input terminals (a-e) and to decode the received binary signal, to apply an output signal to that one of its 32 output terminals which corresponds with the received encoded binary signal. The least significant bit of the binary input code is received at the first input terminal (a) of the Decoder network 700.E. The Enable signals respectively applied to the output terminals 761-792 of the Decoder functional block 700 are designated as EN CARD 1-EN CARD 32.

The input terminals 703-706 of the Decoder functional block 700 are respectively consecutively connected to four input terminals (a-d) of a One of 16 Decoder network 700.F. The One of 16 Decoder circuit 700.F has a plurality of 16 output terminals (e1-e16). The One of 16 Decoder network 700.F is operative to receive a binary encoded four-bit signal at its input terminals (a-d) and to apply an output signal to that one of its output terminals (e1-e16) which corresponds to the encoded information applied to the input terminals of the Decoder 700.F.

The input terminals 717-721 of the Decoder functional block 700 are directly applied to the first (a) through fifth (e) input terminals of a Tri-State Driver Gate 700.G. The Tri-State Driver Gate 700.G further has an Enable (en) input terminal and first through fifth output terminals (f-j) respectively corresponding to the associated input terminals (a-e) respectively. A connector selector wire 795 is wired to one of the output terminals (e1-e16) of the One of 16 Decoder network 700.F, and carries the signal applied to that hardwired output terminal to the Enable (en) input terminals of the One of 4 Decoder network 700.D and to the Tri-State Driver Gate 700.G. The Tri-State Driver Gate 700.G is operative in three states so as to produce at its respective output terminals either logical high or logical low output signals correlated to the logical state of the corresponding input terminals of the gate when enabled, and is operative in an "inactive" state when not enabled so as not to affect the logical state of any other logical elements to which the output terminals (f-j) of the Tri-State Driver Gate 700.G are connected.

Referring to FIG. 10, the Decoder functional block 700 services 32 Room Block Cards (designated as 70.1.1-70.1.32 consecutively) on the first Mother Board 70.1. Each of the Mother Boards within the Second Set 70 of Mother Boards includes 32 such Room Block Card networks. Each of the Room Block Card circuits 70.1.1-70.1.32 has a plurality of signal input terminals (a, b, c1, c8, and d-1 consecutively), a plurality of signal output terminals (m-y consecutively), and an Enabling input terminal (z). The first signal input terminal (a) is connected to an input signal flow path designated as 55, and carries an Analog Automatic Wake-up (ANLG AWU) signal, comprising the recorded wake-up message. The second input terminal (b) is connected to receive an input signal from a signal flow path 56 which carries an Analog Dialtone (ANLG DT) input signal for providing a dialtone signal. The signal flow paths 55 and 56 orginate in external equipment, not illustrated herein, appropriate for generating the described signals. The ANLG AWU and the ANLG DT input signals are respectively applied to the first and second input terminals of each of the 32 Room Block Cards of 70.1.1–70.1.32 on each of the 16 Mother Boards 70.1–70.16 with the Second Set (70) of Mother Boards. The signal input terminals (c1–c8) are connected by means of the signal flow path 42.8 to receive input signals from the PBX or Central Office Telephone Equipment 50. There are two signal input lines from the Telephone Equipment 50 corresponding to the telephone within each room of the hotel/motel. Each pair of such input signal lines are connected to what are commonly designated as the "tip" and "ring" signal lines within the PBX or Central Office Telephone Equipment 50. These are the only two telephone lines employed by the Room Status (RS) and the Automatic Wake-up (AWU) Features of the control system 30. Connection to the "tip" and "ring" Telephone Equipment 50 lines are made at the sites of the PBX Telephone Equipment within a hotel/motel or are made at the physical location of the telephone room within the hotel/motel where the Central Office lines are connected to the room telephone sets; therefore, no alteration or modification to the telephone lines within the hotel/motel which lead to the individual telephones throughout the hotel/motel is required, and no modifications whatsoever need be made to the telephones within the respective hotel/motel rooms. Similarly, no additional control equipment or hardwire of any type is required within the individual hotel/motel rooms for achieving the Room Status (RS) and the Automatic Wake-Up (AWU) Features of this invention. Each pair of the signal input lines (for example, the c1 and c2 input lines) are designated as T"X" and R"X" respectively for the "tip" and "ring" designations (where the X number represents the specific room number identifier within the hotel/motel). For example the T1 signal is applied by means of the signal flow path 42.B.1 to the first (c1) "tip" input terminal of the Room Block Card (70.1.1), and the T128 input signal is applied by means of the signal flow path 42.B.255 to the last input "tip" signal receiving terminal (c7) of the Room Block Card 32 (70.1.32). Similarly, the R1 signal is applied by means of the signal flow path 42.A.2 to the first pair of "tip" and "ring" intput terminals (specifically to input terminal c2) of the Room Block Card 1 (70.1.1), and the R128 input signal is applied by means of the signal flow path 42.A.256 to the fourth pair of "tip" and "ring" input terminals (specifically to input terminal c8) of the Room Block Card 32 (70.1.32).

The output terminals 750–753 of the Decoder functional block 700 are respectively consecutively connected to provide input signals to the (d–g consecutively) input terminals on each of the Room Block Cards 70.1.1–70.1.32. The input terminals (d–g) of the respective Room Block Cards receive the Enabling input signals for enabling one of the four Room Circuits (hereinafter described) upon the Room Block Card. These enabling signals are respectively identified in FIG. 10 as EN1–EN4.

The output terminals 742B–746B are directly connected to th (1–h) input terminals respectively of each of the Room Block Cards (70.1.1–70.1.32. These input terminals receive the command signals originated within the Microprocessor 35, for the individual Room Circuits located upon each of the Room Block Cards.

The Card Enabling output terminals 761–792 consecutively of the Decoder functional block 700 are respectively connected to the Enabling input terminal (z) of the Room Block Cards 70.1.1–70.1.32 consecutively. Since only one of the output terminals 761–792 is energized at a time, only one of the Room Block Cards 70.1.1–70.1.32 is enabled at a time.

The eight output terminals (m–t) of the Room Block Cards 70.1.1–70.1.32 provide four sets of "tip" and "ring" output signals to the Telephone Equipment 50 by means of the signal flow path 42.B. These "tip" and "ring" signals are designated as TO"X" and RO"X", wherein the "X" denotes the particular room identifier number for the particular room within the hotel/motel. One such pair of signal output terminals exist for each individual room within the hotel/motel. As will become apparent upon a more detailed description of the Room Block Cards 60.1.1–60.1.32, each pair of "tip" and "ring" output terminals can be associated with a respective pair of the "tip" and "ring" input terminals (c1–c8) of the respective Room Block Card.

The (u–y) consecutive output terminals of the respective Room Block Cards 70.1.1–70.1.32 carry the output Buss Signals. The output terminal (u) carries the AWU BS signal. The output terminal (v) carries the DT BS signal. The output terminal (w) carries the DLD BS signal. The output terminal (x) carries the DBL BS signal. The output terminal (y) carries the OFF HK BS signal. Each of the output Buss terminals (u–y) respectively are commonly connected to the corresponding output Buss terminals of each of the Room Block Cards 70.1.1–70.1.32.

The Decoder functional block also has a power input terminal generally designated as PWR, and a common or a reference terminal generally designated as REF. While not disclosed in FIG. 10, it will be understood that each of the functional blocks therein comprises appropriate power supply and reference networks connected respectively to the PWR and REF terminals. Each of the Room Block Card networks 70.1.1–70.1.32 also has a first Power Input terminal (designated as PWR 1) for receiving regulated d.c. voltage signals for energizing the circuits within the respective Room Block Card, and a common or reference terminal designated as REF for providing a reference terminal connection for the logical circuits within the Room Block Cards. The Room Block Cards 70.1.1–70.1.32 further has a second Power input terminal (designated as RING GEN), which is connected to receive an energizing signal for "ringing" the telephones throughout the hotel/motel. Each of the Room Block Cards 70.1.1–70.1.32 further has a ground terminal supplied by the output terminals 50.A of the Telephone Equipment 50. The PWR and the PWR 1 input terminals of the functional blocks within the Second Set of Mother Boards 70 are each connected to receive power from Regulated d.c. supplies (not illustrated).

Figure 12:
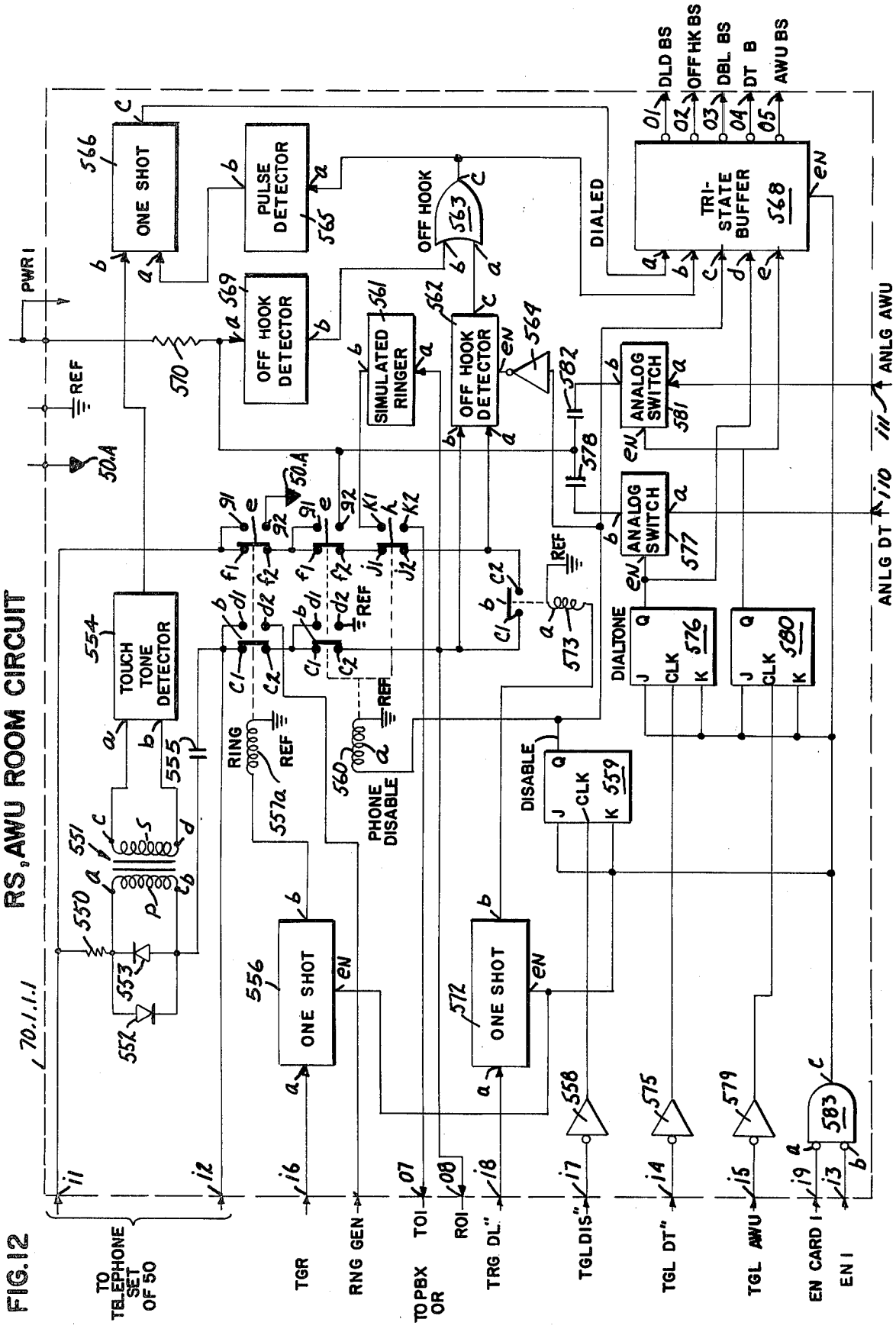
FIG. 12 is a schematic block diagram of an individual control circuit for controlling the Room Status and Automatic Wake-Up Features for one room, of the network disclosed in FIG. 10.
Figure 13:
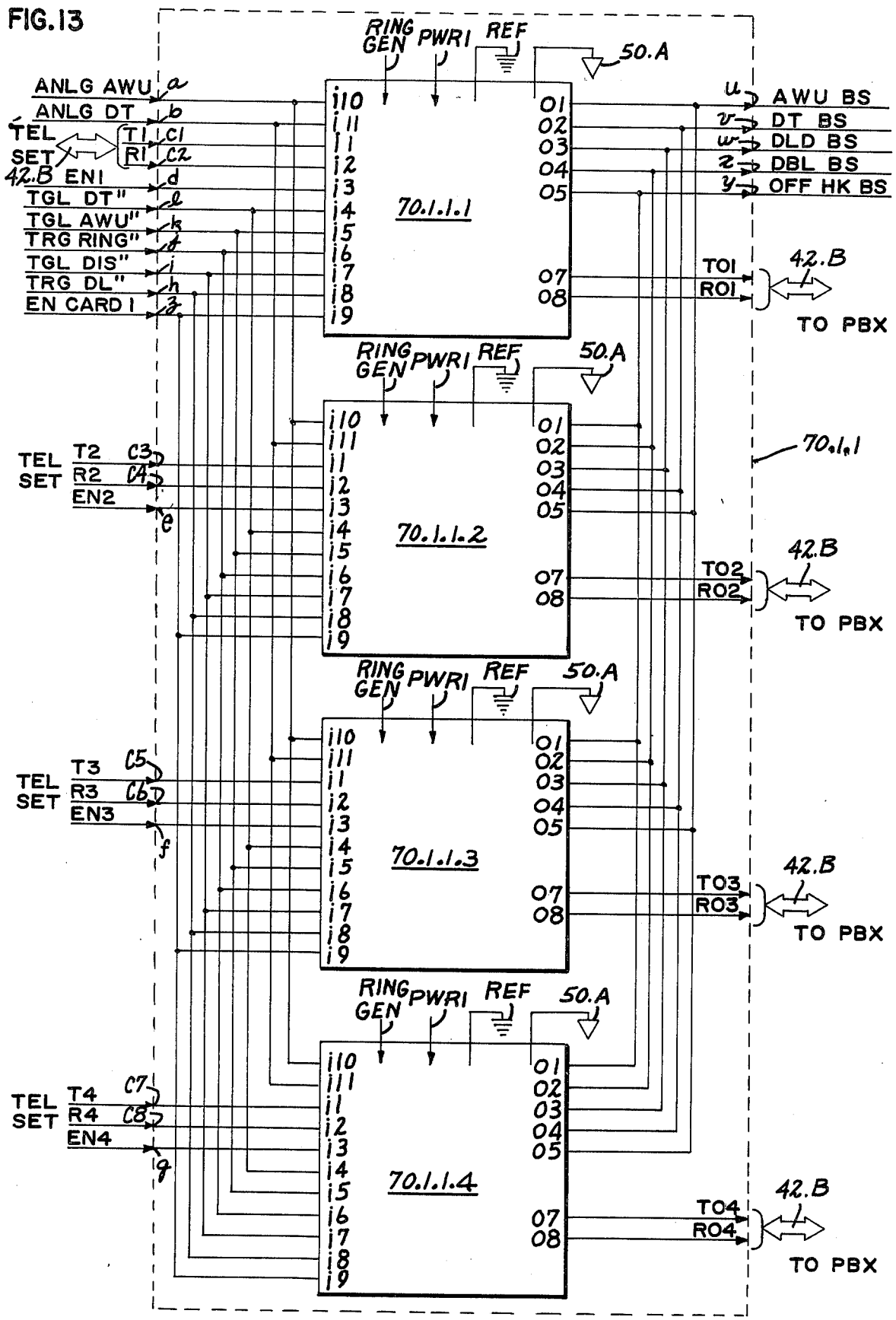
FIG. 13 is a schematic diagram of the Room Block Card network of the circuit disclosed in FIG. 10, illustrating the interconnection of four circuits of the type disclosed in FIG. 12.

A more detailed schematic representation of the circuits within the Room Block Card 70.1.1 is illustrated in FIGS. 12 and 13. Referring thereto, it will be noted that each of the Room Block Cards, of which card 70.1.1 is typical, contains four Room Circuits (70.1.1.1–70.1.1.4). Each of the Room Circuits contains dedicated monitoring and control circuitry for the Room Status (RS) and the Automatic Wake-Up (AWU) Features (36.C and 36.D respectively of FIG. 1), for one identifiable room within the hotel/motel. For example, the Room Circuit 70.1.1.1 correspond to that room within the hotel/motel identified with the room designator (ROOM 1). Since each of the Room Circuits is identical in configuration and function, only the schematic configuration of Room Circuit 70.1.1.1 will be described. To avoid confusion with the MR/MW Room Circuit previously described with respect to the A and B Features, the Room Circuits of which 70.1.1.1 is typical, will be referred to as the RS/AWU Room Circuits.

The RS/AWU Room Circuits each has a plurality of nine input terminals respectively consecutively designated as ($i1$–$i9$), and a plurality of eight signal output terminals respectively consecutively designated as (O1–O8). As will become apparent upon a more detailed description of the circuit schematics comprising the RS/AWU Room Circuits, the input terminals ($i1$ and $i2$) and the output terminals (O7 and O8) should properly be referred to as input/output terminals since these "tip" and "ring" signal carrying terminals both receive and send electrical information respectively to and from the Telephone Equipment 50. In normal operation, wherein the control system 30 of this invention is not employed, the "tip" input line designated by T1 and the "tip" output line designated by T01 would comprise a single continuous wire leading from the Telephone Set within a room of the hotel/motel and to the PBX or Central Office telephone equipment. Similarly, the "ring" input line represented by R1 and the "ring" output line represented by R01 would comprise a single continuous conductor leading from the Telephone Set within the hotel/motel room to the PBX or Central Office Telephone Equipment circuits 50. When the control system 30 of this invention is installed in a hotel/motel facility, each pair of "tip" and "ring" conductors connecting the remotely located telephone sets with the PBX or Central Office Telephone Equipment 50 is severed at the site of the PBX or Central Office Equipment. That portion of the severed "tip" and "ring" conductors which extends to the remotely located Telephone Set are connected respectively to the ($i1$ and $i2$) input terminals of the particular RS/AWU Room Circuit which has been predetermined to represent and control the operations of that specific Telephone Set Those portions of the severed "tip" and "ring" conductors which extend directly to the PBX or Central Office Telephone Equipment 50, are respectively connected to the (O7 and O8) terminals of that RS/AWU Room Circuit to which the first-connected pair of severed lines are connected. Therefore, the RS/AWU Room Circuit which is dedicated to that particular hotel/motel room is operatively inserted within the "tip" and "ring" conductors extending to the respective telephone set, for controlling and monitoring the signal flow between the remotely located telephone set and the centrally located Telephone Control Equipment.

The TGL DT" input signal is commonly applied by means of the input terminal ($l$) of the Room Block Card 70.1.1 to each of the ($i4$) signal inputs of the RS/AWU Room Circuits 70.1.1.1–70.1.1.4. Since the TGL DT" signal is also commonly applied to each of the Room Block Cards 70.1.1–70.1.32 on the Mother Board 70.1, and is also commonly applied to each of the sixteen Mother Boards 70.1–70.16 within the Second Set of Mother Boards 70, this input signal is commonly applied to each of the RS/AWU Room Circuits within the control system 30. Similarly, the TGL AWU", the TRG RING", the TGL DIS" and the TRG DL" input signals are respectively applied to each of the respective ($i5$), ($i6$), ($i7$), and ($i8$) signal input terminals of each of the RS/AWU Room Circuits within the system. The EN CARD 1 input signal from the Decoder functional block 700 is applied by means of the ($z$) input terminal of the Room Block Card 70.1.1 to the ($i$) input terminal of each of the four RS-AWU Room Circuits on the Room Block Card 70.1.1.

The RING GEN supply terminal is commonly applied to each of the RS/AWU Room Circuits throughout the system. Similarly, the PWR 1 regulated power input signal terminal came out of the Logic Reference (REF) and the PBX Reference (50.A) terminals are each respectively applied to each of the RS/AWU Room Circuits throughout the system.

The input terminals ($c1$ and $c2$) which receive the T1 and R1 input signals respectively from the Telephone Sets of the Telephone Equipment 50, are respectively directly connected to the ($i1$) and ($i2$) input terminals of the 70.1.1.1 circuits. The input terminals ($c3$ and $c4$) which respectively receive the T2 and R2 signals are directly connected to the ($i1$) and ($i2$) input terminals of the 70.1.1.2. The input terminals ($c5$ and $c6$) which respectively receive the T3 and R3 signals are directly connected to th ($i1$) and ($i2$) input terminals of the 70.1.1.3 circuit. The input terminals ($c7$ and $c8$) which receive the T4 and R4 input signals are directly connected to the ($i1$) and ($i2$) input terminals of the 70.1.1.4 circuit. The input terminals ($d$–$g$) of the Room Block Card 70.1.1, which respectively carry the EN1–EN4 circuit enable signals are respectively consecutively directly connected to the ($i3$) input terminals of the RS/AWU Room Circuits 70.1.1.1–70.1.1.4.

The 01 output terminals of the RS/AWU Room Circuits are commonly connected to the output terminal ($u$) of the Room Block Card 70.1.1 and provide the Automatic Wake-Up Buss (AWU BS) output signal. The 02 output terminals of each of the RS/AWU Room Circuits are commonly connected to the ($v$) output terminal of the Room Block Card 70.1.1 and provide the Dialtone Buss (DT BS) output signal. The 03 output terminals of the RS/AWU Room Circuits are commonly connected to the output terminal ($w$) of the Room Block Card 70.1.1 and provide the dialed (DLD BS) output signal. The 04 output terminals of each of the RS/AWU Room Circuits are commonly connected to the output terminal ($x$) of the Room Block Card 70.1.1 and provide the Disabled (DBL BS) output terminal. The 05 output terminals of the RS/AWU Room Circuits are commonly connected to the output terminal ($y$) of the Room Block Card 70.1.1 and provide the Off Hook Buss (OFF HK BS) output signal.

A more detailed schematic representation of the circuits within the RS/AWU Room Circuit 70.1.1.1 is illustrated in FIG. 12. Referring thereto, the input terminal ($i1$) is connected by means of a resistor 550 to a first terminal ($a$) of a primary coil ($p$) of a transformer 551. The primary winding ($p$) further has a second terminal ($b$). A pair of diodes 552 and 553 are connected in complementary parallel configuration across the first ($a$) and second ($b$) terminals of the primary ($p$) winding of the transformer 551. The transformer 551 further has a secondary ($s$) winding having first and second input terminals ($c$) and ($d$) respectively directly connected to first and second ($a$) and ($b$) input terminals respectively of a Touch Tone Detector network 554. The Detector 554 further has a signal output ($c$). The Detector 554 is operative to provide at its signal output terminal ($c$) a pulse signal whenever the signal conditions appearing upon the "tip" (T1) and "ring" (R1) lines indicate that one or more of the "touch tone" selector buttons of the remotely located telephone set has been depressed to effect an outgoing call. The input terminal ($i2$) is connected by means of a capacitor 555 to the second terminal (b) of the primary (p) winding of the transformer 551. The resistor 550, the diodes 552 and 553, and the capacitor 555 collectively comprise a transient suppression circuit for the incoming T1 and R1 signals.

The (i6) input terminal is directly connected to an input signal terminal (a) of a One-Shot Multivibrator circuit 556. The One-Shot 556 further has an Enable (EN) input and a signal output terminal (b) directly connected to energize a coil (a) of a relay 557. The relay coil 557 (a) is referenced to the REF terminal. The Relay 557 further has a first and second moveable contact (b) and (e) respectively connected for simultaneous movement in response to energization of the relay coil 557 (a). Each of the moveable contacts of the relay 557 is operatively moveble between two sets of stationary contacts. The first moveable contact 557 (b) normally engages and closes the circuits between a first set of stationary contacts (c1 and c2). The moveable contact 557 (b) responds to energization of the relay coil 557 (a) to open the circuits between the stationary contacts (c1 and c2) and to engagingly close the circuits between its second pair of stationary contacts (d1 and d2). The moveable contact 557 (e) is normally operable to engageably close the electric circuit between a first set of stationary contacts (f1 and f2) and is moveable in response to energization of the relay coil 557 (a) to open the electrical circuit between the stationary contacts (f1 and f2) and to engageably close the electrical circuit between its second set of stationary contacts (g1 and g2).

The (i1) input terminal is commonly connected to the (f1) and (g1) stationary contacts of the relay 557. The stationary contact (g2) of the relay 557 is directly connected to the PBX reference 50.A. The (i2) input terminal is commonly connected to the (c1) and (d1) stationary contacts of the relay 557. The RING GEN input signal is directly applied to the (d2) stationary contact of the relay 557.

The (i7) input terminal is connected by means of an inverter 558 to the clock (clk) input terminal of a J-K flip-flop 559. The flip-flop 559 further has a first (J) and a second (K) input terminal and a Q output terminal. The Q output terminal is directly connected to energize a relay coil (a) of a relay 560. The relay coil 560 (a) is referenced to the PBX reference 50.A.

The relay coil 560 (a) of the relay 560 is operative when energized to control the movement of three moveable contact elements (b, e, and h respectively) between first and second positions. The relative association between the relay coil 560 (a) and its respective moveable elements (b, e, and h) is denoted in FIG. 12 by the dashed line therebetween. The moveable contact 560 (b) is normally operable to electrically close the circuit between its first set of stationary contacts (c1 and c2) and is moveable in response to energization of the relay coil 560 (a) to open the circuit path between the first set of stationary contacts (c1 and c2) and to electrically close the circuit path between its associated second set of stationary contacts (d1 and d2). The stationary contacts 560 (c1) and 560 (d1) of the relay 560 are directly connected to the stationary contact 557 (c2) of the relay 557. The stationary contact 560 (d2) is directly connected to the logical reference terminal (REF).

The moveable contact elements 560 (e) of the relay 560 is normally operative to electrically close the circuits between its first set of stationary contacts (f1 and f2), and is moveable in response to energization of the relay coil 560 (a) to open the electrical circuit between the f1 and f2 contacts and to electrically close the circuits between its second set of stationary contacts (g1 and g2). The stationary contacts 560 (f1) and 560 (g1) are commonly connected to the stationary terminal 557 (f2) of the relay 557.

The third moveable contact element 560 (h) is normally operative to electrically close the circuit between its first set of stationary contacts (j1 and j2), and is operative in response to energization of the relay coil 560 (a) to open the circuit path between the (j1 and j2) contacts and to electrically close the circuit path between its associated second pair of stationary contacts (k1 and k2). The stationary contact 560 (c2) is directly connected to the (08) output terminal of the circuit 70.1.1.1, and is also directly connected to a first terminal (a) of a Simulated Ringer Circuit 561. The Simulated Ringer Circuit 561 further has a second terminal (b) directly connected to the 560 (k1) stationary contact of the relay 560.

The 560 (j1) and the 560 (f2) stationary contacts are directly connected to one another. The 560 (j2) and the 560 (k2) stationary contacts are commonly connected to the (07) output terminal of the circuit 70.1.1.1. The Simulated Ringer Network 561 is of appropriate circuitry to appear to its output terminals (a) and (b) as viewed from the "tip" and "ring" terminals of the telephone set, when the hand-held receiver of the telephone set is placed in the "down" position (i.e. when the telephone set is not in operative use).

The "tip" output terminal (07) is also connected to a first signal input terminal (a) of a first Off Hook Detector Network 562. The Detector Network 562 further has a second signal input (b) which is directly connected to the "ring" output terminal (08) of the circuit 70.1.1.1, and Enable (en) input terminal and a signal output terminal (c) which is directly connected to a first (a) signal input of an OR gate 563. The Q signal output terminal of the J-K flip-flop 559 is connected by means of an inverter 564 to the Enable (en) input terminal of the Off Hook Detector 562.

The OR gate 563 further has a second signal input terminal (b) and a signal output terminal (c) which is directly connected to an input terminal (a) of a Pulse Detector Network 565. The Pulse Detector Network 565 further has a signal output terminal (b) connected to a first trigger input terminal (a) of a One-Shot Retriggerable Monostable Multivibrator 566.

The One-Shot Multivibrator 566 further has a second trigger input terminal (b) which is directly connected to receive a trigger input signal from the output terminal (c) of the Touch Tone Detector 554, and further has a signal output terminal (c) connected to provide an input signal to a first input terminal (a) of a Tri-State Buffer Netwpork 568. The Tri-State Buffer network 568 further has second through fifth signal input terminals respectively consecutively designated as (b)–(e), an Enable (en) input terminal and five signal output terminals respectively consecutively connected to the (O1–O5) signal output terminals of the RS/AWU Room Circuit 70.1.1.1. The Tri-State Buffer Network 568 is similar in description to those Tri-State gates previously described, with the signal output terminals (O1–O5) providing output signals respectively corresponding with the signal input terminals (a–e) respectively. The signal output terminal (c) of the OR gate 563 is connected to provide an input signal to the second input terminal (b) of the Tri-State Buffer 568. The Q output terminal of the J-K flip-flop 559 is connected to provide a signal input to the input terminal (c) of the Tri-State Buffer Network 568.

The stationary contact 560 (g2) of the relay 560 is directly connected to a signal input terminal (a) of a second Off Hook Detector Network 569. The Detector 569 further has a signal output (b) directly connected to the second input terminal (b) of the OR gate 563. The input signal terminal (a) of the Off Hook Detector 569 is also connected by means of a resistor 570 to the PWR 1 power supply input terminal.

The signal input terminal (i8) of the circuits 70.1.1.1 is connected to a signal input terminal (a) of a One-Shot Retriggerable Monostable Multivibrator 572. The One-Shot Multivibrator 572 further has an Enable (en) input terminal and a signal output terminal (b) which is directly connected to energize a coil (a) of a relay 573. The relay coil 573 (a) is terminated at the logical reference (REF). The relay 573 further has a moveable contact element 573 (b) which is cooperatively moveable with respect to a pair of stationary contacts (c1) and (c2). The moveable relay element 573 (b) is normally operable in an "open" position and is moveable in response to energization of the relay coil 573 (a) to electrically close the circuits between the stationary contacts (c1) and (c2) of the relay 573. The stationary contacts 573 (c1) and 560 (c2) of the relays 573 and 560 respectively are commonly connected to the second input terminal (b) of the Off Hook Detector Network 562. The stationary contact 573 (c2) is directly connected to the first signal input terminal (a) of the Off Hook Detector Network 562.

The input terminal (i4) of the circuit 70.1.1.1 is connected by means of an inverter 575 to the clock (clk) input terminal of a J-K Flip-Flop 576. The Flip-Flop 576 further has a J input terminal, a K input terminal, and a Q output terminal. The Q output terminal of the Flip-Flop 576 is directly connected to the fourth (d) input terminal of the Tri-State Buffer 568. The Q output terminal of the Flip-Flop 576 is also connected to an Enable (en) input terminal of a first Analog Switch 577. The Analog Switch 577 further has a signal input terminal (a) and an output terminal (b). The input terminal 557 (a) is directly connected to receive the Analog Interrupted Dialtone Signal (ANLG DT) from the input terminal (i10) of the circuit 70.1.1.1. The signal output terminal (b) of the Analog Switch 577 is connected by means of a capacitor 578 to the stationary contact 560 (g2) of the relay 560.

The input terminal (i5) of the circuit 70.1.1.1 is connected by means of an inverter 579 to the clock (clk) input terminal of a J-K Flip-Flop 580. The Flip-Flop 580 further has a J input terminal, a K input terminal, and a Q output terminal. The Q output terminal is directly connected to the fifth (e) signal input terminal of the Tri-State Buffer Network 568, and is also connected to an Enable (en) input terminal of a second Analog Switch 581. The Analog Switch 581 further has a signal input terminal (a) directly connected to receive the Analog Automatic Wake-Up Message signal from the (i11) input terminal of the circuit 70.1.1.1. The Analog Switch 581 further has a signal output terminal (b) connected by means of a capacitor 582 to the stationary contact 560 (g2) of the relay 560.

The Card Enabling Signal (EN CARD 1) is applied by means of the input terminal (i9) of the circuit 70.1.1.1 to a first input terminal (a) of a NOR gate 583. The NOR gate 583 further has a second input terminal (b) directly connected to the (i3) input terminal of the circuit 70.1.1.1 to receive the EN 1 input signal, and a signal output terminal 583 (c). The output terminal 583 (c) is directly connected in common to both the J and K input terminals of each of the Flip-Flops 559, 576 and 580. The signal output terminal 583 (c) is also connected to the Enable (en) input terminals of the Tri-State Buffer Network 568, and to the One-Shot Networks 556 and 572.

Display Scanners

Referring to FIGS. 1 and 3, the Microprocessor 35 provides output signals by means of the signal flow path 48 to Message Waiting and Room Status Displays (39.A and 39.B) respectively. The Message Waiting Displays are digital read-out displays physically located throughout the hotel/motel in prominent view of the guests of the hotel/motel (for example, in the lobby, in the corridors, in the lounge, etc) where they can be easily viewed by the hotel/motel guests. There can be any number of such Message Waiting Displays 39.A strategically located throughout the hotel/motel system. The Message Waiting Displays sequentially present a digital visual indication of those room numbers for which the respective guests thereof should contact the main desk of the hotel/motel for a message. In the preferred embodiment, the Message Waiting Displays sequentially display the room numbers of those rooms for which messages are waiting, each room number being displayed for two seconds within the cyclic display procedure.

The Room Status Displays 39.B, are similar in construction to the Message Waiting Displays 39.A, in that their purpose is to sequentially display the identifying numbers of those rooms within the hotel/motel requiring cleaning. The Room Status Displays 39.B are physically located within the Housekeeper's office, and at strategic maid terminals throughout the hotel/motel system. It will be understood that the Microprocessor 35 can communicate information by means of the signal flow path 48.B to any number of Room Status Displays 39.B throughout the hotel/motel. The Microprocessor maintains a real-time log of the housekeeping and occupied status of each of the rooms throughout the hotel/motel, and continuously updates the Room Status information being provided to the Room Status Display Scanners 39.B as changes in the status of the respective rooms occurs.

Figure 14:
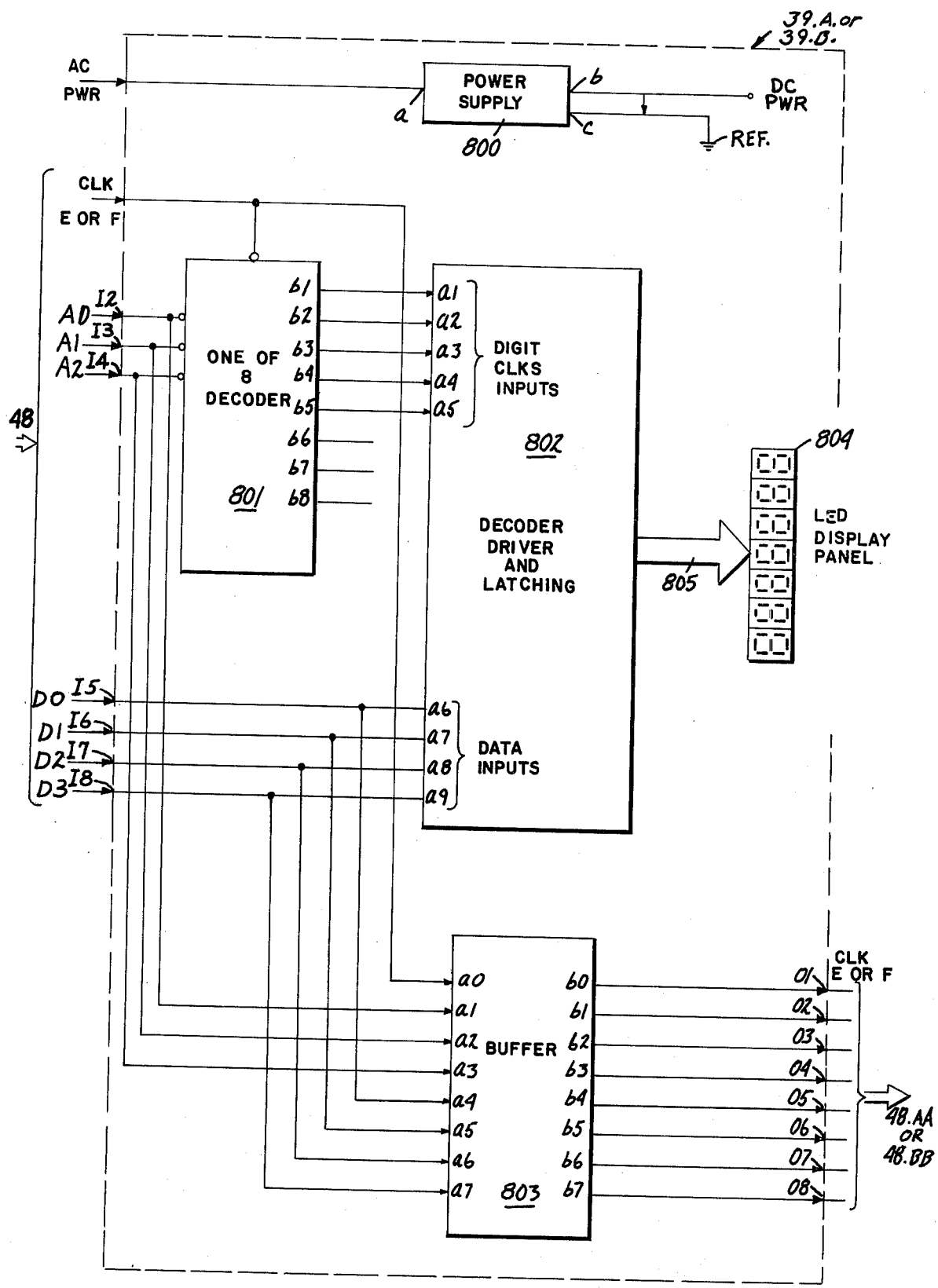
FIG. 14 is a schematic diagram of the Message Waiting and Room Status Drive and Display networks, disclosed in FIG. 3.

A more detailed description of the drive and decoding circuitry of the Display Scanners 39 is illustrated in FIG. 14. Referring thereto, and to FIG. 5 it will be noted that the structure of the Display Scanners 39 is identical for both the Message Waiting and for the Room Status Displays (39.A and 39.B) respectively. The circuit block diagram illustrated in FIG. 4 represents one of the individual Message Waiting or Room Status Scanners (for example 39.A.1 or 39.B.1). Therefore, with respect to the description of the FIG. 14 schematic diagram, the circuit will be generally referred to as the "Scanner" network.

Each Scanner Network has its own Power Supply 800 connected to receive power from an appropriate standard A.C. power source within the hotel/motel, and includes those circuits required for providing by means of its signal output terminal 800 (b) and its reference output terminal 800 (c). The D.C. power signals required for energizing the electrical circuits within the Scanner Network. The Scanner Network has a plurality of input terminals (I1–I8) connected for receiving input signals from the Microprocessor 35 by means of either the signal flow path 48.A or signal flow path 48.B, depending upon whether the Scanner Network is being employed as a Message Waiting Display 39.A or as a Room Status Display 39.B. The Scanner Network further has a plurality of signal output terminals (01–08) for providing buffered output signals by means of either the signal flow path 48.AA or 48.BB, if more than one Scanner Network of the same type (i.e. Message Waiting or Room Status) is connected in series with the first of such Scanner Networks.

The Scanner Network further has a One of 8 Decoder network 801, a Decoder Driver and Latching network 802, a Buffer Network 803 and a plurality of seven segment Light Emitting Diode Display Characters, generally designated at 804.

The One of 8 Decoder 801 has three digit select input terminals (a1)–(a3) a clock input terminal (clk), and eight signal output terminals (b1)–(b8). The Buffer Network 803 has a plurality of eight input terminals (a0)–(a7), and a plurality of eight output terminals (b0–(b7), respectively consecutively corresponding with the (a0–a7) input terminals. The digit select signals A0, A1, and A2 provided by the Microprocessor 35 are respectively applied by means of the input terminals (I2-I4) to the input terminals (a1–a3) of each of the One of 8 Decoder network 801 and of the Buffer network 803. The CLK E or (F) clock input signal received from the Microprocessor 35 is applied by means of the input terminal (I1) of the Scanner Network to the clock (clk) input terminal of the One of 8 Decoder 801, and also to the (a0) input terminal of the Buffer Network 803.

The One of 8 Decoder 801 is operative to receive a three-bit binary encoded signal at its input terminals (a1–a3) and to provide in response to the encoded signal an output signal at one of its output terminals (b1–b8). In the preferred embodiment, only the (b1)–(b5) output terminals of the Decocer 801 are connected, since the Led Displays 804 only includes five digit positions. It will be understood, however, that the principles of this invention would apply to a Display 804 having any number of display characters. The encoded three-bit input signal received at the input terminals (a1–a3) of the Decoder 801 determines which one of the five Led characters within the network 804 will be clocked at an instance of time.

The (b1–b5) signal output terminals of the One of 8 Decoder 801 are respectively consecutively connected to five input terminals (a1–a5) of the Decoder Driver and Latching Network 802. The Decoder Driver and Latching Network 802 further has a plurality of data input terminals (a6–a9) connected to receive the Data Output signals (D0–D3) from the Microprocessor 35 by means of the input terminals (I5–I8) respectively of the Scanner Network. The DO–D3 data input signals are also respectively consecutively applied to the (a4–a7) input terminals of the Buffer Network 803.

The Decoder Driver and Latching Network 802 is operative to decode the four-bit Binary Coded Decimal number applied to its Data signal inputs (a6–a9) to energize the appropriate ones of the seven segments of each of the seven-segment LED display characters within the display network 804. That one of the five LED characters which is energized in response to the received Data is determined by the input signal condition at the five Digit Clock Input terminals (a1–a5). The Decoder Driver and Latching circuitry will maintain the last-clocked energization status to each of the five LED characters within the output display 804 until new information is clocked into the Decoder Driver and Latching Network 802 from the One of 8 Decoder 801. As will become apparent upon a more detailed description of the operation of the system, the clock rate and information displayed upon the output display LED characters 804 is controlled by the Microprocessor 35. The Decoder Driver and Latching Network 802 circuitry is well known in the art and will not be detailed herein. The output signals from the Decoder Driver and Latching Network 802 is provided to the output LED Displays 804 by means of the signal flow path 805.

The Buffer Network 803 is operative to buffer the input signals received at its input terminals (a0–a7) and to respectively apply the buffered signals at its output terminals (b0–b7). The buffered output signals from the (b0–b7) output terminals of the Buffer 803 are respectively applied to the (01–08) output terminals of the Scanner Network for transmission by means of the signal flow path 48.AA (or 48.BB) to another serially connected Scanner Network.

Console

Figure 2:
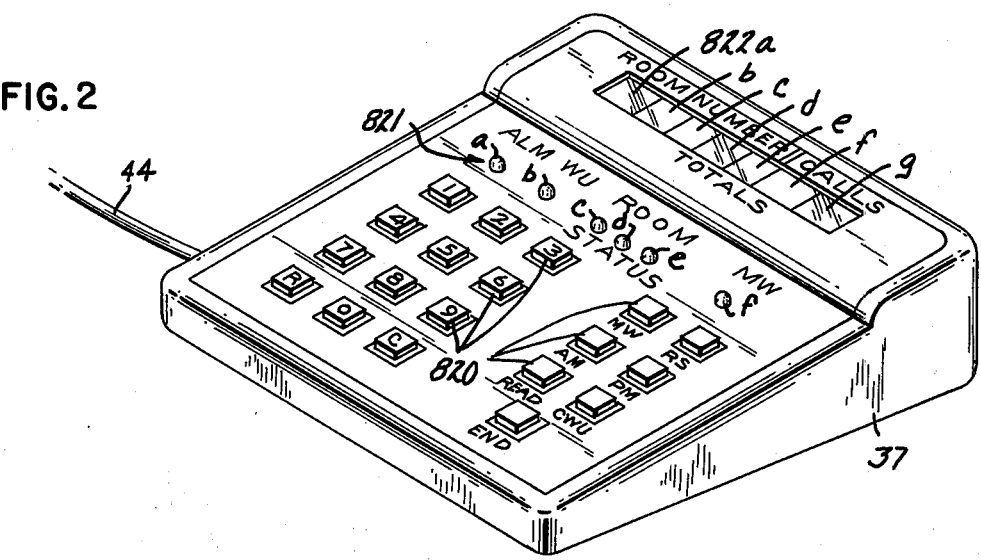
FIG. 2 is a perspective view of a desk-mountable console of the preferred embodiment control system, schematically illustrated in FIG. 1.

Referring to FIGS. 1–3, the Microprocessor 35 provides output signals by means of the signal flow path 44 to a plurality of consoles 37. In the preferred embodiment, there are four such consoles, of the type illustrated in FIG. 2; however, it will be understood that any number of input/output consoles can be provided within the spirit and intent of this invention. The consoles 37 provide the means by which the Microprocessor 35 and the system operators and users communicate directly with one another. The consoles 37 are typically placed at the main desk of the hotel/motel for operative access thereto by the front-desk personnel such as cashiers, reservation personnel and the like.

Referring to FIG. 2, each of the consoles generally has a plurality of push-button input switches, generally designated at 820. Ten of the input switches, designated as "0" – "9" respectively correspond to received input data corresponding to the decimal numerals 0 – 9 respectively. The "R" switch designation corresponds to a "reset" input signal and the "C" switch designation corresponds to an input "clear" signal. The remaining seven push-button switches are employed to accept various commands corresponding to the following designations: "MW"-Message Waiting Input Signal; "RS"-Room Status Input Signal; "AM"-the AM (Morning) hours of a day; "PM"-the PM (Evening) hours of a day; "READ"-an input signal to request output from the Microprocessor 35; "CWU"-a Clear Wake-Up Input Signal; and "END"-a signal indicating termination of an input from the console 37. The console further has a plurality of output Light Emitting Diodes (LED) indicators generally indicated at 821 (a–f). The LED 821 (a) corresponds to an "Alarm" output indication; the LED 821 (b) corresponds to a Wake-Up Output indication; the LEDs 821 (c–e) correspond in various combinations of illumination, to a number of Room Status output indications. The LED 821 (f) provides a Message Waiting output indication. The console 37 further has a plurality of seven-segment LED display characters, generally designated at 822 (a) -822 (g) respectively. The upper five seven-segment LED characters 822 (a) – 822 (e) are used to indicate the identifying number of respective rooms throughout the hotel/motel, and the lower two LED characters 822 (f) and 822 (g) are employed to provide an output indication of the number of outgoing telephone calls placed from a respective room within the hotel/motel. The LED display character 822 (g) is also employed to indicate an "A" or a "P" output designation corresponding to AM and PM times of the day respectively.

Figure 15:
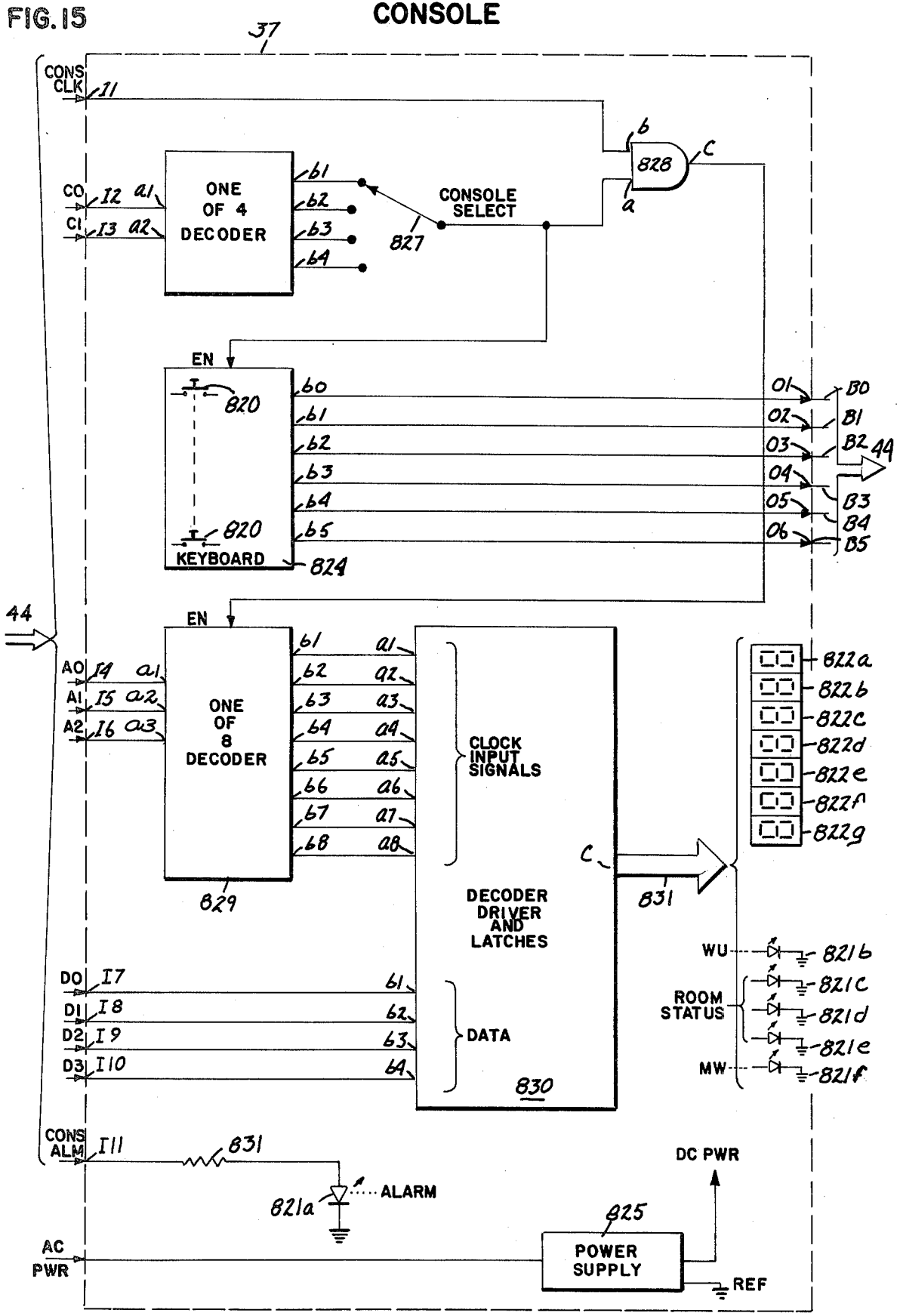
FIG. 15 is a schematic diagram of the circuits of the Console disclosed in FIGS. 1-3.

A more detailed description of the functional block circuitry of the Console 37 is illustrated in FIG. 15. Referring thereto, and to FIGS. 2, 3, and 5, it will be noted that the Console 37 has a plurality of signal input terminals generally designated at I1-I11 and an AC power input terminal. The Console 37 also has a plurality of signal output terminals 01-06 besides the visual output indicators 821 and 822.

The plurality of input selection switches 820 are represented as providing input selection signals to a Keyboard functional block 824. Each of the Keyboard switches 820 is operatively connected to a Power Supply 825 housed within the Console 37. The Power Supply 825 is operable to receive its energizing power from available 120 volt AC power available within the hotel/motel, and to provide DC output power for energizing the respective electrical circuits within the Console 37. Each of the Keyboard switches 820 when depressed provides an input signal to the Keyboard networks 824. The Keyboard 824 has an Enable (en) input terminal and a plurality of output terminals (b0-b5) respectively. The circuits of the Keyboard network 824 comprise any appropriate encoding networks suitable for converting the electrical stimulus supplied by depression of each of the input selection switches 820 into a five-bit binary encoded output signal which encoded signals appear at the (b0-b4) output terminals of the Keyboard functional block 824, as unique identifying encoded signals which can be correlated back to that specific input selection switch 820 which was depressed. The output terminal (b5) of the Keyboard network 824 carries a signal indicating whether or not one or any of the input selection switches 820 is depressed. The output terminals (b0-b5) of the Keyboard functional block 824 are respectively directly connected to the output terminals (01-06) respectively of the Console 37 and respectively carry the Console Data Signals "B0-B5" respectively by means of the signal flow path 44 to the Microprocessor 35 (see FIG. 5). The Keyboard circuits 824 are operative to provide output signals at the output terminals (b0-b5) only upon concurrent receipt of an enabling input signal at the Enable (en) input terminal of the Keyboard 824.

The input terminals I2 and I3 of the Console 34 are operatively connected to receive by means of the signal flow path 44, the C0 and C1 Console Select input signals from the Microprocessor 35 (see FIG. 5). The C0 and C1 input signals are directed applied to first (a1) and second (a2) input terminals respectively of a One of 4 Decoder network 826. The C0 and C1 input signals comprise a two-bit encoded binary signal for selection of one of the four Consoles 37 of the preferred embodiment. The One of 4 Decoder functional block 826 has a plurality of four output terminals (b1-b4) respectively, and is operable in response to the encoded two-bit signal received at its input terminals a1 and a2, to provide an energizing output signal at only one of its four output terminals (b1-b4). Each of the respective Consoles 37.1-37.4 has a jumper selection wire 827 respectively connected to a different one of the output terminals (b1-b4) of the Decoder 826, such that only one of the Consoles 37.1-37.4 is enabled at a time. The Console select wire 826 is directly connected to provide an input signal to a first input terminal 828 (a) of an AND gate 828.

The AND gate 828 further has a second signal input 828 (b) and a signal output terminal 828 (c). The input terminal I1 of the Console 37 is directly connected to the second input terminal 828 (b) of the AND gate 828, and is operatively connected to receive the Console Clock (CONS CLK) signal from the Microprocessor 35. The output terminal (c) of the AND gate 828 is directly connected to an Enable (en) input terminal of a One of 8 Decoder network 829. The Console Select jumper wire 827 is also connected to selectively connect a predetermined one of the output terminals of the Decoder network 826 to the Enable (en) input terminal of the Keyboard network 824.

The One of 8 Decoder network 829 further has three digit select input terminals (a1) – (a3), and eight signal output terminals (b1-b8). The digit select signals A0, A1 and A2 provided by the Microprocessor 35 are respectively applied by means of the input terminals I4-I6 of the Console 35 to the input terminals (a1-a3) of the Decoder functional block 829. The One of 8 Decoder network 829 is operative to receive a three-bit binary encoded signal at its input terminals (a1-a3) and to provide in response to the encoded signal a single output signal at one of its output terminals (b1-b8).

The output terminals (b1-b8) of the Decoder network 829 are respectively directly connected to eight clock input terminals (a1) – (a8) respectively of a Decoder Driver and Latching Network 830. The Decoder Driver and Latching Network 830 further has four Data Input terminals (b1) – (b4) respectively directly connected to the input terminals I7-I10 respectively of the Console 37. The I7-I10 input terminals are respectively directly connected to receive the DO-D3 data input signals from the Microprocessor 35 by means of the signal flow path 44. The Decoder Driver and Latching network 830 further has a plurality of output terminals collectively designated in FIG. 15 as (c) operatively connected by means of a signal flow path 831 to the seven-segment LED character displays 822 and to the plurality of LED displays 821.

The Decoder Driver and Latching Network 830 is operative to energize selected ones of the LED character displays 822 and LED devices 821 in response to the Clock input signals received at its input terminals (a1) – (a8). The input terminals (a1) – (a7) of the network 830 respectively correspond to energization of the seven LED Character Display members 822 (a) – 822 (g) respectively. Therefore, an enabling clock input signal applied to the input terminal 830 (a1) will allow energization of the LED character display 822 (a), etc. The Decoder Driver and Latching Network 830 is operative to decode the four-bit Binary Coded Decimal Number applied to its Data signal inputs (b1-b4) for energizing the appropriate ones of the seven segments of each of the LED display characters 822. For example, when a clock input signal is applied to the input terminal 830 (a1), the circuits within the Decoder Driver and Latching Network 830 will energize those ones of the seven segments within the LED Display character 822 (a) which correspond to the encoded information received at the Data input terminals (830 (b1) – 830 (b4)).

The input terminal 830 (a8) of the Decoder Driver and Latching network enables energization of all of the Light Emitting Diodes 821. The Decoder Driver and Latching Network 830, effectively treats the plurality of Light Emitting Diodes 821 as a single output character display. Therefore, when the 830 (a8) input terminal is selected by a clock input signal, those ones of the Light Emitting Diodes 821 which will be energized will depend upon the encoded information received at the Data input terminals 830 (b1) – 830 (b4) of the Decoder Driver and Latching Network. The Decoder Driver and Latching circuitry 830 will maintain the last-clocked energization status to the LED display devices 821 and 822 respectively until new information is clocked into these output devices from the Latching Network 830 under control of the Microprocessor 35. The Decoder Driver and Latching Network circuitry 830 is well-known in the art and will not be detailed herein.

The input terminal I11 of the Console 37 is connected by means of a resistor 831 to energize the Alarm indicating LED 821 (a). The input terminal I11 of the Console 37 is directly connected to receive the Console Alarm (CONS ALM) output signal from the Microprocessor 35 by means of the signal flow path 44.

Printer

The preferred embodiment of the control system 30 includes a printer for providing a hard-copy record of all input/output transactions of the system 30 in its operation in monitoring and controlling the plurality of Features A-D. The printer may comprise any appropriate printer suitable for providing a printed record copy in response to appropriate output signals from the Microprocessor 35. In the preferred embodiment, the Printer 38 employed is a sixteen-column scanning-type printer having a capability of printing up to eleven characters and a blank in each of the sixteen columns. In the preferred embodiment, all print sectors or columns are selected in unison during the character selection phase of the print cycle. This common alignment of the print sector characters permits use of a common input Scan signal to the printer, enabling character selection by means of a short pulse of current. The printer incoporates a timing circuit which generates a serial pulse train represented as the PR SCAN signal in FIG. 5, which is generated by a photo-sensitive light source, described hereinafter in more detail. The actual printer is not disclosed in the figures but is completely described in a publication entitled Model 56 Parallel Printer by Addmaster Corporation, publication number ADDM 041, printed in 1974 (incorporated herein by reference).

Figure 16:
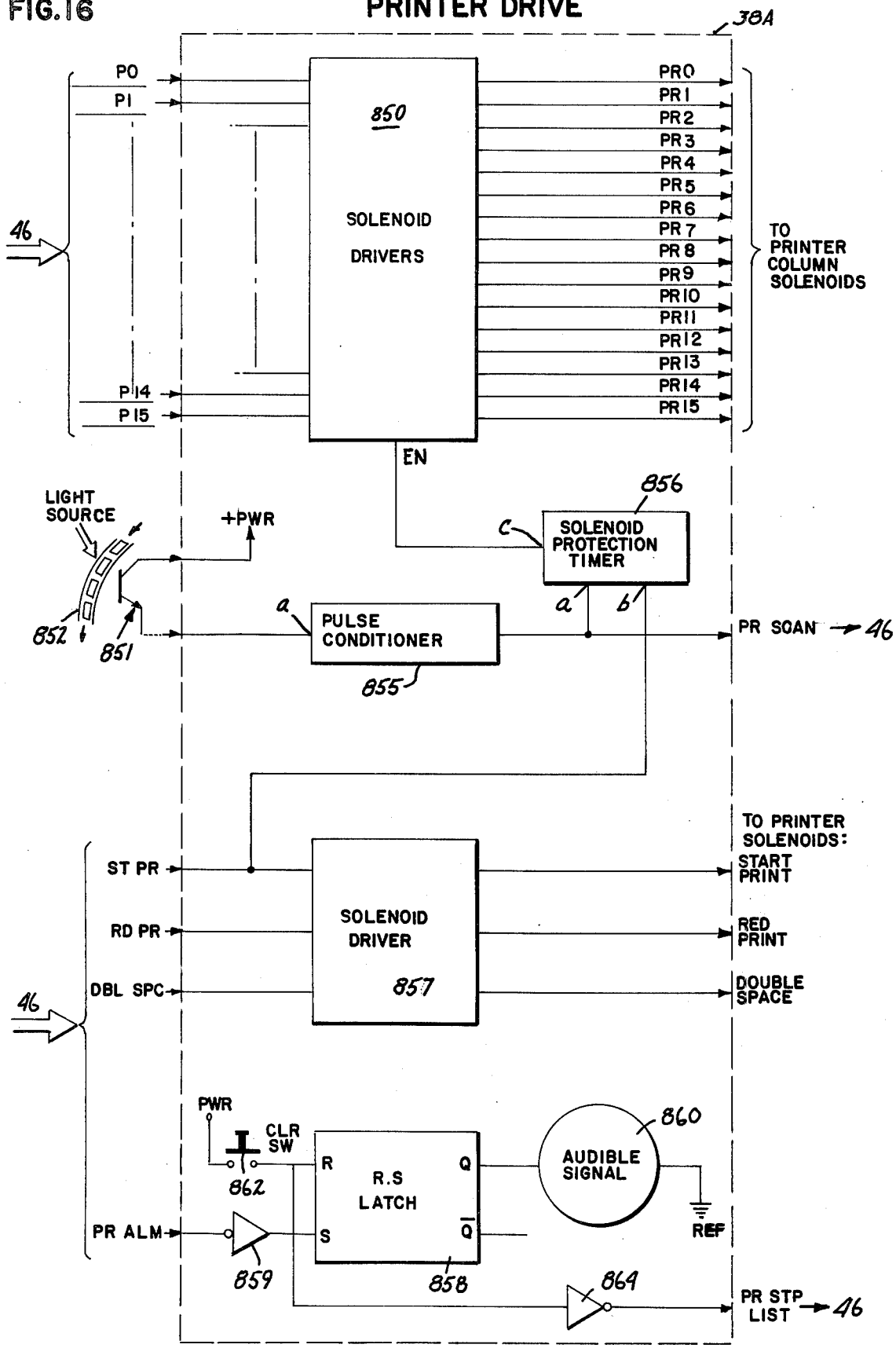
FIG. 16 is a schematic diagram of the drive circuits for the peripheral Printer, disclosed in FIGS. 1 and 3.

A more detailed description of the Printer Drive Circuitry employed to interface with and energize the Printer of the preferred embodiment as disclosed in FIG. 16. Referring thereto, the printer drive circuitry 38A, includes a plurality of solenoid drivers 850, one driver for each of the sixteen printing columns of the printer. The sixteen character selection signals P0-P15 from the Microprocessor 35 are respectively consecutively applied by means of individual ones of the solenoid drivers 850 to a plurality of output terminals PR0-PR15 respectively which are directly connected to the respective column solenoids within the printer. The P0-P15 Character Select signals received from the Microprocessor 35 comprise pulses which are applied by means of the solenoid driver circuits 850 to the respective printer column solenoids for selecting the proper character to be printed for each of the respective print wheels within the respective sixteen printer columns. In the preferred embodiment printer, a single drive shaft commonly rotates each of the print wheels within the sixteen printing columns. The Print Scan (PR SCAN) timing signal is generated within the printer by a lamp and phototransmitter timing apparatus between which is interposed a shutter apparatus which rotates with the common print wheel drive shaft. As the print wheel drive shaft rotates, the shutter intermittently interrupts the light directed toward the phototransistor, causing the phototransistor to produce a series of Print Scan (PR SCAN) pulses. In the preferred embodiment, there are 11 PR SCAN pulses produced for one rotation of the print drive shaft, corresponding to the 11 different characters that can be printed by each print wheel of each printing column. The PR SCAN signals are applied to the Microprocessor 35 by means of the signal flow path 46, and the Microprocessor 35 strobes the respective sixteen printer data signal lines (PO-P15) in response to each PR SCAN signal at the appropriate instances of time, so as to select the desired characters to be printed for each of the columns.

Referring to FIG. 16, the phototransistor within the Printer timing assembly is schematically illustrated at 851, and the shutter apparatus is schematically illustrated at 852, as interposed between a light source and the photosensitive transistor 851. The collector of the phototransistor 851 is directly connected to a positive power source (+ PWR) originating within the printer control circuit 38A, and the emitter of the transistor 851 is connected to the input port (a) of a Pulse Conditioning circuit 855. The output signal from the Pulse Conditioning circuit 855 is applied to a first (a) input terminal of a Solenoid Protection Timing circuit 856, and is also provided as the PR SCAN input signal to the Microprocessor 35 by means of the signal flow path 46.

The Solenoid Protection Timer network 856 further has a second signal input terminal (b) and a signal output terminal (c) which is directly connected to an Enable (en) input terminal of the Solenoid Driver network 850. The Solenoid Protection Timer network 856 is operative to enable the Solenoid Driver network 850 only during those time periods during which the energizing signals PR0-PR15 are required for transmittal to the printer column solenoids for proper character selection, and otherwise is operable to prevent energization of the Printer Column Solenoids to prevent damage thereto.

The Printer of the preferred embodiment requires a Start Pulse (ST PR) each time the printer is to print a line of characters. This pulse is provided to the Printer Drive Circuits from the Microprocessor 35 by means of the signal flow path 46 whenever the Microprocessor 35 commands the Printer 38 to print output information from that buffer network within the Microprocessor 35 which is assigned to hold information to be printed. The ST PR signal is directly applied to the second input terminal of the Solenoid Protection Timer network 856 and is also applied by means of a second solenoid driver circuit 857 to a Print Starting solenoid within the printer. The Solenoid Driver network 857 further receives the Red Print (RD PR) and the Double Space (DBL SPC) output signal from the Microprocessor 35 and applies these signals to appropriate solenoids within the Printer. The RD PR signal is employed to select a red ink print-out and the DBL SPC signal is employed to provide multiple spacing between successively printed lines.

The printer control circuitry 38A also includes an RS Latch 858 having an R input terminal, a S input terminal, a Q output terminal, and a $\overline{Q}$ output terminal. The Latch 858 is employed in an Alarm Feature of the system wherein an audible alarm signal is initiated if a guest should fail to answer an Automatic Wake-Up Message. The Printer Alarm (PR ALM) output signal from the Microprocessor 35 is applied by means of an inverter 859 to the set (S) input terminal of the Latch 858. Upon receipt of an input signal at its S input terminal, the Latch provides a continuous energizing output signal at its Q output terminal. The Q output terminal of the Latch 858 is directly connected to energize an Audible Signal generating means 860. The reset (R) input terminal of the Latch 858 is connected by means of a push-button Clear Switch 862 to a power source for clearing the Latch 858 and for extinguishing the Audible Signal 860 upon a manual depression of the Clear Switch 862. The input R terminal of the Latch 858 is also connected by means of an inverter 864 to provide the Clear or Print Stop List (PR STP LIST) input signal to the Microprocessor 35 by means of the signal flow path 46.

The printer drive shaft is operative only in response to an energizing signal from the Microprocessor 35. When the Microprocessor 35 decides to print a line of characters, it transmits a Start Print (ST PR) signal to the Printer Drive Circuit 38A by means of the signal flow path 46. The ST PR signal applied to the Printer by means of the Solenoid Driver network 857 starts the drive motor within the Printer, causing the common printer drive shaft to rotate through one revolution or cycle. As the printer drive shaft rotates through its cycle, the photo-timing elements produce 11 PR SCAN pulses, corresponding to 11 identifiable positions of rotation of the drive shaft and connected print wheels, which are also respectively associated with the 11 different characters on each print wheel. As each PR SCAN pulse is transmitted to the Microprocessor 35, the Microprocessor determines which of the 16 printing columns (represented by the output terminals P0–P15 of the Microprocessor 35—see FIG. 5) are to print that character which is represented by the most recently received PR SCAN signal. The Microprocessor 35 transmits pulse signals on those terminals P0–P15 corresponding to the 16 respective print wheels which are to print the character represented by the current PR SCAN signal. The solenoid drivers 850 transmit the received signals and energize the corresponding printer column solenoids to arrest further rotation of the print wheels corresponding to those selected columns, causing the character associated with the PR SCAN signal location to be printed in that respective column. This procedure is repeated for each of the 11 character positions (i.e. until the common printer drive shaft has completed its revolution). At the completion of the drive shaft revolution a print signal is energized by the drive shaft, the respective selected characters for each of the 16 print columns are simultaneously printed, and the drive shaft is repositioned for a subsequent line printing cycle.

OPERATION OF THE PREFERRED EMBODIMENT

General System Operation

The Control System 30 provides a highly sophisticated automated, yet simple to install and to use, system for controlling and monitoring various functons within a hotel/motel environment, and in particular to a plurality of such functions or features which are identical in respective types for each of the rooms throughout the hotel/motel. Except for the peripheral Consoles 37, Printer 38, and Display Scanners 39, the entire Control System is installed at a single centrally located position within the hotel/motel, generally Table 1

Terminal Correlation Between Standard IMM 4–43 Module and Circuit 35.A of FIG. 4

| IMM 4–43 | 35.A | IMM 4–43 | 35.A | IMM 4–43 | 35.A |
|---|---|---|---|---|---|
| 77 | .1 | 68 | .26 | 58 | .52 |
| 78 | .2 | 63 | .27 | 66 | .53 |
| 85 | .3 | 9 | .28 | 55 | .54 |
| 92 | .4 | 5 | .29 | 45 & 88 | .55 |
| 73 | .5 | 32 | .30 | 95 | .56 |
| 74 | .6 | 38 | .31 | 59 | .57 |
| 71 | .7 | 10 | .32 | 50 | .58 |
| 75 | .8 | 6 | .33 | 49 | .59 |
| 82 | .9 | 34 | .34 | 93 | .60 |
| 81 | .10 | 24 | .35 | 22 | .61 |
| 84 | .11 | 23 | .36 | 19 | .62 |
| 87 | .12 | 25 | .37 | 20 | .63 |
| 64 | .13 | 29 | .38 | 96 | .64 |
| 61 | .14 | 27 | .39 | 94 | .65 |
| 62 | .15 | 33 | .40 | 52 | .66 |
| 65 | .16 | 31 | .41 | 51 | .67 |
| 39 | .17 | 37 | .42 | 53 | .68 |
| 91 | .18 | 35 | .43 | 56 | .69 |
| 90 | .19 | 18 | .44 | 54 | .70 |
| 70 | .20 | 17 | .45 | 41 | .71 |
| 40 | .21 | 16 | .46 | 43 | PWR |
| 86 | .22 | 15 | .47 | 99 | PWR |
| 69 | .23 | 14 | .48 | 100 | PWR |
| 46 | .24 | 13 | .49 | 3 | REF |
| 67 | .25 | 12 | .50 | 4 | REF |
|  |  | 11 | .51 | 42 | REF |

TABLE 2

Terminal Correlation Between Standard IMM 6–28 Module and Circuit 35.D of FIG. 4

| IMM 6–28 | 35.D | IMM 6–28 | 35.D | IMM 6–28 | 35.D |
|---|---|---|---|---|---|
| 95 | .1 | 94 | .14 | 27 | .28 |
| 36 | .2 | 96 | .15 | 29 | .29 |
| 28 | .3 | 11 | .16 | 25 | .30 |
| 38 | .4 | 12 | .17 | 23 | .31 |
| 30 | .5 | 13 | .18 | 43 | .32 |
| 32 | .6 | 14 | .19 | 58 | PWR |
| 26 | .7 | 15 | .20 | 61 | PWR |
| 34 | .8 | 16 | .21 | 64 | PWR |
| 24 | .9 | 17 | .22 | 67 | PWR |
| 90 | .10 | 18 | .23 | 99 | PWR |
| 20 | .11 | 35 | .24 | 100 | PWR |
| 19 | .12 | 37 | .25 | 91 | REF |
| 92 | .13 | 31 | .26 | 3 | REF |
|  |  | 33 | .27 | 4 | REF |

TABLE 3

Terminal Correlation Between Standard IMM 6–26 Module and Circuit 35.E and 35.F of FIG. 4

| IMM 6–26 | 35.E and 35.F | IMM 6–26 | 35.E and 35.F | IMM 6–26 | 35.E and 35.F |
|---|---|---|---|---|---|
| 67 | .1 | 31 | .11 | 11 | .21 |
| 94 | .2 | 37 | .12 | 99 | PWR |
| 96 | .3 | 35 | .13 | 100 | PWR |
| 20 | .4 | 18 | .14 | 97 | PWR |
| 19 | .5 | 17 | .15 | 58 | PWR |
| 23 | .6 | 16 | .16 | 61 | PWR |
| 25 | .7 | 15 | .17 | 43 | PWR |
| 29 | .8 | 14 | .18 | 44 | PWR |
| 27 | .9 | 13 | .19 | 3 | REF |
| 33 | .10 | 12 | .20 | 4 | REF |

TABLE 4

Terminal Correlation Between Standard IMM 4–60 Module and Circuit 35.B of FIG. 4

| IMM 4–60 | 35.B | IMM 4–60 | 35.B | IMM 4–60 | 35.B |
|---|---|---|---|---|---|
| J2–21 | .1 | J2–3 | .19 | 52 | .37 |
| J2–22 | .2 | J2–4 | .20 | 94 | .38 |
| J2–23 | .3 | J2–6 | .21 | 96 | .39 |
| J2–24 | .4 | J2–7 | .22 | 20 | .40 |
| J2–26 | .5 | J2–8 | .23 | 19 | .41 |
| J2–27 | .6 | J1–9 | .24 | J1–13 | .42 |
| J2–28 | .7 | J1–8 | .25 | J1–12 | .43 |
| J2–29 | .8 | J1–7 | .26 | J1–11 | .44 |
| J2–31 | .9 | J1–6 | .27 | J1–14 | .45 |
| J2–32 | .10 | J1–3 | .28 | J2–13 | .46 |

TABLE 4-continued

Terminal Correlation Between Standard IMM 4-60 Module and Circuit 35.B of FIG. 4

| IMM 4-60 | 35.B | IMM 4-60 | 35.B | IMM 4-60 | 35.B |
|---|---|---|---|---|---|
| J2-33 | .11 | J1-4 | .29 | J2-12 | .47 |
| J2-34 | .12 | J1-1 | .30 | J2-16 | .48 |
| J2-36 | .13 | J2-9 | .31 | J2-17 | .49 |
| J2-37 | .14 | 41 | .32 | J2-19 | .50 |
| J2-38 | .15 | 54 | .33 | 99 | PWR |
| J2-39 | .16 | 56 | .34 | 100 | PWR |
| J2-1 | .17 | 53 | .35 | 3 | REF |
| J2-2 | .18 | 51 | .36 | 4 | REF | within the same room in which the PBX telephone equipment is installed. The Control System 30 can be rapidly installed within any existing hotel/motel and can completely perform its control functions for its respective Features, without the requirement of any additional wiring to the individual rooms throughout the hotel/motel and without the requirement of any additional equipment or hardware other than the existing telephones, within the individual hotel/motel rooms. With the preferred embodiment Features of the Control System 30, all interface connections between the Control System 30 and the PBX or Central Office telephone equipment are made at the site of the PBX or Central Office hardware at the central location within the hotel/motel.

In the preferred embodiment application, the Control System 30 monitors and/or controls four basic Features: (1) The counting and recording of outgoing telephone calls made from rooms within the hotel/motel (Message Register); (2) a real-time tracking and automatic updating of a list of those rooms within the hotel/motel for which a message is waiting, and a display to Message Waiting Display Scanners 39.A remotely located at strategic locations throughout the hotel/motel of a continuous sequential representation of the respective room numbers within the Message Waiting list (Message Waiting); (3) the automatic monitoring of the real-time occupancy and housekeeping status of each of the rooms within the hotel/motel, with an accompanying display of relevant housekeeping room status to display scanners 39.B remotely located at maids facilities throughout the hotel/motel system (Room Status); and (4) an automatic processing including initiating, logging, recording, and processing of wake-up messages on a real-time basis throughout the hotel/motel (Automatic Wake-Up). Extended features of the Room Status Feature include the disabling of telephones throughout the hotel/motel when the "status" of the respective rooms is "unoccupied", and the activation of "disabled" phones throughout the hotel/motel for emergency use purposes. All of the timing, monitoring, and control operatiions performed by the Control System 30 are performed under firmware control by means of the Microprocessor 35. The basic firmware instructions and routines are all permanently affixed in hard-wired firmware format within the PROM memory portions of the control system. As previously discussed, once the firmware instructions and commands have been entered into the PROM memories, they cannot be altered or changed thereafter under operator control, but provide a hardware program base for controlling and operating the Control System 30 thereafter.

The Microprocessor 35 of the preferred embodiment operatively interfaces with and controls four different types of memory banks: (1) 320 four-bit locations of working storage of RAM memory physically located within the Central Processor 35.A of the Microprocessor 35; (2) up to 8K eight-bit locations of volatile RAM memory located in the RAM functional block 35.D of the Microprocessor 35; (3) up to 4K eight-bit PROM memory used for storage of data "look-up" tables, located in the PROM I and PROM II functional blocks 35.E and 35.F respectively; and (4) up to 8K eight-bit of PROM memory used for storage of firmware instructions, located in the PROM I and PROM II functional blocks 35.E and 35.F of the Microprocessor 35. In the preferred embodiment illustrated, only a total of 9K eight-bit PROM storage is employed, of which 1K thereof is used as a "look-up" table, and the remaining 8K is used for firware instruction storage.

The Central Processor 35.A commonly addresses the lower eight address bits of the RAM (35.D), the PROM I (35.E) and PROM II (35.F) memories by means of its output terminals 35.A.44–35.A.51. The upper four address bits of the RAM memory 35.D are addressed by the Central Processor 35.A and its Expander unit 35.B by means of the input terminal 35.D.11, 35.D.12, 35.D.14 and 35.D.15 of the RAM memory module 35.D. The four upper address bits of the PROM memory modules 35.E and 35.F are addressed by the chip select output terminals 35.A.62–35.A.65 of the Central Processor 35.A by means of the upper address input terminals 35.E.2–.5 and 35.F.2–.5, respectively of the PROM I and the PROM II memory banks 35.E and 35.F respectively. The RAM and PROM memories are enabled in 4K blocks by memory bank enable signals. In the preferred embodiment of the invention illustrated, only 4K of RAM memory is employed in the RAM functional block 35.D, which is enabled by means of the input terminal 35.D.32 of the RAM 35.D. The RAM enabling input signal is derived from a logical combination of the output signals from the output terminals 35.A.56 and 35.A.57 of the Central Processor 35.A, as applied to the input terminals 35.C.28 and 35.C.29 of the Memory Interface and Interrupt Control Logic 35.C (see FIGS. 4 and 6). The PROM I (35.E) and PROM II (35.F) memories respectively are enabled by means of their input terminals 35.E.1 and 35.F.1 respectively which originate within the Memory Interface and Interrupt Control Logic 35.C under control of the Central Processor (see FIGS. 4 and 6), and the respective memory banks within the PROM functional blocks 35.E and 35.F are selected by means of the chip select input terminals 35.E.2–.5 and 35.F.2–.5.

The data at each RAM and PROM memory location is eight-bits wide and is transferred for read operations from the respective RAM or PROM memories to the eight data input terminals 35.A.36–35.A.43 of the Central Processor 35.A. It will be recalled that since data cannot be written into the PROM memories, only read operations are available for transferring data from the PROM memories 35.E and 35.F to the Central Processor 35.A. During write operations from the RAM memory 35.D, the eight-bit word is transferred from the I/O output terminals 35.A.66–35.A.69 of the Central Processor 35.A to the input terminals 35.D.2–35.D.9 of the RAM 35.D (via the Memory Interface and Interrupt Control Logic network 35.C) in two four-bit bytes. The respective byte being transferred is coordinated and controlled by means of the two byte control input terminals 35.D.10 and 35.D.13 of the RAM 35.D, which carry byte select and control signals originating within the Central Processor 35.A (see FIGS. 4 and 6).

The 320 four-bit locations of the RAM memory within the Central Processor functional block 35.A are directly connected to the four I/O terminals 35.A.66-35.A.69 of the Central Processor 35.A. The Central Processor RAM memory receives both addresses and data via these four I/O lines and sends data out on these four I/O lines. The Central Processor RAM memory is used in the preferred embodiment for holding working data such as: data for the next line to be printed, data to be displayed to the consoles, real time clock data, totalizer data, equipment numbers requiring emergency dialing, etc. The data stored in the Central Processor RAM memory is of the type which is continuously used by the Central Processor in its processing and control operations and is stored directly within the Central Processor functional block 35.A for ease of access.

The RAM memory 35.D is employed to store information related to the respective rooms in the hotel/motel. This data comprises such information as: the number of local calls made from the respective rooms, the respective wake-up times for the individual rooms; the particular housekeeping status of the respective rooms, the status of the message-waiting indicators within respective rooms; and timing and other bookkeeping data used by the Microprocessor in the performance of its firmware program instructions. The address locations of the RAM 35.D are associated with respective room or equipment numbers. A portion of the RAM 35.D memory is used for storage of bookkeeping data such as total calls made from respective rooms throughout the hotel/motel. The battery reserve 55.2 (see FIG. 3) within the power source 55 is connected to maintain the contents of the RAM functional block 35.D in the event of a power failure, such that the "totalized" bookkeeping data and clock-time data stored therein is preserved in the event of a power failure.

The program instructions for the Central Processor 35.A are firmwired within the PROM memories 35.E and 35.F and within the 1K of PROM memory within the Central Processor 35.A. A portion of the PROM memory comprises a "data table". The size of the memory needed to store the data table will vary depending upon the number of rooms to be controlled/monitored by the control system 30. The data table is primarily used to store information enabling the Central Processor to identify and distinguish between individual rooms throughout the hotel/motel. Each hotel/motel room to be controlled/monitored by the control system is assigned an identifiable equipment number. Each of the equipment numbers is identifiable with one of the Message Register and Message Waiting Room Circuits (such as that illustrated at 60.1.1.1 in FIG. 9), and with one of the Room Status and Automatic Wake-Up Room Circuits (such as 70.1.1.1 illustrated in FIG. 12). The equipment numbers are binary and are sequentially stored within the data table portion of the PROM memory. The respective room numbers of the hotel/motel (which are typically not sequential and are different from hotel/motel to hotel/motel) are stored at the respective memory locations associated with the identified equipment numbers for those rooms. For example, the first hotel/motel room number designation is stored within the memory location in the data table associated with the first equipment number.

By consulting the PROM data table, the Microprocessor 35 can associate an actual room number with an equipment number in performing its various Feature monitoring/control functions. For example, the actual hotel/motel room numbers are displayed on the respective scanner display panels 39 throughout the hotel/motel, however, the control system 30 has executed its monitoring/control operations with respect to that room under that room's equipment number; therefore correlation must be made between the equipment number and the actual room number. This correlation is performed by reading the stored room number at the proper data table address corresponding to the associated equipment number. Similarly, when a room number is entered into the Console, it is necessary to associate the proper equipment number with the entered room number. This can be performed by reading data table locations within the data table until the appropriate room number is located and by then making note of the address at which the proper room number was found. To save time in searching for an entered room number, the data table is arranged with the lowest room number at the lowest address, with each successive address consecutively containing the next highest room numbers consecutively. With this arrangement, a binary search can be performed. As is well known in the art, a binary search basically comprises entering the data table at its middle address, checking the number stored at that address, deciding if the number is higher or lower than the number to which it is being compared. If the read number is higher than the number against which it is being compared, the next address of the data table which is checked is the middle address of the lower half of the data table. Similarly, if that address checked is too low, the next address location of the data table which is checked is the middle address of the upper half of the lower half of the address table. This dividing process continues until the appropriate number is found.

Besides the room identifying numbers, the data table includes various fixed data parameters such as: the number of rooms within the hotel/motel, the security code, an identification of the particular features used within an individual system, the starting address of the room number table (parameters needed for the binary search), and the sizes of memory blocks to be scanned in any one time period.

In addition to controlling the reading and writing operations of the respective memory blocks of the system, the Microprocessor 35 controls the data flow to and from the Feature monitoring and control circuits located external of the Microprocessor 35, by means of a plurality of Input/Output ports, comprising the basic Input/Output ports of the Central Processor functinal block 35.A and the additional Input/Output ports provided by the Expander functional block 35.B. Each of the input and output ports comprises four binary bits of information. The Input ports include the necessary decoding and gating logic required for placing that four bits of binary information presently available at the respective Input port terminals on the four I/O terminals 35.A.66–35.A.69 of the Central Processor 35.A when that respective Input port is addressed. The address for the Input ports comprises a four-bit binary address transmitted via the Chip Select terminals 35.A.62–35.A.66 of the Central Processor 35.A. The four Chip Select addressing lines enable the use of 16 different four-bit Input ports. The Output ports of the Microprocessor 35 are four-bit ports comprising appropriate latches with decoding logic, which are also addressed by means of the Chip Select address lines 35.A.62–35.A.65 of the Central Processor 35.A. When a respective output port is addressed by means of the Chip Select lines, the four bits of information available at the I/O terminals 35.A.66–35.A.69 of the Central Processor 35.A are latched into the output latches of the respective Output port. Except for Interrupt signals, all communication of the Microprocessor 35 with the monitoring and control circuits for the respective Features of the control system 30 are performed by means of the Input and Output ports.

Interrupt Command signals are transferred to the Central Processor 35.A from the peripheral Feature control and monitoring circuits by means of the Input terminal 35.A.61 (FIG. 4). The main Interrupt control signal applied to the Input terminal 35.A.61 is received from the Output terminal 35.C.24 of the Memory Interface and Interrupt Control Logic functional block 35.C. Referring to FIG. 6, Interrupt signals are generated from three primary sources. A first source is a timing source which generates an interrupt signal every 10 milliseconds. The 10 millisecond interrupt signal is generated from a 60 Hz signal applied to the input terminal 35.C.1 and developed by means of the frequency synthesizer 205 and the flip-flop 206 into a 10 millisecond interrupt signal applied by means of the OR gate 207 to the Output terminal 35.C.24. A second interrupt signal is received from the Printer 38 in response to a received Print Scan (PR SCAN) signal from the Printer indicating that the drive shaft of the Printer has reached one of its 11 angular positions in setting up the characters to be printed in their respective sixteen printing columns. The PR SCAN signal is received by the Input terminal 35.C.7 is applied by means of the flip-flop 210 and the OR gate 207 to the primary Interrupt Control signal line 35.C.24. The third Interrupt signal indicates that a failure or interruption in the main power applied to the Microprocessor 35. The input terminal 35.C.2 monitors the voltage level directly from the unregulated power supply 55 (FIG. 3). The monitored raw d.c. voltage level is sensed by the threshold detector 212, which provides an interrupt output signal by means of the OR gate 207 to the Interrupt Control signal line 35.C.24, whenever the power supply voltage falls below a predetermined minimum threshold level required to sustain operation of the Microprocessor 35 circuit. Whenever the Central Processor 35.A receives an interrupt request at its primary interrupt control terminal 35.A.61, the Central Processor 35.A completes the instruction it is currently executing, and thereafter interrupts the routine it was in the process of executing, to service the interrupt request. In referring to FIG. 6, it will be noted that each of the three generated interrupt signals is also applied (by means of the output terminals 35.C.10, .12 and .13) to an input port of the Central Processor (via the Expander 35.B). Upon receiving a primary interrupt signal at its input terminal 35.A.61, the Central Processor can interrogate the input port to which the Input terminals 35.B.42, .43 and .45 are connected to determine the origin of the interrupt request. If the interrupt request is a 10 millisecond clock interrupt or a printer interrupt, the Central Processor 35.A will service these interrupt requests according to the Interrupt Routine flow chart of FIG. 18, and will clear the respective flip-flops 206 or 210 (FIG. 6) by means of the respective Clear Clock and Clear Scan Input terminals 35.C.8 and 35.C.9 respectively. If the interrupt signal received by the Central Processor is a power failure or interrupt signal, the Central Processor 35.A will interrupt the routine it is executing and will automatically perform a series of instructions to save the real-time clock signal and the accumulated call-counting totalizer information within the RAM memory 35.D and will thereafter go into a temporary "Halt" or inactive mode, until restarted by means of a reset input signal received from the Memory Interface and Interrupt Control Logic 35.C by means of its input terminal 35.A.55. The Battery Reserve circuits 55.2 of the power source 55 (FIG. 3) are operative during the power failure or interrupt to maintain energization of the RAM network 35.D and of the logic elements within the Memory Interface and Interrupt Control Logic 35.C, to retain the information stored within the RAM 35.D. It will be noted that the threshhold detector 212 is fast enough to detect an interrupt or failure in power so as to cause the Central Processor 35.A to execute its interrupt routine for saving the totalizers and real-time clock information, before the power outage actually reaches the Central Processor circuits. Also, referring to FIG. 6, the Power Interrupt signal from the threshhold detector 212 is applied by means of the time delay network 214 to the NAND gate 216 to inhibit further writing of information into the RAM memory 35.D until the Power Interrupt condition has disappeared. This would prevent inadvertent writing by the Central Processor 35.A into the RAM 35.D during the power failure condition. The time delay provided by the Network 214 is sufficient to enable the Central Processor 35.A to write that information to be saved into the RAM 35.D before the Inhibit Write signal applied to the NAND gate 216 is generated. When the power is reapplied to the system, the threshold detector 212 will remove the Power Interrupt signal from the Central Processor 35.A, and will remove the Inhibit Write signal by means of the time delay 214 to the RAM 35.D, enabling writing of data into the RAM 35.D. However, the Central Processor 35.A will not resume operations until it has received a Reset input signal from the Power Up Pulse generator 235 (see FIG. 6). Thereafter, operation of the Central Processor will proceed as outlined in the Main Control Cycle flow diagram of FIG. 17.

The Clock Interrupt signal (see FIG. 18) is used to start the Printer drive motor of the peripheral Printer 38 if the Printer has initiated a Start Print (ST PR) signal. The 10 millisecond clock interrupt signal is used to perform this function since the timing for coordinating the printing operations must be accurately performed in response to the Start Print signal. The Clock Interrupt signal is also used to increment the real-time clock data within the Central Processor, which keeps track of the time of the day for various control features, particularly the Automatic Wake-Up feature. The Clock Interrupt is also used to interrogate the peripheral Consoles 37 to process any information being entered therein, and to update the output displays on the consoles. Following the execution of the Interrupt routines for either a Printer Interrupt or a Clock Interrupt signal, the information corresponding to the routine that was being executed upon receipt of the interrupt Signal is restored to the Accumulator of the Central Processor 35.A, and the Central Processor 35.A resumes execution of that routine.

Referring to FIG. 17, there is illustrated a flow-chart of the Main Control Cycle of the Microprocessor 35. The Main Control Cycle is continuously executed once a reset Power Up Pulse is received by the Central Processor 35.A, until a "Halt" instruction is encountered as a result of a Power Interrupt condition. The Microprocessor 35 coordinates all of the monitoring and control operations of the system 30 by means of the Main Control Cycle, by which it cyclicly executes various sub-routines as required in the overall system operation. When a particular sub-routine is called, the Microprocessor executes the instructions of that sub-routine until a "return" instruction is encountered, at which point the Main Control Cycle is re-entered at the next succeeding step in the Cycle. Individual flow-charts for the sub-routines of the Main Control Cycle are illustrated in FIGS. 19-25, as indicated in FIG. 17.

The Operations Routine (FIG. 19) is generally operable to service the peripheral Printer 38 by preparing for transmission the printer data to be transferred by means of the Printer Data output terminals P0-P15 of the Microprocessor 35. The "printer line buffer" is a register which is filled by other program routines which call for "print" operations, during the execution of their respective routines. The "printer convertor buffer" comprises eleven 16-bit registers which hold the data which is transmitted via the P0-P15 output terminals and which is transmitted to the Printer Drive circuits 38 A during the Print Interrupt cycle. It will be recalled that the "printer converter buffer" is filled and the contents of each of the eleven registers thereof are consecutively transmitted to the Printer on the eleven successive time intervals (corresponding to the eleven PR SCAN signals) which comprise a print cycle resulting the printing of one hard-copy line. The Operations Routine also services the plurality of desk Consoles 37 by reading the information entered on that console and by performing the type of operation indicated by the respective consoles entry. It will be noted that the routine for servicing the Console 37 is found in both the Operations Routine (FIG. 19) as well as in the Interrupt Routine (FIG. 18). In general, the Console handling routines provide for reading the keyboard entries of the respective consoles, and control the respective console display panels. The console handling routines make decisions as to what steps to execute when a specific keyboard switch is depressed, and based on these decisions update the console displays and update or read the RAM memory 35.D to enter or extract therefrom the requisite data. The "indicated operations" performed by the Operations Routine in response to a Console entry includes such operations as initiating the printer list routine, writing into RAM memory, setting a message waiting bit in memory, and the like. In the preferred embodiment, only the Operations and the Interrupt routines have the ability to change the data RAM memory within the Central Processor 35.A.

As previously discussed, the Interrupt Routine (FIG. 18) handles the time dependent operations including updating of the real-time clock, synchronizing printer data transmission from the Microprocessor 35 to the Printer 38, storing important data in the RAM memories 35.D in the event of a power failure, displaying output data on the respective Console displays, and performing emergency dialing operations.

The Display Scanner Routines (FIG. 25) scan the RAM memory 35.D and effect an appropriate display on the Message Waiting 39.A and Romm Status 39.B Displays respectively of the appropriate hotel/motel room numbers corresponding to the scanned data.

The Room Circuit Scan Routines, including the Wake-up Scan Routine (FIG. 20), the MW and MR Refresh Routine (FIG. 22) and the Room Status Refresh Routine (FIG. 23) perform most of the monitoring and updating control operations with respect to the individual Features of the control system 30. These routines will be understood better upon a more detailed description of the operation of the individual Room Circuits associated with the respective Features of the control system 30. In general, however, these three equipment monitoring and scanning routines make decisions based on the states of the individual room circuits within the first and second sets of Mother Boards 60 and 70, and upon the current state of data within the RAM memory 35.D which corresponds to the respective Room Circuits, and updates the Room Circuits and the RAM 35.D memory accordingly. Scanning of the Room Circuits is performed in blocks, wherein the size of the block to be scanned is determined by data stored within the PROM data tables. One such data block is scanned each time the respective "scan" or "refresh" routine is executed.

The Printer List Routine (FIG. 24) is operative to effect a printed list of these rooms wihin the hotel/motel which satisfy a specific condition of one of a plurality of listing conditions. For example, one listing condition may be a printing of those rooms "ready for occupancy", another listing condition may indicate those rooms which are "ready to clean", another listing condition may represent those rooms which have their respective "wake-up conditions set", etc. The Printer List Routine scans the data RAM 35.D memory for each of the rooms throughout the hotel/motel to see if the appropriate condition being searched for against the specific listing condition is available with respect to each of the rooms. If the condition is present for a respective room, the appropriate information is loaded into the "line buffer" for printing.

The AWU Ring Phone Routine (FIG. 21) performs the control and coordinating functions for ringing the telephone in individual rooms during an Automatic Wake-Up Procedure.

Message Register Feature

The Message Register Feature of the preferred embodiment monitors all outgoing calls made from each room telephone throughout the hotel/motel, and maintains an accurate count of such outgoing calls within the RAM 35.D memory of the Microprocessor 35 which is readily available for readout at the desk Consoles 37 as desired by Hotel/Motel management. No circuits are required within the respective hotel/motel rooms for achieving this feature. The outgoing calls made from respective telephones throughout the hotel/motel are counted by monitoring the signal level at that line associated with each telephone of the PBX or Central Office hardware, which designates that an outgoing call is being made on a respective phone. Referring to FIG. 7, the PBX or Central Office outgoing call pulse lines are designated at the "COUNT 1-128" input lines to the Room Block Cards 60.1.1-60.1.32. FIG. 9 illustrates the circuitry for the Message Register Feature for each individual room throughout the hotel/motel. The Room Circuit 60.1.1.1 is located adjacent the Microprocessor 35, generally within the main room used to house the telephone PBX or Central Office equipment within the hotel/motel. Referring to FIG. 9, an input pulse signal of appropriate magnitude and duration to designate the fact that an outgoing call has been made, when applied to the COUNT 1 input terminal charges the capacitor 504 through the resistor 500 and diode 501 until the turn-on threshold voltage of the LED 503 is exceeded. At that point, the LED 503 is energized, providing a photovoltaic energizing signal for the phototransistor 507. The COUNT 1 signal is a pulse signal derived from that "sleeve" lead of the PBX which corresponds to that particular room telephone which the MR/MW Room Circuit 60.1.1.1 services. The COUNT 1 pulse signal is generated by the external telephone equipment when an outgoing call has been completed from the respective telephone. The transistor 507 and the LED energizer 503 are optically isolated from one another to prevent disruption of the circuits providing input to the Microprocessor 35, from the relatively noisy telephone equipment circuit from which the COUNT 1 signal is received. The transistor 507 acts as a switch when saturated in its energized mode of operation to provide a logical low signal at its collector 507(c) and also the clock (clk) input terminal to the JK flip-flop 510. The flip-flop 510 is a leading edge triggered flip-flop having a normally logical low output signal at its Q output terminal, and providing a logical high signal at its Q output terminal when triggered by a positive leading edge at its clock input terminal. In the preferred embodiment, when the COUNT 1 input signal is removed, de-energizing the LED 503 and de-energizing the transistor 507, the voltage level at the collector 507(c) of the transistor 507 rises toward the positive potential of the PWR 1 supply, providing a triggering input signal to the clock input terminal of the flip-flop 150. The logical high input signal at the Q output terminal of the flip-flop 510 is retained until the flip-flop is reset by means of its R input terminal. The output signal from the flip-flop 510 is applied to the Tri-State Driver 512, but is not transmitted through the Driver 512 until the Driver 512 is enabled from the Microprocessor 35 by means of the enabled (e) input terminal of the Tri-State gate 512. The logical high output signal from the flip-flop 510 indicates that an outgoing calls has been made from the respective telephone with which the Room Circuit 60.1.1.1 is identified.

In the preferred embodiment, the Microprocessor 35 interrogates the status of each individual MR/MW Room Circuit (such as 60.1.1.1) approximately every 5 seconds, as the Microprocessor 35 cycles through its Main Control Cycle (FIG. 17). When the Microprocessor 35 reaches the "Execute MW + MR Refresh" block of its Main Control Cycle (FIG. 17), the MW and MR Refresh Routine (see FIG. 22) is executed by the Microprocessor 35. Referring to FIG. 22, the Microprocessor sequentially looks at each of the MR/MW Room Circuits by sequentially entering their respect circuit addresses into the Central Processor equipment and by thereafter executing the remaining Flow Chart instructions. When the address corresponding to the MR/MW Room Card 60.1.1.1 is entered into the Central Processor, the Microprocessor automatically transmits enabling output signals for all of the Feature Room Circuits identified with that particular addressed room (i.e. in the case of the preferred embodiment to both the Room Circuits 60.1.1.1 and 70.1.1.1). The Room Circuit enabling signals are in the form of an address transmitted from the Microprocessors 35 by means of the output terminals 35.G.51-35.G.61 respectively of the First Level Convertor output circuit 35.G (FIG. 5). The enabling address signals are transmitted by means of the signal flow paths 40.A and 40.B to the external Feature Circuits to enable those particular Feature Circuits which are identified with the specific room which has been addressed within the Central Processor. With respect to the MR and MW Features, the 11-bit enabling address signal transmitted by the signal path 40.A is applied to the input terminals 601-611 of the MR/MW Mother Board Decoder network 600 (see FIG. 7). The four bits designated as MS0-MS3 specify one of the 16 Mother Boards 60.1-60.16, and are operative by means of the one of 16 Decoder network 600.F (FIG. 8) to enable only one of the 16 Mother Boards 60.1-60.16. The five address bits BS0-BS4 designate one of the 32 Room Cards (60.1.1-60.1.32) upon the enable one of the Mother Boards, by means of the One of 32 Decoder network 600.E (see FIG. 8). Finally, the two remaining address bits RE0-RE1 specify by means of the One of 4 Decoder network 600.D (FIG. 8) one of the four MR/MW Room Circuits 60.1.1.1-60.1.1.4 upon the enabled Room Card. Therefore, only one Room Circuit of the possible 2048 Room Circuits of the First Set of Mother Boards will be enabled by means of the 11-bit address. Simultaneously, only one of the Room Circuits of the Second Set of Mother Boards 70 will be enabled by the 11-bit address transmitted from the Microprocessor 35.

Referring to FIG. 8, it will be noted that the 11-bit address from the Microprocessor 35 is applied to each of the Mother Boards within the circuit, but that the One of 16 Decoder (600.F) on each of the Mother Boards determines whether the Room Card and Room Circuits upon that card will be enabled. The respective Room Card enabling signals are applied by means of the One of 32 Decoder to enable one of the 32 Room Cards on the enabled Mother Board. Referring to FIG. 9, the EN CARD 1 enabling signal enables the first signal input 518(a) of the NOR Gate 518 of each of the four room circuits on the Room Card 60.1.1. However, only one of the MR/MW Room Circuits 60.1.1.1-60.1.1.4 upon the enabled Room Card is enabled at a time, in response to the appropriate EN 1-EN 4 Room Circuit enabling signals. The Room Circuit 60.1.1.1 will be enabled by the Microprocessor when its simultaneously receives an EN CARD and an EN 1 input signals by means of the input terminals (s) and (e) respectively of the MR/MW Room Card 60.1.1. It should be noted that the previously described "counting" circuitry and the "Message Waiting" circuitry to be hereinafter described, are continuously enabled for performing their respective monitoring and control functions; the enabling function performed by the 11-bit address from the Microprocessor 35 refers to the enabling of respective Room Circuits for communication with the Microprocessor 35.

When the NOR gate 518 is enabled, as above described, the input signals applied to the input terminals of the Tri-State Driver 512 are transmitted through the gate 512 to its respective output terminals. With respect to the Message Register or call-counting feature of the invention, the signal output from the Q output terminal of the flip-flop 510 is applied to the output terminal 512(c) of the Tri-State Gate 512 to the Message Register Buss (MR BS) within the Mother Board 60.1 and is applied to the input 615 of the Decoder 600 (see FIGS. 7). Referring to FIG. 8, when the Mother Board 60.1 is enabled by means of the 4-bit MS0-MS3 signals, the Tri-State Driver Gate 600.G will also be enabled, and the MR BS signal applied to its input terminal (a) will be transmitted by means of its output terminal (c), the output terminal 635 of the Decoder 600 and the signal flow path 40.A back to the input terminal 35.G.63 (FIG. 5) of the Microprocessor 35. Therefore, when a room's address is called by the Microprocessor 35 during the MW and MR Refresh Routine, the appropriate MR Room Card corresponding to that room is interrogated for the status of its respective MR BS output signal. The Microprocessor 35 determines whether the MR BS signal is logically "low" (corresponding to a set latch) or whether it is logically "high" (corresponding to an unset latch), and performs the operation indicated in the flow chart of FIG. 22. If the MR latch is set, indicating that an outgoing telephone call has been made, that data recording portion of memory used for maintaining a count of the calls made from that specific room is incremented and a reset signal for the flip-flop 510 (FIG. 9) is forwarded to the enabled MR Room Card from the Microprosessor by means of the output terminal 35.H.39 (FIG. 5). The CLR MR output signal from the Microprocessor 35 is received at the input terminal 614) FIGS. 7 and 8) of the appropriate MR Mother Board is buffered by the Decoder 600 and is applied as CLR MR" via the inverter 516 and the enabled AND gate 517 to the reset (R) input terminal of the flip-flop 510, to reset the signal output of the flip-flop 510 to a logical low state. In the preferred embodiment, each of the Room Circuits for all of the features monitored and controlled by the Control System are interrogated approximately once each 5 seconds, depending upon the length of time required by the Microprocessor 35 to complete a cycle of its Main Control Cycle (FIG. 17).

Message Waiting (MW) Feature

The Message Waiting (MW) Feature of the preferred embodiment automatically maintains a real-time record of those rooms within the hotel/motel for which a message is waiting, and displays on the Message Waiting Display Scanners 39.A remotely located at strategical locations throughout the hotel/motel a continuous sequential representation of the respective room numbers at any particular time for which messages are waiting. The Message Waiting Feature is controlled by means of the Microprocessor 35 with the assistance of the MW Room Circuits of the type illustrated in FIG. 9, which are in the preferred embodiment physically located to share a common circuit board with the MR Room Circuit for that specific room. As was true with the Message Register Room Circuits, a separate MW Room Circuit exists and is identified addressable by the Microprocessor 35 for each room within the hotel/motel.

Referring to FIG. 9, the RS Latch 522 is operative under control of the Microprocessor 35 to set and to clear the Message Waiting Buss (MW BS). A logical high output signal at the Q output terminal of the Latch 522 indicates a "set" condition of the Latch 522, corresponding to the fact that a message is waiting for the room with which the Room Circuit 60.1.1.1 is associated. The Tri-State Driver 512 when enabled, transmits the Latch 522 output signal to its ($d$) output terminal, which is directly connected to the MW BS signal line. The Q output of the Latch 522 also energizes the transistor 515 for driving the Message Waiting Flag relay 523. When the relay 523 is energized, a circuit path is closed to the MW 1 signal line which is connected to the PBX equipment to that telephone line leading to the telephone within the specific room which the MW Room Circuit 60.1.1.1 represents, to activate the Message Waiting Indicator (not illustrated) on the telephone within the hotel/motel room. Typically, the Message Waiting Indicator is a red light positioned on the chassis of the telephone, which is illuminated when a energizing signal is transmitted thereto by means of the MW 1 line.

The Message Waiting portion of the Room Circuit 60.1.1.1 is addressed simultaneously with the 11-bit addressing scheme previously described with respect to the Message Register Feature portion of the Room Circuit 60.1.1.1. The RS Latch 522 is "set" (providing a logical high at the Q output terminal) when the Room Circuit 60.1.1.1 is enabled by means of the 11-bit address from the Microprocessor 35, and when the SET MW" signal is received from the Microprocessor 35. the "set" input signal is provided by means of the AND gate 526. Once "set", the Latch 522 will maintain a logical high signal at its Q output terminal, maintaining energization of the Mw 1 signal line, until the Latch 522 is "reset" by means of the AND gate 519. The AND gate 519 provides an output reset signal upon receipt of the CLR MW" from the MicroprocessOr and when the Room Circuit 60.1.1.1 is enabled by means of the 11-bit address from the Microprocessor 35.

The Microprocessor 35 applies the Set Message Waiting (SET MW) and the Clear Message Waiting (CLR MW) signals at its output terminals 35.H.37 and 35.H.38 respectively in response to its execution of the MW and MR Refresh Routine (FIG. 22). The SET MW and CLR MW signals are applied by means of the signal flow path 40.A to the input terminals 613 and 612 respectively of the Decoder network 600 of the MR/MW Mother Board 60.1. The Decoder 600 buffers the SET MW and CLR MW input signals (see FIG. 8) and respectively provides at its output terminals 633B and 632B respectively the SET MW" and CLR MW" signals for the MW Room Card circuit 60.1.1.1. As previously described with respect to the Message Register Feature, the Tri-State Driver gate 512 transmits the MR BS and MW BS signals to the Decoder 600 for transmission to the Microprocessor 35 by means of the output terminals 635 and 636 respectively when the Tri-State Driver 600.G (see FIG. 8) of the Decoder 600 is enabled. The Tri-State Gate 600.G will be enabled whenever the Mother Board 60.1 is enabled.

The Microprocessor 35 sets and clears the Message Waiting Latch 522 during the execution of its MW an MR Refresh Routine (FIG. 22). The Microprocessor 35 determines whether the RS Latch 522 should be set or cleared depending upon the condition of a memory bit in the RAM Memory 35.D, which bit corresponds to the Message Waiting condition for that particular room. The Message Waiting bit within the RAM is set or cleared by entries made at the Consoles 37 by response from hotel/motel personnel. The process for setting or clearing the Message Waiting bits within the RAM Memory 35.D in response to Console entries will be hereinafter described with respect to Console entry operations.

If the corresponding Message Waiting bit in the RAM Memory 35.D is on or set, the Microprocessor 35 transmits an energizing signal by means of its SET MW output line to the Mother Boards 60. The appropriate Room Circuit within the Mother Boards 60 will simultaneously have been energized by means of the 11-bit address signal sent to the Mother Boards 60. Alternatively, if the Message Waiting bit within the RAM 35.D is not set or is cleared, the Microprocessor 35 will forward an energizing signal on its CLR MW output line to the Mother Boards 60, to effect a reset of the RS Latch 522 and to extinguish the Message Waiting signal transmitted to the telephone within the appropriate room by means of the MW 1 signal line.

Referring to FIG. 22, immdiately following the setting or clearing of the Message Waiting Room Circuits, the Microprocessor 35 will proceed with the servicing of the Message Register portions of the appropriate room circuit which has been addressed.

As a part of the Message Waiting Feature, a continuous sequential listing of those rooms which have their respective Message Waiting bits set within the RAM memory 35.D, is automatically provided on the Message Waiting Display panels 39.A. This display scanners 39 are controlled by the Microprocessor 35 according to the Display Scanner Routine of FIG. 25. The Display Scanner Routine can be entered at three different portions thereof, corresponding to the three uppermost "enter" blocks of FIG. 25. The three entry points into the Display scanner Routine are initiated through the Main Control Cycle (FIG. 17). Since the Display Scanner Routine also controls display of information by means of the Room Status (or maid) Displays 39.B, a description of this routine will be deferred until the Room Status Feature has been described.

Automatic Wake-Up (AWU) Feature

The Automatic Wake-up Feature of the preferred embodiment automatically processes wake-up messages to the respective rooms throughout the hotel/motel according to information entered into the Microprocessor 35 by means of the plurality of consoles 37 (as hereinafter described). The Automatic Wake-up feature liberate hotel/motel personnel from having to perform the time-consuming operations in the busy morning hours of individually calling those rooms which request wake-up service, and virtually eliminates errors in the actual process of calling proper ones of the individual rooms at the proper times. The Automatic Wake-up Feature, except for the initial entry of the room number and desired wake-up time made into the Consoles 37 (hereinafter described in more detail with the Console Operations description) is performed by the Microprocessor in its execution of the Wake-up Scan Routine (FIG. 20) and the AWU Ring Phone Routine (FIG. 21) and by the appropriate RS/AWU Room Circuits within the second set of Mother Boards 70. There is a separate RS/AWU Room Circuit (such as illustrated at 70.1.1.1 in FIG. 12) for servicing each room within the hotel/motel.

Referring to FIG. 12, the relays 557, 560 and 573 have their respective movable contact elements illustrated as they normally appear when their respective relay coils are not energized. The "tip" and the "ring" lines normally leading to the telephone sets within the rooms are connected at the situs of the PBX respectively to the T1 and the R1 input terminals of the AWU Room Circuit 70.1.1.1. When the relays 557 and 560 are not energized, the "tip" line from the telephone set will be directly connected by means of the closed contacts of the relays 557 and 560 as illustrated in FIG. 12, to the "tip" line T01 of the PBX or the Central Office, normally associated with the T1 telephone "tip" line. Similarly, when the relays 557, and 560 are not energized, the "ring" line leading to the telephone set within the room will be normally connected to the "ring" (R01) line of the PBX or Central Office. In other words, when the relays 557 and 560 are not energized, the tip (T1) and ring (R1) lines to the telephone set within the room are essentially directly connected to the respective tip (T01) and ring (R01) lines at the PBX or Central Office which are associated with that particular telephone set. When either of the relays 557 or 560 are energized, their respective movable contact elements break the normal connection between the tip and ring lines from the telephone set to the tip and ring lines of the PBX or Central Office. The relay 557 is energized by the One Shot Multivibrator 556 whenever the Room Circuit 70.1.1.1 is enabled, by means of the NOR gate 583, and upon receipt of the Trigger Ring (TGR RG") signal initiated by the Microprocessor 35. When the relay 57 is energized, the movable contacts (557(b) and (557(e) thereof respective connect the "ring" (R1) line to the Ring Generator RING GEN input terminal and connect the "tip" (T1) line to the reference terminal 50.A, enabling the ringing mechanism within the telephone set to be activated by the RING GEN signal. The relay 560 is energized whenever the Room Circuit 70.1.1.1 is enabled by the Microprocessor 35 and whenever the flip-flop 559 received a clock input signal from the Toggle Disable (TGL DIS") signal which originates within the Microprocessor 35. When the relay 560 is energized the relay 557 is not energized, not movable contact elements of the relay 560 operatively connect the tip (T1) line to the telephone set for energization by the Analog Switches 577 and 581 by means of the capacitor 578 and 582 respectively, and connects the "ring" (R1) line to the telephone set to the REF potential. Simultaneously, the "tip" (T01) and "ring" (R01) terminals of the PBX are connected across the terminals of the Simulated Ringer network 561, which simulates the electrical conditions that the PBX T01 and R01 terminals would "see" if they were directly connected to the T1 and R1 lines of the telephone set. Therefore, the PBX T01 and R01 terminals are not aware of the fact that the telephone set within the hotel/motel room has been operatively disconnected from the PBX. If both the relays 557 and 560 are simultaneously energized, the T1 and R1 lines of the telephone set are connected for energization by the RING GEN, and the PBX T01 and R01 lines are connected to the simulated ringer network 561, both as previously described.

The Off Hook Detector networks 569 and 562 comprise circuits operative to provide the logical high output signal at their respective output terminals for energizing the OR gate 563 when their respective input terminals sense an electrical condition on the "tip" and "ring" (T1 and R1) binds respectively to the telephone set which indicate that the telephone set hand piece is lifted or "Off Hook". In a normal telephone set, when the telephone hand set or what is commonly called the "receiver" of the telephone set is "on" its hook, the Off Hook Detector networks will sense a positive potential voltage of predetermined level at their respective input terminals. When the telephone set receiver is lifted off of its cradle, the voltage level sensed by the OFF Hook Detector network will drop below the predetermined threshold voltage, producing a logical high output signal at the respective output terminals of the Off Detector networks 569 and 562. Upon receipt of a logical high signal from either of the Off Hook Detector networks, the OR gate 563 will provide an OFF HOOK input signal to the Tri-State Buffer network 568. It will be noted that the OFF Hook Detector network 562 is only enabled, and therefore can only produce a logical high output signal when the Q output signal of the flip-flop 559 is at a logical high. A logical high signal at the Q output terminal of the flip-flop 559 corresponds to a DISABLE signal, which is directly applied to the 568(c) input terminal of the Tri-State Buffer network 568.

The pair of diodes 552 and 553, the resistor 560, the capacitor 555 and the transformer 551 in combination act as a transient suppression circuit for suppressing transient signals appearing on the tip (T1) and Ring (R1) lines, which are produced during ringing of the telephone set. The transformer 551 also serves to energize the signal inputs to the Touch Tone Detector network 554.

The RS/AWU Room Circuit 70.1.1.1 receives the enabling (EN CARD 1) and (EN 1) input signals applied to its input terminals i9 and i3 respectively from the 11-bit enabling address signal from the Microprocessor 35, in the same manner as previously described with respect to the Message Register and Message Waiting Features of the preferred embodiment. Derivation of these enabling signals can be traced to the Room Circuit 70.1.1.1 from the output of the Microprocessor (FIG. 5) and through the Mother Board 70.1 (FIG. 10) and its associated Decoder network 700 (FIG. 11). As was true with the MR and MW Room Circuits, only one of the RS/AWU Room Circuits is enabled at a time, and that circuit is simultaneously enabled with the MR/MW Room Circuit having the identical 11-bit Address transmitted by the Microprocessor 35.

The RS/AWU Room Circuit 70.1.1.1 is controlled in response to a plurality of command signals from the Microprocessor 35. Except for the "tip" and "ring" connections to the telephone set and the PBX, all of the input signals (appearing at the lefthand side of FIG. 12) to the Room Circuit 70.1.1.1 originate at the Microprocessor 35. These microprocessor commands signals can be traced through the circuits disclosed in FIGS. 10, 11 and 13 back to the appropriate output terminals of the Microprocessor 35 (FIG. 5). The microprocessor control signals are generated by the Microprocessor 35 during the execution of the Wake-up Scan Routine (FIG. 20) and the AWU Ring Phone Routine (FIG. 21). Both of these routines are entered from the basic Main Control Cycle (FIG. 17).

The Microprocessor 35 when executing the Wake-up Scan Routine (FIG. 20) periodically cyclically scans each of the rooms throughout the hotel/motel to determine whether the AWU Ring Phone Routine should be initiated in order to provide a Wake-up Message to that room. As with the MW and MR Refresh Routine, each room address within the hotel/motel is scanned by the Wake-up Scan Routine. For each entered address, the RAM memory 35.D Wake-up bit corresponding to that room address is interrogated to determine whether the Wake-up bit has been set by means of an entry through the Consoles 37. If the corresponding Wake-up bit in the RAM Memory 35.D has not been set, the next room address is entered and its corresponding Wake-up bit in the RAM Memory is interrogated. If the corresponding Wake-up bit has been set, the AWU time which has been entered via one of the Consoles 37 for that room address is loaded into the Central Processor and is compared against the real-time clock time to determine whether it is the proper time to initiate the AWU Ring Phone Routine for that specific room. If the real-time clock time is equal to or within ten successive minutes of the AWU time for corresponding room, the address of the corresponding room is entered into the Wake-up buffer if it has not yet been filled. If the Wake-up buffer has been filled, the address of the room requiring Wake-up servicing is recycled back through the Wake-up Scan Routine until an opening is available in the Wake-up buffer. Once an entire predetermined block of room addresses has been scanned by the Wake-up Scan Routine, the Microprocessor returns to the Main Control Cycle (FIG. 17) for executing the AWU Ring Phone Routine (FIG. 21).

The AWU Ring Phone Routine works in cooperation with the Wake-up Scan Routine to unload the Wake-up buffer so that the Wake-up buffer can be refilled by the Wake-up Scan Routine. Referring to FIG. 21, the AWU Ring Phone Routine begins execution reading one of the room addresses within the Wake-up buffer. When the room address is read, the appropriate 11-bit room address enabling signal is applied to the Mother Boards for enabling the appropriate RS/AWU Room Circuit (see FIG. 12). Next the Microprocessor interrogates the OFF HK BS output signal from the enabled Room Circuit to determine whether the receiver of the telephone set is OFF Hook. If the telephone set of the respective hotel/motel room is On its hook, the Microprocessor transmits a Toggle Disable (TGL DIS) signal to the Room Circuits (FIG. 12), setting the flip-flop 559 and energizing the Phone disable relay 560 while simultaneously connecting the PBX leads to the Simulated Ringer network 561. The Microprocessor 35 next checks whether the telephone set is still "ringing" from a previous cycle of the AWU Ring Phone Routine. If the telephone set is not ringing, the Microprocessor 35 initiates a Trigger Ring (TGR RNG) signal which is applied by means of the One Shot Circuit 556 (FIG. 12) to energize the Ring relay 557. When energized, the relay 557 connects the "ring" (R1) line of the telephone set to the RING GEN line which comprises a positive voltage potential sufficient to ring the "ringing" circuit within the telephone set 50. The "tip" line of the telephone set is simultaneously connected to the reference 50.A, completing the circuit from the RING GEN supply, through the telephone "ringing" circuit, the reference return. Once the One Shot circuit 556 is energized, it is operative to maintain energization of the relay 557 thereafter for a period of one second. While the Room Circuit (FIG. 12) is physically ringing the telephone set within its associated room, the Microprocessor 35 is continuing execution of its AWU Ring Phone Routine by entering successive room addresses for execution. When the Microprocessor 35 returns to the room on which it had earlier initiated a ring, if the OFF HK BS signal for that Room Circuit is still not active, and if the phone is through ringing, the phone is re-enabled by removing the TGL DIS signal from the Room Circuit and a message is printed that the telephone set was not answered in response to the wake-up ring. If the OFF HK BS signal is active when the Microprocessor 35 re-examines the respective Room Circuit, the Microprocessor determines whether the telephone has received its first Ring signal under the AWU Ring Phone Routine, and if it has, forwards a TGL AWU signal to the enabled Room Circuit which closes the Analog Switch 581 by means of the flip-flop 580 to begin transfer of the recorded Wake-up message to the telephone set. The Wake-up message is continuously repeated to the telephone set until the receiver of the telephone set is placed on its hook at which time the enabled Room Circuit's OFF HK BS signal will indicate to the Microprocessor that the Wake-up message was properly received. The Microprocessor will then initiate a print cycle for indicating that the AWU message way properly received, and will proceed with the servicing of the next room address within the wake-up buffer.

If the Microprocessor 35 attempts to initiate the Wake-up cycle when the telephone is off hook, when perhaps a call is being made, and when the telephone is in the off-hook state due to a cause other than Wake-up message routine, the Microprocessor services the remaining rooms whose addresses appear within the Wake-up buffer register, until it can service the room whose phone is currentlyl off-hook.

In the preferred embodiment, the Microprocessor 35 has 10 minutes in which to reach a room via the AWU Ring Phone Routine. If the Microprocessor cannot deliver the Wake-up message within the 10 minute window, the address of that corresponding room will be removed from the Wake-up buffer register by the Microprocessor during the execution of its Wake-up Scan Routine (FIG. 20) and a print-out indicating "no-wake-up" will be recorded. Also, in the preferred embodiment, the Microprocessor 35 will ring the telephone set within any particular hotel/motel room being serviced by means of the AWU Ring Phone Routine at four second intervals with the telephone set being energized (i.e. rung) for one second at the beginning of each four-second interval. It should be noted that during the AWU process, the PBX is unaware that the telephone set is disconnected from the PBX terminals, therefore, the PBX or Central Office Telephone equipment does not initiate any procedures it normally performs when a telephone set receiver is placed in the "off-hook" mode of operation.

The AWU bit in the RAM memory 35.D for each room is cleared within the Room Status Refresh Routine (FIG. 23), in response to the status of an Inhibit bit. The Inhibit bit is set and cleared by the Microprocessor 35 during execution of the AWU Ring Phone Routine. The Inhibit bit when set prevents the Microprocessor from continuing execution of instructions of the Room Status Refresh Routine that would interfere with the Wake-up Routine phone ringing operations. After the AWU Ring Phone Routine has initiated a TRG RNG signal to a room, the Inhibit bit is set for that room, which allows the Wake-up bit for that room to be cleared on the next execution cycle of the Room Status Refresh Routine. Once the Microprocessor 35 has serviced a room with either a successful or unsuccessful communication of the Wake-up message to the occupant thereof, the Inhibit bit for that room is cleared and the Room Statuus Refresh Routine is no longer inhibited. Also, once a room has been serviced by the AWU Ring Phone Routine, the respective room address is removed from the Wake-up buffer register to make room for entry of another room address therein via the Wake-up Scan Routine.

Room Status(RS) Feature

The Room Status Feature of the preferred embodiment provides a coordinated and automatic real-time determination of the occupancy and housekeepings status of each of the rooms within the hotel/motel at any point in time, and includes an accompanying continuously updated display of relevant housekeeping room status to Room Status (or Maid) scanners 39.B located throughout the hotel/motel at Maid facilities or stations. As with the previous features of the preferred embodiment, no circuits or connections to or within the individual hotel/motel rooms are required for the Room Status Feature, other than use of the existing telephone set within the respective hotel/motel rooms. When employed with the Room Status Feature, the telephone set within the room functions in part as an input sensor for the control system 30, providing input signals to the Microprocessor 35, which signals can be acted upon to determine the particular "status" of the hotel/motel room within which the telephone set is located. The Room Status Feature is achieved under control of the Microprocessor 35 in its execution of the Room Status Refresh Routine in combination with the plurality of RS/AWU Room Circuits (such as in FIG. 12). As supplements to the Room Status Feature, the Display Scanner Routine (FIG. 25) and the various Console Routines are also employed. The Rooom Status Refresh Routine (FIG. 23) is executed by the Microprocessor 35 whenever it is called for by the Main Control Cycle (FIG. 17).

The Room Status Feature of the preferred embodiment is generally operable to indicate at the respective Consoles 37 throughout the hotel/motel one of four different conditions for each respective room throughout the hotel/motel: (1) that the room is occupied — designated by no illumination of any of the three Room Status LED's (821c–821e of the FIG. 2) — corresponding to the RO Room Status in the Flow Chart of FIG. 23; (2) that the room is ready for cleaning — designated by illumination of the 821c Room Status LED of FIG. 2, which is in the preferred embodiment a "red" indication — corresponding to the R1 Room Status in the Flow Chart of FIG. 23; (3) that the room is currently being cleaned — designated by illumination of the 821d Room Status LED indicator of the Console of FIG. 2, which is in the preferred embodiment a yellow or amber indicator — corresponding to the R2 Room Status of the Flow Chart of 823; and (4) that the room is ready for occupancy — designated by illumination of the 821e Room Status LED on the Console 37 of FIG. 2, which is in the preferred embodiment a "green" indicator — corresponding to the R3 Room Status of the Flow Chart of FIG. 23. The Room Status indicators 821c–821e are also described in the Console schematic diagram of FIG. 15.

Referring to FIG. 12, the Room Status Feature shares many of the circuit functions of the RS/AWU Room Circuit with the automatic Wake-up Feature. Upon receipt of a Toggle Disable (TGL DIS) signal from the Microprocessor 35, the relay 560 is energized, to operatively disconnect the telephone set within the respective hotel/motel room from operative connection with PBX or Central Office telephone equipment. The Toggle Dialtone (TGL DT) output signal from the Microprocessor 35 closes the Analog Switch 577 by means of the flip-flop 576 to provide an Analog Dialtone (ANLG DT) signal to the telephone set (when the Phone Disable relay 560 is energized) which simulates the normal dialtone signal of a telephone, to make it appear to the user of the telephone that the telephone is normally operative, when in effect it is disconnected from the PBX circuits. The Trigger Dial Operator (TRG DL) signal from the Microprocessor 35 activates the One Shot Multivibrator network 572 to energize the relay 573 for temporarily closing the circuit path between the "tip" (T01) and "ring" (R01) terminals of the PBX in a manner so as to simulate the "dialing" on the telephone set of the "operator". The TRG DL signal from the Microprocessor 35 is in the form of ten spaced pulse signals timed to exactly simulate an "operator" dialed signal, and is recognized as such by the the PBX circuits. When flip-flop 576 is energized to provide a logical high signal Q output terminal, it also provides the requisite signal to the Tri-State buffer 568 for generating the Dialtone Buss (DT BUSS) output signal to the Microprocessor 35. The Touch Tone Detector network 554 is employed with telephone sets of the "touch-tone" type, to provide by means of the One Shot Multivibrator circuit 566 an input signal to the Tri-State buffer 568 whenever an attempted outgoing call is placed from the telephone set when the realy 560 has "disabled" the telephone set. The Tri-State buffer 568 passes the signal received from the One-Shot 566 to the dialed Buss (DLD BS) signal line to the Microprocessor 35 whenever the Tri-State Buffer 568 is enabled, by proper addressing of the RS/AWU Room Circuit.

In general, when the Room Status is in the RO (Room Occupied) State, the telephone set within the hotel/motel room is enabled (i.e. is operatively connected to the tip and ring terminals of the PBX in the standard fashion) unless a maid is cleaning the room. While the maid is cleaning the room, the telephone is temporarily disabled from placing outside calls. Whenever the Room Status is in the R1, R2 or R3 status states, the telephone set is disabled from normal use, but is operable for placing Emergency Calls by means of the hotel/motel Operator.

When a guest checks out of the hotel/motel, the hotel/motel front-desk personnel or cashier enters the room number into one of the Consoles 37 and depresses the Room Status (RS) selector switch 820 on the Console. The Microprocessor reads the Console input data by means of the Interrupt Routine (FIG. 18) and the Operations Routine (FIG. 19), hereinafter described in more detail, and enters the proper status information requested by the Console entry into the proper location within the RAM Memory 35.D corresponding to that particular room address. When the prior Room Status state for the entered room had been the RO (Room Occupied) state, depression of the RS selector switch on the Console 37 causes the status indicator bits within the RAM memory 35.D to indicate the R1 Room Status for that specific room. Simultaneoulsy, the "red" R1 Room Status LED indicator 821(c) is illuminated on the Console 37, indicating that the identified room has been placed in the R1 (ready to be cleaned) status.

The Microprocessor 35 in executing its Main Control Cycle (FIG. 17) routinely executes the Room Status Refresh Routine (FIG. 23). Referring to FIG. 23, the Microprocessor cyclically scans each room address. When a specific room address is scanned, that 11-bit enabling address associated with the particular room being scanned is forwarded to the RS/AWU Room Circuit (FIG. 12) for enabling the circuits upon the appropriate RS/AWU Room Circuit. The Microprocessor 35, then interrogates the appropriate locations within the RAM Memory 35.D corresponding to the currently addressed room to determine whether the Inhibit condition has been set for that room. If the Inhibit condition has been set, the Microprocessor does not interfere with the operative status of the RS/AWU Room Circuit identified with that room but proceeds to scan the next successive room address, clearing the Wake-up bit of the presently addressed room if appropriate. If the Inhibit condition is not set for the room currently being addressed, the Microprocessor 35 further examines the RAM Memory 35.D locations corresponding to the addressed room to determine the Room Status of that particular room. If the Room Status of the room is in the R1 state (ready to be cleaned), the Microprocessor reads the signal outputs from the respective enabled RS/AWU Room Circuit (i.e. the DLD BS, OFF HK BS, DBL BS, DT BS, and AWU BS). The Microprocessor 35 determines from the Dialed Buss (DLD BS) signal whether the telephone set within that room is currently being dialed for an outgoing call. If the telephone set is not being dialed, the telephone set is disabled by the Microprocessor (via the TGS DIS signal), and the Analog Dialtone (ANLG DT) signal is applied by means of the Analog switch 577 (FIG. 12) to the telephone set (via the TGL DT signal from the Microprocessor 35) such that to one lifting the receiver of the telephone set, the telephone set appears to be normally operative. The ANLG DT signal applied to the telephone causes in the preferred embodiment an interrupted dial tone to be applied to the telephone set receiver set such that a maid picking up the receiver can tell instantly whether or not the room is occupied, by the sound of the dial tone. If the telephone set is currently being used to place a call, the Microprocessor interrogates a memory location containing an indicator bit for the emergency dialing condition, to see whether another telephone set within the hotel/motel has initiated an "Emergency Dialing Procedure" and is currently corresponding to the hotel/motel Operator. If the Emergency busy indicator is not active, the Microprocessor sets the emergency indicator bit in the memory and forwards a Trigger Dial Operator (TRG DL) to the addressed RS/AWU Room Circuit. Referring to FIG. 12, the TRG DL input signal energizes the Emergency Operator Dialing relay 573 by means of the One Shot Circuit 572 to close the circuit path between the "tip" and "ring" terminals to the PBX, in a predetermined pulse pattern corresponding to 10 spaced pulse signals which identically simulate the "dialing" of the hotel/motel Operator by the telephone set. As a result of the TRG DL signal from the Microprocessor to the addressed RS/AWU Room Circuit, regardless of the actual number "dialed" or "entered" (in the case of a touch-tone telephone set) into the telephone set, the telephone set will always contact the Emergency Operator of the hotel/motel.

The Room Status of any individual room is changed under control of the Microprocessor 35 from the R1 (to be cleaned) state to the R2 (being cleaned) state as a result of an input signal applied to the Microprocessor 35 by the Maid cleaning the room, by means of the telephone set within the room. When a maid enters the room for cleaning purposes, she removes the receiver of the telephone set from the cradle of the telephone set, causing the Off Hook Detector circuits (FIG. 12) to provide an OFF HK BS signal to the Microprocessor 35. Upon receipt of the OFF HK BS signal, the Microprocessor 35 will initiate a one-minute timing cycle after which the Microprocessor 35 will automatically change the status indicator bits in the RAM Memory 35.D which are associated with that particular addressed room to the R2 (being cleaned) status. The automatic status change from R1 to R2 states will be made by the Microprocessor 35 only if the telephone set receiver is not replaced upon its cradle during the one-minute time-out interval. Therefore, by taking the receiver of the telephone set out of its hook for one continuous minute when the particular room is in the R1 status, the maid signals the Microprocessor 35 to change states of that room; in the meantime, if any outgoing telephone calls are initiated from that telephone set, the initiator will only be able to reach the Emergency Operator of the hotel/motel.

When the room identified on the Console 37 is first changed from an R0 to an R1 status, the room number of that room is placed upon the Room Status Displays, as hereinafter described, for periodically displaying that room number on the Room Status Displays 39.B within the maid's quarters until the room has been made-up. When the status of the room has been changed from R1 to R2, indicating that the room is currently being made-up, the number of that room is removed from the Room Status Displays 39.B. Also, when the status of the room changes from R1 to R2, whenever that specific room is addressed by means of a Console entry, the "red" LED indicator (821c) on the Console 37 is extinguished and the "yellow" LED indicator 821d is illuminated, indicating an R2 status for that room.

When the maid completes her cleaning of the room which is in the R2 (being cleaned) state, she replaces the telephone receiver upon its cradle, removing the Off Hook (OFF HK BS) signal from the Microprocessor 35. Referring to FIG. 23, as the Microprocessor 35 executes the Room Status Refresh Routine, after determining that the addressed room is in the R2 state, the Microprocessor determines from the Dialed Buss (DLD BS) signal whether the telephone within that room is currently being dialed. If an outgoing call is being attempted from the telephone, the initiator of that call will be connected with the Emergency Operator of the hotel/motel as previously discussed. If the telephone within the addressed room is not being dialed, and the OFF HK BS signal indicates that the telephone receiver has been replaced upon the telephone set cradle, the Microprocessor 35 automatically changes the status of that room from R2 (being cleaned) to R3 (ready for occupancy). Simultaneously, the Microprocessor 35 will transmit the appropriate signals to the Console Display Panels 37 by means of the A0-A2 and D0-D3 signal lines, the requisite signal information required to effect a de-energization of the "yellow" LED 821d and to energize the "green" LED 821e whenever that room is addressed by the respective Consoles 37.

When the addressed room is in the R3 state, whenever an attempted outgoing telephone call is made from the telephone within the addressed room, the initiator of the call will reach the Emergency Operator of the hotel/motel. If the addressed room telephone is off of its hook, but is not being "dialed" (see FIG. 23) the Microprocessor 35 will automatically disable the telephone by means of the TGL DIS signal.

When a guest is to occupy a room which is ready for occupancy (i.e. in the R3 state), the hotel/motel desk clerk enters the room number into the Console which responds during the Interrupt Routine (FIG. 18) to illuminate the "green" LED 821e, indicating that the room is ready for occupancy. The desk clerk then depresses the Room Status (RS) push-button on the Console 37 (see FIG. 2). The Microprocessor 37 responds to the entered Rs signal during the Operations Routine (FIG. 19) and changes the Room Status Indicator bits to indicate an R0 (Room Occupied) status for that addressed room. During the next execution by the Microprocessor 35 of the Room Status Refresh Routine, the telephone set for that room is enabled by connection via the RS/AWU Room Circuit (FIG. 12), the tip (T1) and ring (R1) lines of the telephone set within the room to the tip (T01) and ring (R01) lines respectively of the PBX or Central Office Equipment.

When a maid cleans a room which is occupied (having an RO status) upon entering the room she lifts the receiver of the telephone set, listens to the dial tone, and determines from the normal dial tone sound that the room is currently occupied, and that she need perform only a routine (less than complete) cleaning of the room. The maid maintains the telephone receiver off of its hook for the duration of her cleaning of the room. The Microprocessor 35 in execution of a Room Status Refresh Routine senses that the telephone receiver is off of its hook via the OFF HK BS signal and initiates a 10 second time-out interval. If the telephone receiver remains off of its hook for 10 consecutive seconds without being "dialed", the Microprocessor assumes that the room is being cleaned, disables the telephone set via the TGL DIS signal. If the telephone receiver remains off-hook for an additional 50 seconds the Microprocessor initiates a print-out on the Printer 38 indicating that the room is being cleaned. The telephone set within the room remains disabled for the duration of the cleaning of the room. When the maid completes cleaning the room, she replaces the receiver of the telephone set upon its cradle, and the Microprocessor 35 determines via the OFF HK BS signal that the maid has completed cleaning of the room, and initiates a print-out on the Printer 38 that the room has been cleaned, and simultaneously removes the TGL DIS signal to re-enable the telephone set for normal calls therefrom.

When the desk clerk depresses the Room Status (RS) push-button on the Console 37, the Microprocessor 35 during execution of the Interrupt Routine (FIG. 18) updates the Console display by extinguishing all Room Status LEDs (821c, 821d and 821e) indicating that the room is in the R0 (Occupied) state. Whenever that room number is addressed by one of the Consoles 37.

Console

In general, all communications from the hotel/motel desk personnel to the control system 30 are made by means of the plurality of Desk Console Units 37 (see FIG. 2). In general, the Consoles 37 provide a real-time return display to the hotel/motel desk personnel indicating the hotel/motel room number which the desk personnel entered into the Console, the number of outgoing telephone calls recorded by the Message Register Feature of the system for that room, the status of the room, the status of the Automatic Wake-up Feature for the room and the status of the Message Waiting Feature for the room — all on an individual room basis. In the preferred embodiment, the Consoles 37 display up to 5-digit room numbers via the digital read-out indicators (822a–822e). In the preferred embodiment, the Consoles 37 display two decimal digits of accumulated call-counting (Message Register) information by means of the output display indicators 822f and 822g.

The desk personnel enters information into the Console 37 by means of the push-button input switches 820 (FIG. 2). During execution of the Interrupt Routine (FIG. 18) the Microprocessor debounces each push-button switch 820 as it is depressed and places the encoded information appearing on the B0-B5 (see FIG. 15) signal output lines from the Console within the RAM Memory of the Microprocessor 35. Simultaneously, the display portions of the Console 37 (comprising the output indicators 821a–821f and 822a–822g) are updated by means of signal flow lines A0–A2, D0-D3 and CONS ALM signal input lines. It should be noted that only one of the four Consoles 37 is in communication with the Microprocessor 35 at a time, as determined by the Console Select (C0 and C1) lines (see FIG. 15). During execution of the Operations Routine (FIG. 19) the Microprocessor 35 reads the information now stored in the data RAM corresponding to that console and performs the indicated operation requested by the Consoles entry.

In general, the desk personnel can check the status of any individual room and of all of the rooms on any floor or designated portion of the hotel/motel by means of a appropriate entry into the desk Console 37. To obtain the room status of an individual room within the hotel/motel, the desk clerk enters the room number of the desired room, and depresses the END push-botton switch (see FIG. 2). The room number entered is automatically displayed on the display characters 822a–822e. The number of outgoing telephone calls presently recorded for that room (up to 99 such calls) is indicated by the display characters 822f and 822g. The Room Status of the room is designated by the particular illumination of the Room Status indicator LEDs 821c–821e. If a Wake-up time has been entered for that room and is awaiting processing, the WU indicator LED 821b will be illuminated. Finally, if the Message Waiting bit in memory of the Microprocessor 35 is set for that particular room, the Message Waiting (MW) indicator LED 821f will be illuminated. The desk operator can also obtain the status of an entire floor of rooms or of an entire section of the hotel/motel by entering an appropriate code number indicating the particular floor to be printed out and by depressing the Room Status (RS) selector switch. The Microprocessor 35 will decode the entered information and will initiate the Printer List Routine (FIG. 24) to print on the Printer 38 a sequential list of all of those rooms within the indicated floor or portion of the hotel which are ready for occupancy (i.e. have an R3 Room Status). In the preferred embodiment, the output display indicators of any Console 37 will remain energized for a period of one and one half minutes after entry thereof unless cleared from the Console by depression of the Clear (C) pushbutton switch. The Console display can be cancelled at any time by depression of the Console Clear (C) pushbutton selector switch.

When a guest is to be registered for occupancy within a particular room, the desk clerk enters the room number into the Console, depresses the END push-button and observes (if the room in the ready for occupancy (R3) state) illumination of the green indicator LED 821e. The output character indicators 821f and 821g should indicate the decimal digits "00", indicating that the Message Register counters have been cleared for that particular room. If the room status is properly R3 and the Message Register counters are cleared, the desk clerk next depresses the Room Status (RS) input selector, changing the status of that room to the R0 (Occupied) status. Upon depression of the RS indicator, the Microprocessor 35 automatically removes that room number from the Message Waiting and the Maid scanner panels 39, places that room in an R0 status, restores the telephone to normal operative service in that room, and extinguishes the Room Status indicators 821c–821e. Once a guest has been registered in the hotel, the desk clerk can at any time determine the status of that room by entering the appropriate room number, followed by depression of the END key. The desk clerk can also reset or clear the Message Register accumulated count for that particular room by entering the room number, followed by depression of the END selector switch, followed by depression of the Reset (R) selector switch. This sequence of Console entries clears the Message Register Count for that room and provides a decimal "00" indication on the output indicators 822f and 822g.

The Microprocessor 35 of the preferred embodiment is also operative to provide daily and monthly total telephone call activity for all telephones within the hotel/motel, for record-keeping purposes, designated as "totalizer" information. The totalizer information is stored within portions of the RAM Memory and can be read out when desired by commands from the console. To display the accumulated count within either the daily or monthly totalizer memory locations, the desk clerk enters the appropriate numerical code for the particular totalizer desired, followed by a depression of the END selector switch. The Microprocessor, in processing the entered information, will provide a digital output display of the accumulated count of the addressed totalizer. A Message Waiting bit for an individual room is set by the Microprocessor 35 in response to an input from the Console 37. When the desk clerk receives a message for the occupant of a particular room, the clerk enters on the Console 37, the appropriate room number, followed by depression of the END selector switch, followed by depression of the Message Waiting (MW) selector switch. In processing the inputs to the Console, the Microprocessor energizes the Message Waiting indicator LED 821f on the Console 37 whenever that room number is addressed thereby, sets the Message Waiting bit for that room in memory, illuminates the Message Waiting lamp or indicator member on the telephone set within the appropriate hotel/motel room by means of the MW and MR Refresh Routine (FIG. 22) as previously described, and places the proper identifier information for that room number on the Message Waiting Scanner Display Panels 39.A throughout the hotel/motel such that that particular room number will be periodically displayed on the display panels 39.A until the Message Waiting bit for that room has been cleared from memory. The Message Waiting bit for that room is cleared by means of an input from the Console 37 comprising entry of the appropriate room number, followed by depression of the END selector switch, followed by depression of the Message Waiting (MW) selector switch. Following this sequence of events, when the Message Waiting bit is currently set for that addressed room, results in clearing the Message Waiting bit, removing that room number from the Message Waiting Display Panels extinguishes the MW LED indicator on the Console 37 and extinguishes the Message Waiting indicator within the addressed hotel/motel room.

The Automatic Wake-up Feature for individual rooms throughout the hotel/motel is also initiated by means of a command from a Console entry. A guest calls the hotel/motel desk personnel or operator to indicate the time at which he desires a Wake-up call to be made to his room. The desk personnel enters on a Console the specific room number, followed by depression of the END selector switch, followed by depression of either the AM or the PM selector switches (indicating whether the Wake-up time is before or after noon respectively), followed by entry of the desired wake-up time followed by depression of the END selector switch. This sequence of entries, when read by the Microprocessor 35 causes the Microprocessor to set the Wake-up bit for that room and to enter the appropriate Wake-up time into that memory location associated with the set Wake-up bit and causes illumination of the Wake-up LED indicator 821b on the Console when the specific room is addressed thereby. A guest calls the operator or desk clerk to check on the time he has requested for Wake-up service, the desk clerk obtains this information immediately from the Microprocessor 35 by entering the guest's room number, followed by a depression of the END selector switch, followed by a depression of the READ selector switch, if the WU indicator lamp 821b is illuminated. The indicator characters 822a–822e will indicate the Wake-up time entered into the Microprocessor memory and the indicator character 822g will designate the letter "A" or "P" to denote whether the indicated Wake-up is in the morning (AM) or in the afternoon (PM). If a guest wishes his previously entered Wake-up time to be cancelled or changed, the desk clerk clears the previously entered Wake-up time from the Microprocessor 35 by entering the appropriate room number, followed by depression of the END selector switch, followed by a depression of the Clear Wake-up (CWU) selector switch.

In the Wake-up procedure (see FIG. 21), if the guest does not answer the telephone in response to a Wake-up ring condition, the Microprocesor 35 forwards a Print Alarm (PR ALM) to the Printer 38 (see FIG. 16) which initiates an audible alarm signal by means of the audible signal device 860, and causes the Printer 38 to print a "no answer" condition for that room. Following a successful completion of the transmittal of a Wake-up message to a designated room in the hotel/motel, the Wake-up bit for that room is cleared, as previously described, and the Wake-up LED indicator 821b is extinguished whenever that room is re-addressed by means of the Console 37.

When a guest checks out of the hotel/motel, the desk personnel enters that guest's room number on the Console selector switches 820, followed by a depression of the END selector switch and reads the number of telephone calls from the display characters 822f and 822g to determine the telephone call charges for that room. If the guest has settled his account with the hotel/motel, the desk personnel next depresses the Room Status (RS) selector switch. In response to this sequence of entries the Microprocessor resets the Message Register count associated with that room to "0"; places the room number within the list for display by the Room Status or Maid display panels 39.B, places the status of that room in the R1 (to be cleaned) room status and performs those operations incident to the R1 status as indicated in the Room Status Refresh Routine (FIG. 23). Typically, the desk personnel will next clear or release the Console 37 by depressing the Clear (C) selector switch.

All Console entries and output functions performed by the hotel/motel desk personnel are recorded by the Printer 38 for record keeping purposes. The Printer also records responses to the Automatic Wake-up Feature of the system, as previously discussed. In addition to printout of those rooms on a floor or room block basis which are ready for occupancy, a number of other condition lists may be printed by the Printer 38 under Microprocessor control, during execution of the Printer List Routine (FIG. 24).

Display Scanners

The Message Waiting and the Room Status Scanner Displays 39.A and 39.B respectively sequentially display the common identifying numbers of those rooms throughout the hotel/motel for which messages are waiting or which require Maid servicing, all under control of the Microprocessor 35. The Microprocessor 35 controls the information displayed on the various display scanners during execution of the Display Scanner Routine (FIG. 25). The Display Scanner Routine is routinely executed by Microprocessor 35 during execution of the Main Control Cycle (FIG. 17). Each of the room numbers is displayed upon the respective display panels 39 for two second intervals.

Each of the rooms throughout the hotel/motel has a identifiable portion of the RAM 35.D associated therewith for containing a set of clear condition regarding the status of the Message Waiting or Room Status maid cleaning condition. The Microprocessor scans each of the room identifiers throughout the hotel/motel during execution of the Display Scanner Routine, and determines whether that room is to be displayed upon the appropriate display. Those rooms having the appropriate display conditions set are sequentially displayed on the appropriate display scanners 39.A and 39.B throughout the hotel/motel on consecutive two-second intervals. The Microprocessor 35 transmits the character display information to the Display Scanner circuits (see FIG. 14) by means of the A0–A2 and the D0–D3 signal lines as previously discussed, which information is latched into the 7-segment display characters 804 according to the encoded information. In the preferred embodiment, a room identifier is removed from the Message Waiting Display list by means of a Console entry, as above described. In the preferred embodiment, a room identifier is removed from the Room Status or Maid scanner panel list when the status of the room changes from R1 (to be cleaned) to R2 (being cleaned).

While a specific embodiment and application of the invention has been disclosed, it will be apparent to those skilled in the art in light of the foregoing description that other modifications and variations of the control system and its application fall within the spirit and scope of this invention. This description is intended to provide concrete examples of an individual embodiment and certain variations thereof which clearly disclose the present invention. Accordingly, the invention is not limited to any particular embodiment or specific application. All alternatives, modifications and variations of the present invention which fall within the spirit and broad scope of the appended claims are covered.

What is claimed is:

1. An automated monitoring and control system for establishments of the type having a plurality of occupant rooms each having at least one telephone set, an equipment bay for housing telephone control circuit means for the room telephone sets, and at least one pair of telephone signal conductors interconnecting each of the room telephone sets to the telephone control circuit means within the equipment bay, said control system comprising:
   a. a plurality of feature circuit means operatively connected with the telephone control circuit means within the equipment bay for detecting the electrical status of a plurality of different occupant and room status related parameters, and for providing output control functions related to said parameters in response to received digital command signals; said plurality of feature circuit means comprising at least one electronically addressable feature circuit operatively identifiable with each of the occupant rooms and associated with said parameters thereof, wherein each said feature circuit is operatively connected for signal communication with the telephone set within that room with which it is identifiably associated;

b. microprocessor control means operatively connected to said plurality of feature circuits, and suitable for operative connection to one or a plurality of remotely located desk consoles, for automatically electronically monitoring and controlling in response to firmware program execution said plurality of occupant and room status parameters, on an individual room basis; said microprocessor control means being operable to sequentially and selectively electronically address individual ones of said feature circuits, to interrogate and process said electrical status conditions of said addressed feature circuits and to provide as a result of said processing, said digital command signals to said addressed feature circuits, said microprocessor control means comprising:

i. central processing means for performing, in response to firmware program instructions, arithmetic, logical and manipulative operations on and in response to digital information;

ii. firmware read only memory means operatively connected to said central processing means, for storing hardwired program instructions, and subroutines and routines comprising a plurality of said program instructions;

iii. random access memory means operatively connected with said central processing means for storing digital information under direction of said central processing means; and iv. input/output circuit means connecting in circuit said processing means with said plurality of feature circuit means for operatively transmitting digital information including said detected electrical status signals and said digital command signals therebetween;

c. at least one personalized desk console means configured for manual activation by an operator for providing an input/output communication link between the operator and said microprocessor control means; said desk console means comprising a portable chassis member suitable for placement upon a desk surface, said chassis member including a plurality of push-button input selector switching means for generating encoded digital input signals for said microprocessor control means in response to manual activation stimuli, and electronic visual display means responsive to said digital command signals from said microprocessor control means for providing visual output indications of the real-time status of said plurality of parameters on an individual room basis; and d. signal flow path means operatively connecting said personalized desk console means with said input/output circuit means of said microprocessor control means for transferring said encoded digital signals and said digital command signals therebetween.

2. An automated control system as recited in claim 1, wherein said plurality of feature circuit means and said microprocessor control means are configured for and are operatively connected to one another entirely within the telephone equipment bay of the establishment and require no additional circuits within or wiring to the plurality of occupant rooms within the establishment for performing their respective operations.

3. An automated control system as recited in claim 1, wherein said switching means of said console means comprises: a set of room identifying push-button input selector switching means for converting operator stimuli entered therein into one of a plurality of unique digitally encoded room identifying signals, whereby each said feature circuit is uniquely identified by a different one of said encoded room identifying signals; and a set of parameter selection push-button input selector switching means for converting operator stimuli entered therein into one of a plurality of unique digitally encoded parameter selection signals, whereby each of said occupant and room status related parameters is uniquely identified by a different one of said encoded parameter selection signals; and wherein said microprocessor control means includes circuit means responsive to receipt of said encoded room identifying signal to electronically address and enable that uniquely identified one of said feature circuits, and circuit means responsive to receipt of said encoded parameter selection signal to execute under said firmware program control those said program instructions and subroutines associated with the monitoring and control of that selected one of said parameters uniquely identified by said received parameter selection signal.

4. An automated control system as recited in claim 1, wherein said plurality of feature circuit means include message register feature circuit means for automatically accumulating on an individual room basis a count of outgoing telephone calls made over a given time interval from each of the respective telephone sets within the rooms of the establishment, wherein said message register feature circuit means comprises a message register circuit in each of said addressable feature circuits, operatively connected by means of the telephone control circuit to monitor the number of telephone calls made from the identifiably associated room telephone set; wherein said microprocessor control means includes circuit means for automatically establishing said given time interval on an individual room basis in response to operator entries on said console means; and wherein said electronic digital display means of said console means includes digital indicator means responsive to said digital command signals from said microprocessor control means for providing a visual accumulated telephone call count for that room uniquely identified at any instant in time by an operator entry into said console means.

5. An automated control system as recited in claim 4, wherein said random access memory means of said microprocessor control means includes a plurality of addressable message register memory elements each uniquely addressably associated with one of the room telephone sets, for storing said accumulated call counts on an individual room basis; and wherein said microprocessor control means includes circuit means for periodically and repetitively addressing and interrogating under said firmware control, each of said message register circuits to determine the current electrical status of its associated call-count monitored signal, for processing said received monitored call-count signal, and for updating the state of the associated said message register memory elements in response thereto.

6. An automated control system as recited in claim 3, wherein the plurality of room telephone sets are of the type having message waiting alarm indicators activated by means of the telephone signal conductors; wherein said plurality of feature circuit means include message waiting feature circuit means for automatically selectively activating and deactivating under control of said microprocessor firmware execution, the room telephone set message waiting indicators on an individual room basis, wherein said message waiting feature circuit means comprise a message waiting circuit in each of said addressable feature circuits operatively connected by means of the telephone control circuit means to provide activation control signals to the respectively associated room message waiting alarm indicator in response to received digital command signals from said microprocessor control means; wherein said set of parameter selection push-button input selector switching means includes message waiting selector means for providing when activated an encoded message waiting parameter selection signal, and wherein said microprocessor control means includes means responsive to said message waiting parameter selection signal and to a received encoded room identifying signal to address and enable for selective energization the identifiably associated one of said message waiting circuits.

7. An automated control system as recited in claim 6, wherein said visual display means of said console means includes a visual message waiting indicator means for providing a visual indication, under control of said microprocessor control means and responsive to entry of an identifiable room designator by means of the room-identifying push-button input selector switching means, of the current operative status of the message waiting parameter for the respectively associated room.

8. An automated control system as recited in claim 6, further including at least one visual scanner display means for providing under said firmware control of said microprocessor control means, a sequential repetitive visual display of characters identifying each room within the establishment for which the message waiting parameter is currently active, wherein said scanner display panel means includes prominently viewable display characters suitably configured for mounting within a common occupant area of the establishment.

9. An automated control system as recited in claim 3, wherein said plurality of feature circuit means include automatic wake-up feature circuit means responsive to said digital command signals from said microprocessor control means for automatically selectively initiating wake-up calls and for transmitting analog wake-up messages to selected room telephone sets at presettable wake-up times on an individual room basis.

10. An automated control system as recited in claim 9, wherein said automatic wake-up feature circuit means comprise a wake-up circuit in each of said addressable feature circuits, operatively connected by means of the telephone control circuit means to the associated room telephone set; wherein said microprocessor control means includes means for generating a real-time clock signals; wherein said push-button input selector switching means of said console means includes means for receiving operator entered said presettable wake-up times and for providing an encoded digital wake-up time signal to said microprocessor control means in response thereto; wherein said microprocessor control means includes circuit means for receiving said digital encoded wake-up time signals and for maintaining within said random access memory means a real-time record of said entered wake-up times on an individual identifiable room basis; and wherein said microprocessor control means includes circuit means for periodically and repetitively scanning under said firmware control, said wake-up times entered in said random access memory means, for comparing said scanned wake-up times against said real-time clock signal, and for selectively initiating said wake-up calls to the appropriately associated telephone sets by addressing, enabling and forwarding the appropriate digital command signal to the associated wake-up circuit.

11. An automated control system as recited in claim 9, wherein said visual display means of said console means includes a visual wake-up indicator means for providing a visual indication, under control of said microprocessor control means and responsive to entry of an identifiable room designator by means of the room-identifying push-button input selector switching means, of the current operative status of the automatic wake-up parameter for the respectively associated room.

12. An automated control system as recited in claim 10, wherein said visual display means of said console means further includes visual numerical indicator means for providing a visual numerical indication, under control of said microprocessor control means and responsive to entry of an identifiable room designator by means of the room-identifying push-button input selector switching means, of the current wake-up time entered for that associated room within said random access memory means.

13. An automated control system as recited in claim 9, wherein said control system further includes hard-copy printing means operatively connected for communication with said microprocessor control means by means of said input/output circuit means, for providing a permanent record in response to said microprocessor firmware command of the respective times of the day and the associated room identifier to which wake-up calls were initiated by said automatic wake-up feature circuit means, and a printed record of whether the respective wake-up analog messages were received by the respective room occupants.

14. An automated control system as recited in claim 3, wherein said plurality of feature circuit means include room status feature circuit means responsive to said digital command signals from said microprocessor control means and to input status signals from the respective room telephone sets, for maintaining an active real-time status log of the housekeeping and occupancy states of the plurality of rooms of the establishment, on an individual room basis.

15. An automated control system as recited in claim 14, wherein said room-status feature circuit means comprise a room status circuit within each of said addressable feature circuits, operatively connecting the telephone control circuit means with the respective room telephone sets; wherein each of said room status circuits includes circuit means for operatively sensing said input status signals from the room telephone sets and for transmitting telephone set status indicator signals corresponding thereto, to said microprocessor control means; wherein said microprocessor control means includes circuit means for receiving said telephone set status indicator signals, for processing said signals according to said firmware execution, and for maintaining within said random access memory means a real-time record of said room status states, on an individual identifiable room basis; wherein said room status states comprise identifiably distinct first through fourth room status states corresponding to four unique housekeeping and occupancy conditions of the respective rooms throughout the establishment.

16. An automated control system according to claim 15, wherein said microprocessor control means includes circuit means for periodically and repetitively scanning under said firmware program execution, said individual room status states stored in said random access memory means, for comparing said respectively scanned status states against said received telephone set status indicator signals and for automatically updating and successively changing said individual room status states from said first to said fourth states in response thereto.

17. An automated control system as recited in claim 16, further including at least one visual scanner display means for providing under said firmware control of said microprocessor control means, a sequential repetitive visual display of characters identifying each room within the establishment currently characterized by a preselected one of said room status states, wherein said scanner display panel means includes prominently viewable display characters suitably configured for mounting at locations throughout the establishment remotely located from the equipment bay.

18. An automated control system as recited in claim 15, wherein said room-status feature circuit means includes circuit means operable in response to said digital command signals from said microprocessor control means to operatively selectively disconnect those telephone sets, on an individual room basis, associated with rooms having those said room status states corresponding to an unoccupied room, from operative connection with the telephone control circuits, thereby preventing the completion of outgoing telephone calls from those disabled telephone sets, and circuit means for automatically connecting the disabled telephone sets for normal operative communication with the telephone control circuits whenever the room status state associated with that telephone set changes to a predetermined state identified with an occupied room.

19. An automated control system as recited in claim 18, wherein said room status feature circuit means includes circuit means for automatically connecting those telephone sets operatively disabled by means of said room status feature circuit means, to an emergency operator telephone set of the establishment, whenever an outgoing telephone call is attempted from the respectively disabled telephone set.

* * * * *